US010226972B2

(12) United States Patent
Tsiberidou et al.

(10) Patent No.: US 10,226,972 B2
(45) Date of Patent: Mar. 12, 2019

(54) VALVE ARRANGEMENT FOR A ROTATIONALLY FIXED TRANSITION, WHEEL UNIT WITH A ROTATIONALLY FIXED TRANSITION, AND PRESSURE MEDIUM SUPPLY DEVICE FOR A WHEEL UNIT

(71) Applicant: GV ENGINEERING GMBH, Heimsheim (DE)

(72) Inventors: Julia Tsiberidou, Heilbronn (DE); Konstantinos Tsiberidis, Heilbronn (DE); Klemens Grosse-Vehne, Heimsheim (DE)

(73) Assignee: GV ENGINEERING GMBH, Heimsheim (DE)

( * ) Notice: Subject to any disclaimer, the term of this patent is extended or adjusted under 35 U.S.C. 154(b) by 374 days.

(21) Appl. No.: 15/507,117

(22) PCT Filed: Mar. 11, 2015

(86) PCT No.: PCT/EP2015/055101
§ 371 (c)(1),
(2) Date: Feb. 27, 2017

(87) PCT Pub. No.: WO2015/136005
PCT Pub. Date: Sep. 17, 2015

(65) Prior Publication Data
US 2017/0246922 A1 Aug. 31, 2017

(30) Foreign Application Priority Data

Mar. 11, 2014 (DE) .................. 10 2014 103 218
Nov. 27, 2014 (DE) .................. 10 2014 117 458

(51) Int. Cl.
*B60C 23/00* (2006.01)

(52) U.S. Cl.
CPC .................. *B60C 23/003* (2013.01)

(58) Field of Classification Search
CPC .................................................. B60C 23/003
(Continued)

(56) References Cited

U.S. PATENT DOCUMENTS 4,805,681 A 2/1989 Vollmer et al.
5,167,291 A * 12/1992 Mann ..................... B60K 17/14
137/493

(Continued)

FOREIGN PATENT DOCUMENTS

DE 3618827 A1 12/1987

OTHER PUBLICATIONS

International Search Report for International Application No. PCT/EP2015/055101 dated Jun. 26, 2015.

*Primary Examiner* — S. Joseph Morano
*Assistant Examiner* — Jean W Charleston
(74) *Attorney, Agent, or Firm* — Carter, DeLuca, Farrell & Schmidt, LLP

(57) ABSTRACT

A pressure medium supply device for a tire of a wheel unit, a wheel unit, and a valve arrangement for a rotationally fixed transition of a pressure medium supply device for a wheel unit are provided. The valve arrangement has a housing part through which a pressure medium can flow, a control piston, in particular an axially movable control piston which is received on the housing part, and a discharge element with an outlet for conducting the pressure medium. The housing part and the discharge element are received in a rotatable manner relative to each other. The control piston has a flow channel for the pressure medium, has a force application surface to which the pressure medium can be applied, and can be moved between a disengaged position and an engaged position. A pressure medium line can be established (Continued)

between the housing part and the discharge element in the engaged position.

33 Claims, 23 Drawing Sheets

(58) Field of Classification Search
USPC .......................................... 152/415, 416, 417
See application file for complete search history.

(56) References Cited

U.S. PATENT DOCUMENTS

| | | | | |
|---|---|---|---|---|
| 7,013,931 | B2* | 3/2006 | Toit | B60C 23/004 |
| | | | | 141/38 |
| 9,849,737 | B2* | 12/2017 | van Wyk Becker | ........................ |
| | | | | B60C 23/0408 |
| 2006/0231147 | A1* | 10/2006 | Pride, II | F16K 11/07 |
| | | | | 137/625.64 |
| 2015/0290986 | A1* | 10/2015 | Tsiberidis | B60C 23/003 |
| | | | | 152/417 |

* cited by examiner

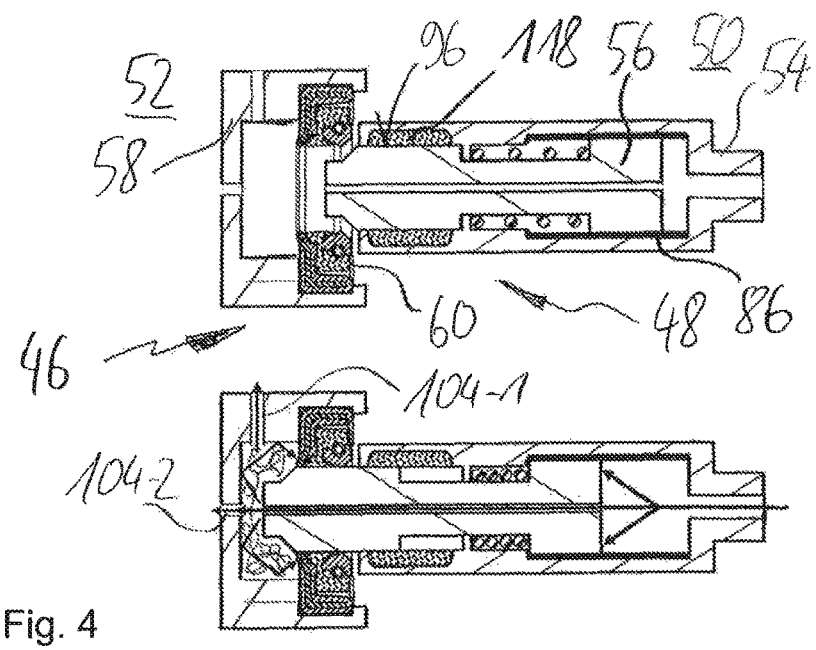
Fig. 4
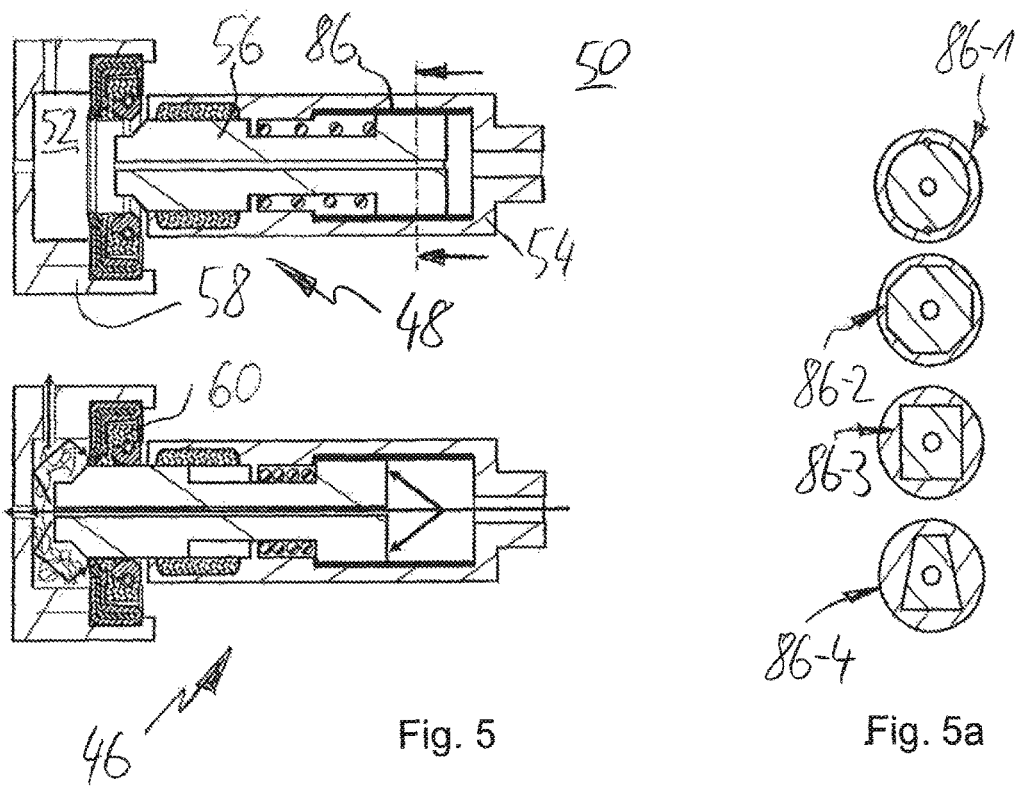
Fig. 5
Fig. 5a

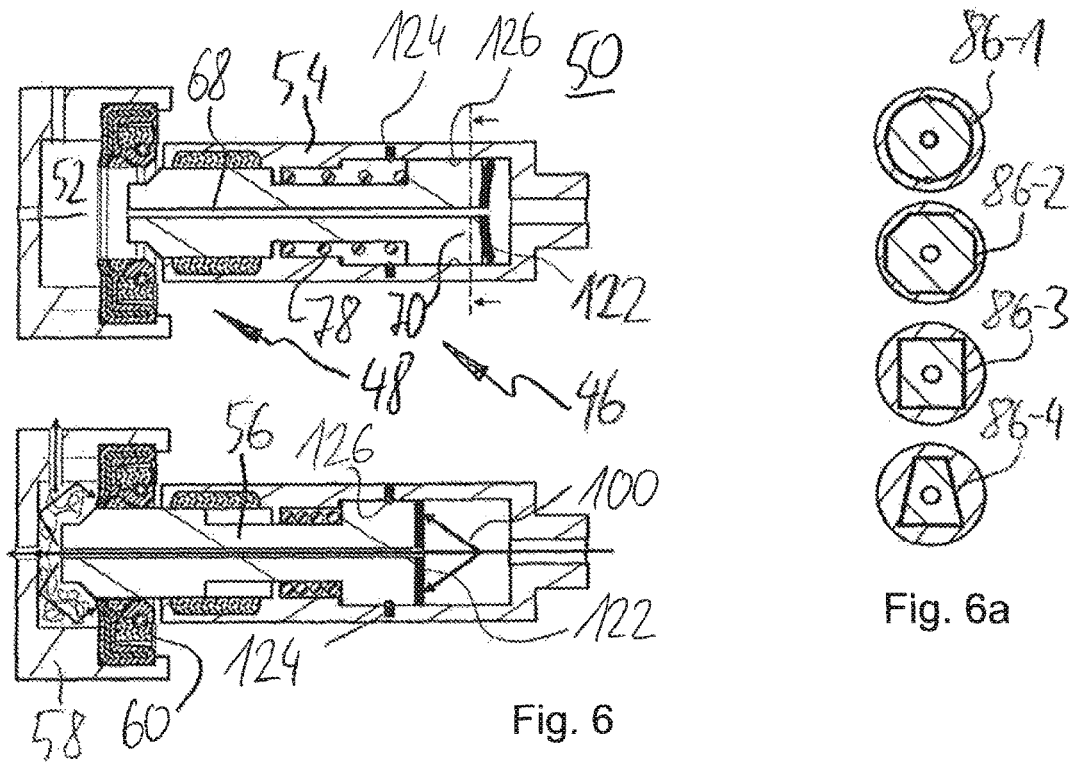
Fig. 6
Fig. 6a
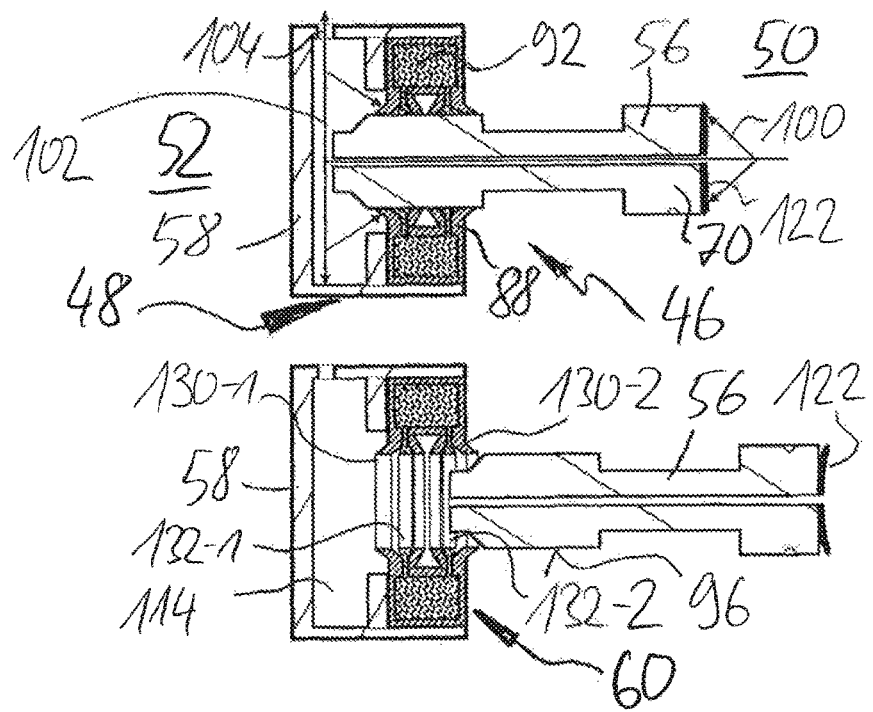
Fig. 7

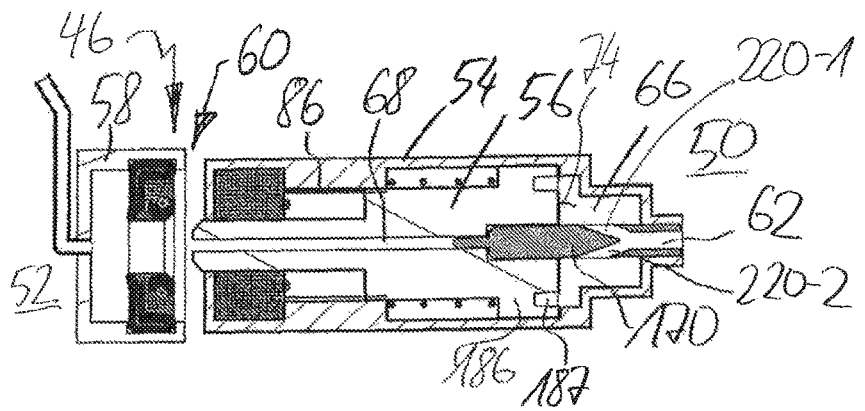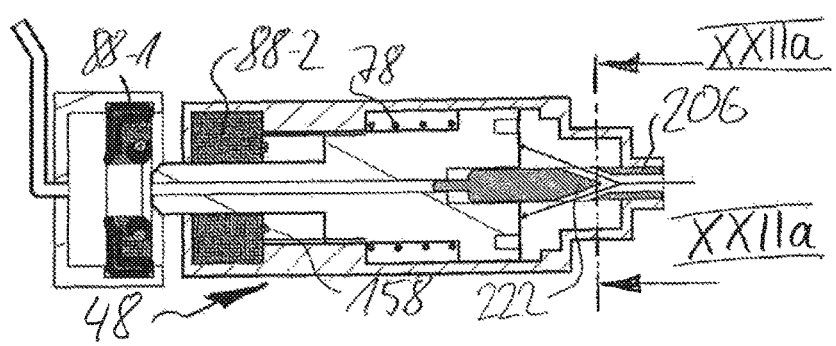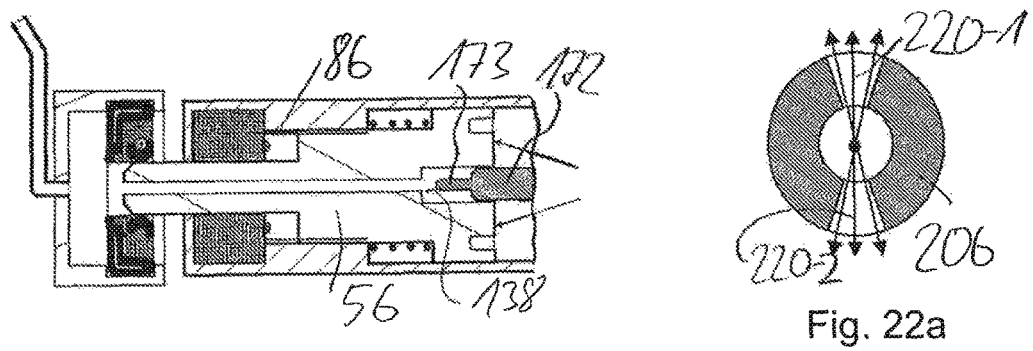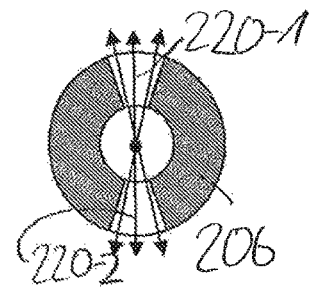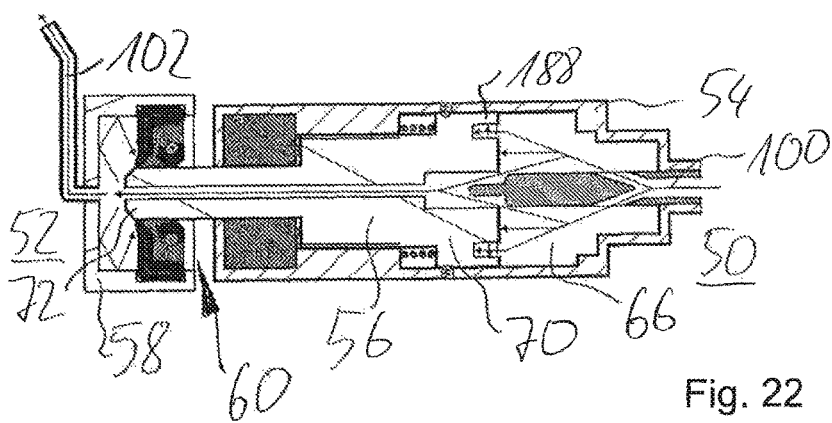
Fig. 22a
Fig. 22

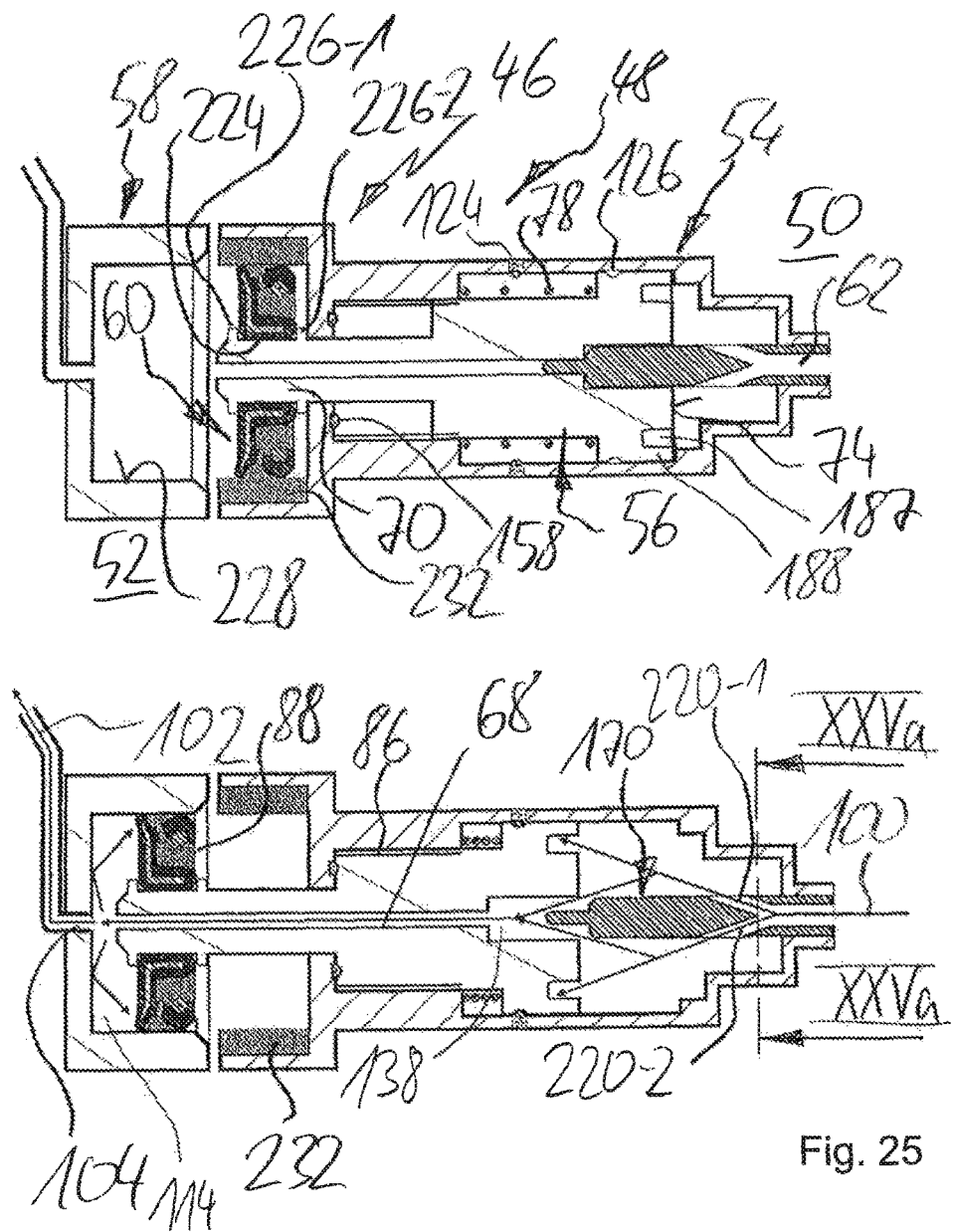
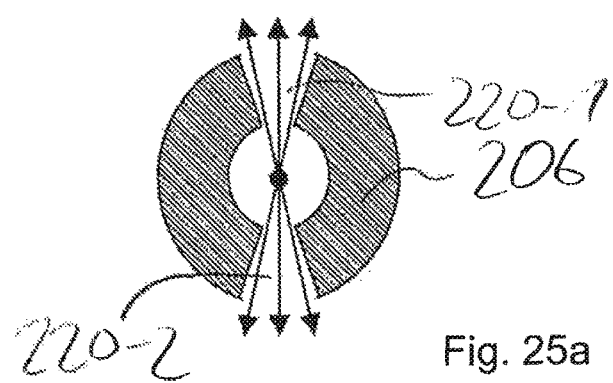
Fig. 25
Fig. 25a

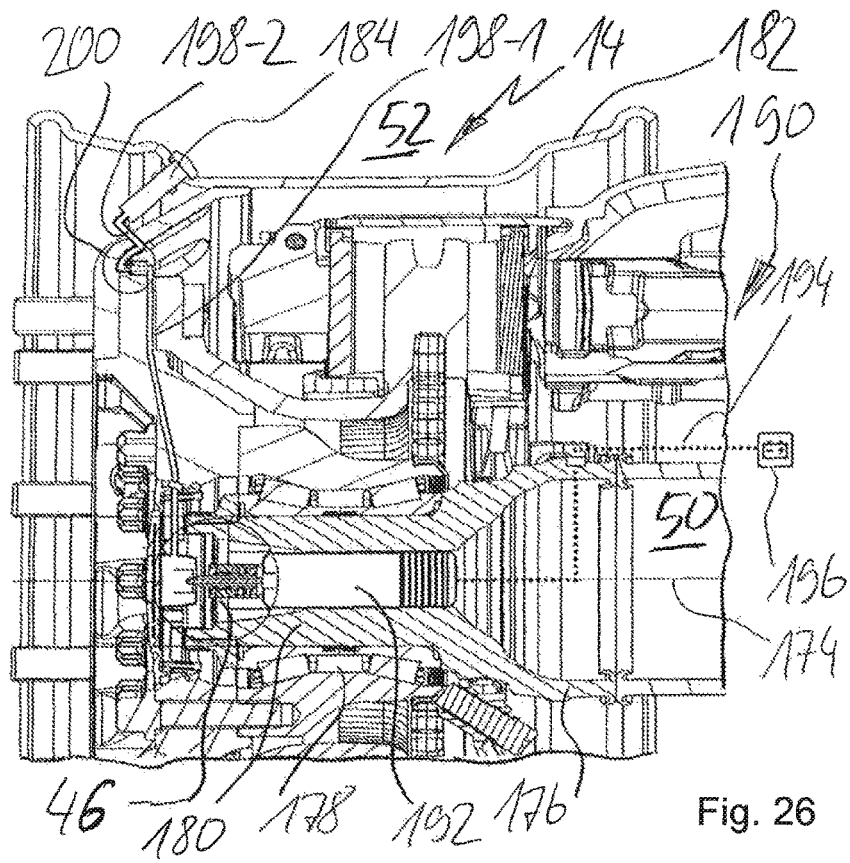
Fig. 26
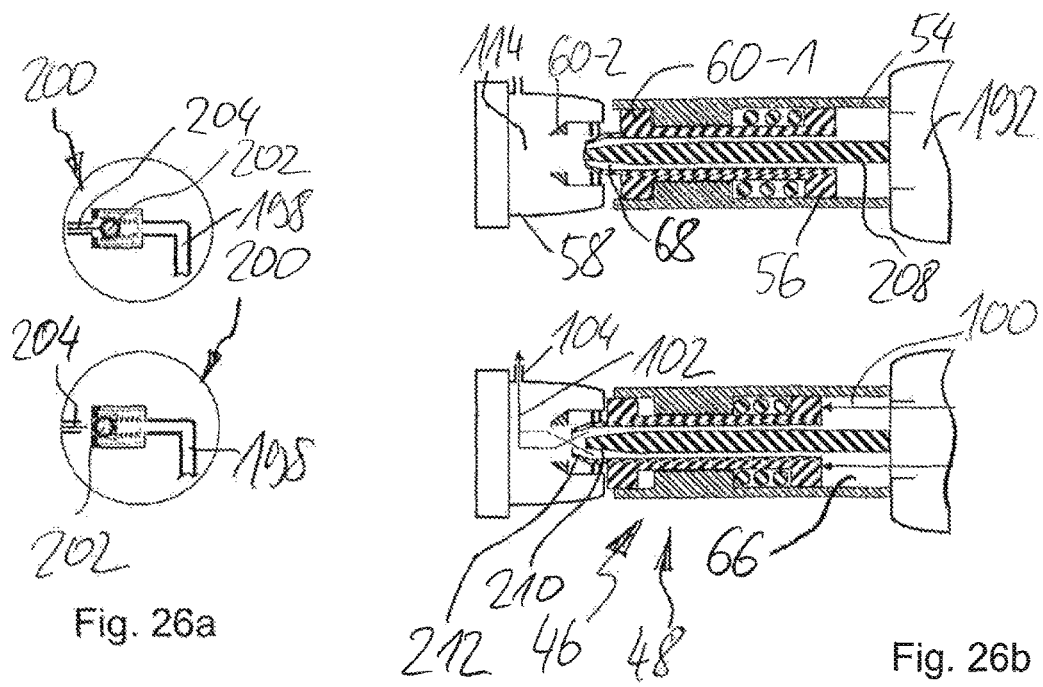
Fig. 26a
Fig. 26b

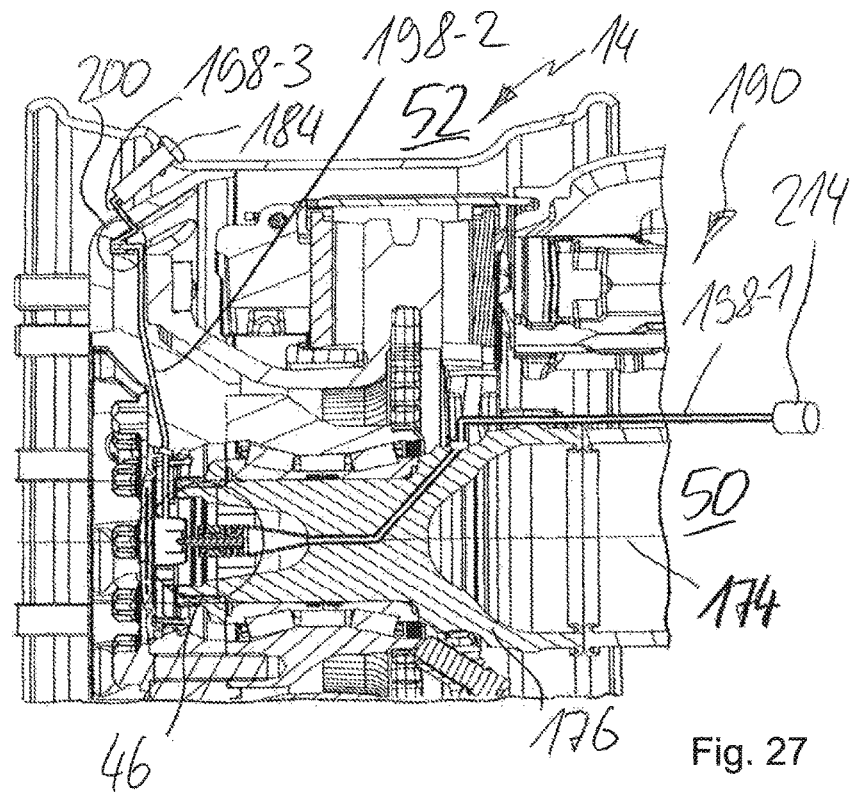
Fig. 27
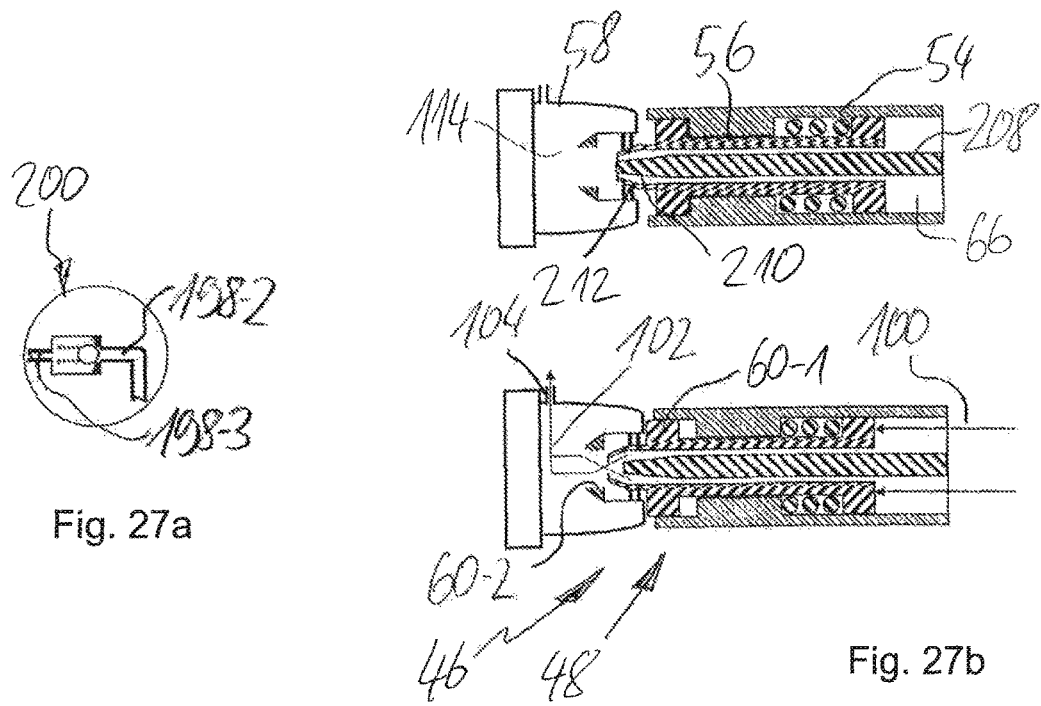
Fig. 27a
Fig. 27b

VALVE ARRANGEMENT FOR A ROTATIONALLY FIXED TRANSITION, WHEEL UNIT WITH A ROTATIONALLY FIXED TRANSITION, AND PRESSURE MEDIUM SUPPLY DEVICE FOR A WHEEL UNIT

CROSS REFERENCE TO RELATED APPLICATIONS

This application is a national stage application of International Application No. PCT/EP2015/055101, filed on Mar. 11, 2015, which claims the benefit of and priority to German Patent Application No. 10 2014 103 218.7 filed on Mar. 11, 2014 and to German Patent Application No. 10 2014 117 458.5 filed on Nov. 27, 2014, the entire contents of each of which are hereby incorporated by reference herein in their entireties.

TECHNICAL FIELD

The invention relates to a valve arrangement for a rotationally fixed transition, in particular for a rotary feedthrough, of a pressure medium supply device for a wheel unit. The invention further relates to a pressure medium supply device for a tire of a wheel unit of a vehicle and to a wheel unit with a valve arrangement.

BACKGROUND

Integrated compressed air supply systems for wheels of vehicles are generally known. These can comprise a pressure generating unit, for instance a compressor, a store and corresponding compressed air lines, for example, in order to be able to fill individual or all wheel units of the vehicle, in particular their tires, with compressed air as required. As well as compressed air, filling with other gases, for instance with nitrogen, is also conceivable in principle. A pressure medium or a pressure fluid, with which the tires of the vehicle can be filled, is accordingly generally focused on below.

Compressed air supply systems or pressure medium supply systems permit an adjustment of the air pressure or gas pressure in the tire of the vehicle. This can also comprise, in particular, monitoring of an existing actual pressure. If it is established, for example, that the actual pressure falls below a certain threshold value, the tire concerned can be filled with the pressurised pressure medium to raise the pressure level to a target pressure. Pressure adjustments may be necessary, for example, if the vehicle is exposed to different operating conditions. For example, a pressure adjustment is advantageous in the event of extreme temperature variations. The driving characteristics on various bases can likewise be optimised by a targeted adjustment of the pressure level in the tires. A pressure reduction is conceivable, for instance, when operating on a soft substrate such as mud, snow or desert sand.

Known pressure medium supply systems are known, for example, on military vehicles, all-terrain vehicles or similar vehicle types designed for extreme conditions of use. However, pressure medium supply systems can usually only be integrated into a vehicle with a high outlay. The considerable additional costs have so far prevented a further spread of pressure medium supply systems integrated into a vehicle.

Pressure medium supply systems can be used on land vehicles, but in principle also on aircraft, thus for aircraft tires, for instance. With respect to land vehicles, a utilisation is conceivable in particular on cars, utility vehicles or trucks as well as on buses or special vehicles of a general kind. However, a wide spread has failed hitherto due in particular to the considerable additional costs.

SUMMARY

Against this background, the object of the invention is to specify a valve arrangement for a pressure medium supply device, a pressure medium supply device and a wheel unit with a valve arrangement, which can help to reduce the outlay required for integration of a pressure medium supply system into a vehicle. Furthermore, the manageability of such a pressure medium supply system should be improved as much as possible. The pressure medium supply system should be able to be characterised by a low tendency to wear and pronounced longevity. In particular, it is aimed to permit pressure adjustment in tires of the vehicle if possible both when stationary and during travelling. At the same time, the system should be characterised by a high level of robustness and have as little impact as possible on the vehicle when not in use.

This object is achieved by a valve arrangement for a rotationally fixed transition, in particular for a rotary feedthrough, of a pressure medium supply device for a wheel unit, with a housing part through which a pressure medium can flow, with a control piston, in particular an axially movable control piston, which is taken up on the housing part, and with a discharge element with an outlet for guiding the pressure medium, wherein the housing part and the discharge element are taken up in a rotatable manner relative to one another, wherein the control piston has at least one flow channel for the pressure medium, wherein the control piston has at least one force application surface, to which the pressure medium can be applied, wherein the control piston can be moved between a disengaged position and an engaged position by applying pressure to the at least one force application surface, and wherein a pressure medium line is facilitated between the housing part and the discharge element in the engaged position.

A valve arrangement is namely provided in this way that can be introduced, for instance, into a pressure medium path for supplying pressure medium to a tire, wherein the valve arrangement can be activated by the pressure medium itself. The valve arrangement is further characterised by the fact that, when not in use, thus in the disengaged position, no wear or virtually no wear occurs, as the control piston is ideally not then in engagement with the discharge element.

According to an exemplary configuration, the discharge element is fitted on a wheel body side of a wheel unit, for example. The housing part with the control piston can be fitted, on the other hand, on a carrier side or frame side of the wheel unit. When the tire of the wheel unit rotates, a relative rotation occurs between the housing part and the discharge element. This could generally be accompanied by (at least slight) wear, for instance by a sliding motion between the control piston and the discharge element, or a component of this. However, the invention makes use of the fact that the control piston is only shifted into the engaged position when the pressure medium line is actually required, thus when the pressure medium flows through the line. The pressure medium can namely act on the force application surface of the control piston and displace this in the direction of the engaged position. In the engaged position, the control piston preferably acts in a sealing manner on the discharge element in such a way that a connection is created in the pressure medium path or the pressure medium line and the pressure medium can accordingly pass the valve arrangement.

In other words, the valve arrangement can have a closed position and an open position. The closed position can correspond to the disengaged position of the control piston. The open position can correspond to the engaged position of the control piston. However, it is understood that in the "closed position", the pressure medium path or the pressure medium line does not necessarily have to be shut off. On the contrary, the valve arrangement is in the "closed position" if a reduced pressure or no substantial pressure is present at an inlet of the housing part. If the pressure rises at the inlet of the housing part and exceeds a holding force of the control piston, this can be moved from the disengaged position to the engaged position. The valve arrangement can be brought into the open position in this way.

The discharge element can be designed to be bowl-shaped, sleeve-shaped or cup-shaped, for example, and be formed to take up or enclose the control piston at least in sections in the engaged position. In the engaged position, the pressure medium can flow through the inlet into the housing part, flow through the control piston through the flow channel and exit the valve arrangement through the outlet of the discharge element.

The valve arrangement can also generally be described as a switching valve. An activation of the open position or a passage position of the valve arrangement can preferably be triggered by the adjacent pressure medium itself. Accordingly it is not absolutely necessary to control the valve arrangement by a separate control line to activate this if required. The valve arrangement is autonomously activatable and preferably also autonomously deactivatable. The valve arrangement can be deactivated, for instance, when the pressure of the pressure medium flowing through the valve arrangement drops.

A pressure control process or a pressure adjustment process usually only takes place sporadically, for example in a period corresponding to a few percent of an overall operating duration, preferably less than one percent of the overall operating duration of the vehicle. It is accordingly advantageous to actually only create a contact or engagement between the control piston and the discharge element when it is necessary for adjusting the pressure.

According to another configuration of the valve arrangement, the control piston has an inlet-side end and an outlet-side end facing away from the inlet-side end, wherein the force application surface is formed as an axial surface, in particular at the inlet-side end, and wherein a pressure medium channel is formed on the control piston between the inlet-side end and the outlet-side end. A force acting on the control piston depends, for example, on the current pressure of the pressure medium as well as on a ratio between the axial surface of the force application surface and a cross section of the pressure medium channel.

According to another configuration, a substantially pressure-tight contact exists between the control piston and the discharge element in the engaged position, wherein in the disengaged position a defined distance is formed between the control piston and the discharge element. In other words, the control piston can have a defined stroke, for example, which corresponds to its movement between the engaged position and the disengaged position. A substantially pressure-tight contact is usually accompanied by a certain wear or a certain friction when the components involved complete a movement relative to one another. However, since the valve arrangement can be activated selectively, the pressure-tight contact only exists if a pressure medium supply or a pressure medium adjustment is actually to take place. At other times no contact ideally exists between the control piston and the discharge element. The friction between the control piston and the discharge element in the disengaged position can accordingly then be eliminated completely or almost completely.

According to another configuration, a sealing arrangement is provided at least on the discharge element or on the control piston, which arrangement comprises at least one sealing element, in particular a shaft seal, wherein the sealing element brings about sealing between the control piston and the discharge element in the disengaged position of the control piston. In this way, the pressure medium can be guided through the valve arrangement substantially without pressure losses in the engaged position. The sealing element is not subject to any excessive wear, as it is usually only in sealing contact in the engaged position.

According to a further development of this configuration, the sealing arrangement has a lubricant reservoir for a lubricant, wherein the sealing arrangement is formed to deliver a quantity of lubricant to lubricate a contact surface during the movement between the disengaged position and the engaged position. For example, the sealing arrangement with the lubricant reservoir can be taken up in principle on the discharge element. The control piston can accordingly contact the sealing arrangement on its transition between the disengaged position and the engaged position, usually during an axial movement. The piston can contact a sealing surface, for instance a sealing lip, of the sealing arrangement and be displaced axially relative to this.

It is advantageous if the lubricant reservoir delivers at least minimal quantities of the lubricant, in order to moisten or to lubricate contact points resulting between the control piston and the sealing arrangement. This can considerably reduce the wear of the components involved during the control movement, thus the axial movement of the piston. However, the lubrication can also have an advantageous effect on a relative movement between the control piston and the discharge element in the engaged position. If a vehicle which is provided with such a valve arrangement is moved, for instance, a relative rotation can result between the discharge element and the housing part, consequently between the discharge element and the control piston. It is therefore advantageous if the resulting contact point is also moistened in this regard.

The sealing arrangement can generally be formed for radial sealing. However, it is also conceivable that the sealing arrangement is formed for axial sealing. It is understood fundamentally that the sealing arrangement can be fixed also on the control piston, for instance, and can be moved with this relative to the discharge element, in order to move the control piston between the engaged position and the disengaged position. A lubricant reservoir can work advantageously in this configuration also.

According to another configuration, a lubricant reservoir is formed on the housing part for a lubricant, wherein during the movement of the control piston between the disengaged position and the engaged position in the housing part, a quantity of lubricant is delivered for lubricating a contact surface of the control piston. The lubricant reservoir in the housing part can lubricate an axial sliding movement of the control piston relative to the housing part in particular. The friction and wear can thus be minimised even with this pairing.

According to another configuration, the valve arrangement also has at least one pretensioning element, in particular a spring element, which is formed to load the control piston in the direction of the disengaged position. The pretensioning element can be taken up, for example, on the housing part or be supported on this and define a closing force on the control piston. In other words, in this configuration the pretensioning force of the pretensioning element must be overcome to move the control piston from the disengaged position to the engaged position. A precise and transparent switching characteristic of the valve arrangement can be produced in this way. It is further ensured that only a sufficiently high pressure, accompanied by a certain switching force, can cause the activation of the valve arrangement.

According to another configuration, the control piston is taken up in a rotation-proof manner in the housing part. The control piston can be prevented in this way from rotating relative to the housing part. It is preferred, however, that the housing part with the control piston taken up thereon or therein rotates jointly if required relative to the discharge element. This can entail the housing part and the control piston being stationary and the discharge element rotating. A rotation lock can be brought about, for instance, by a non-rotationally symmetrical cross section of the control piston and housing part. Guide elements can also be introduced to suppress rotations of the control piston relative to the housing part.

According to another configuration of the valve arrangement, a latching element is further provided on the housing part, which can be coupled to a counter-element on the control piston to cause an increase in a retaining force of the control piston in the engaged position.

The latching element and the counter-element can be formed by latching balls and corresponding ball receptacles, for example. Other types of latching elements, for instance in the form of spring washers or similar designs, are conceivable. The switching characteristic of the valve arrangement can be improved further by the latching element and the counter-element. In particular, the control piston can remain in the engaged position even when the pressure medium or pressure means flowing through the control piston is subject to pressure variations.

The spring element can thus ensure, for example, that the control piston is moved definitively in the direction of the disengaged position especially when no further pressure medium flows at the inlet of the housing part. With the counter-element, the latching element can further help to ensure that such a reset movement is not triggered in the event of small pressure variations or pressure drops in the pressure medium flowing through.

According to another configuration of the valve arrangement, an axially deformable sealing element is provided between the control piston and the housing part, in particular a plate-shaped sealing element at the inlet-side end of the control piston, wherein the sealing element is deformable under pressure loading to seal a circumferential gap between the control piston and the housing part.

The sealing element can be formed, for example, as a curved or spherical gasket. The sealing element can be manufactured from an elastic material, for instance, in particular from an elastomeric material. The sealing element can be axially upstream of the inlet-side end of the control piston. The sealing element can deform, for example, under the influence of the pressure medium. For example, the pressure medium can act indirectly on the force application surface via the sealing element. This can include, for instance, the control piston being moved initially from the disengaged position to the engaged position by the influence of the pressure medium. If no further movement of the control piston is enabled there, the pressure that continues to be present, which is attributable to the pressure medium, can cause a deformation of the sealing element, in particular a flattening of the initially somewhat curved sealing element. A circumference of the sealing element can protrude radially in this way and come into contact with a housing wall of the housing part. The circumferential gap between the control piston and the housing part can be sealed even better in this way.

According to another configuration of the valve arrangement, the force application surface is formed on the outlet-side end of the control piston, in particular as an axial surface, wherein the control piston is formed to be acted upon by the pressure medium via the force application surface in the direction of the inlet-side end of the control piston, in order to move the control piston from the disengaged position to the engaged position.

In other words, this configuration is based on the fact that the piston is extended from the perspective of the housing part in the disengaged position. In the engaged position, the control piston is retracted from the housing part perspective. This can be understood as a modification of or alternative to a basic configuration, in which the control piston is extended from the perspective of the housing part in the engaged position.

In said configuration, the pressure medium thus flows initially through the control piston, in order then to act "from behind" on the force application surface of the control piston to move this into the engaged position. This configuration can be developed further by the housing part having a tubular attachment, which extends at least in sections into the pressure medium channel of the control piston. It can be avoided in this way that the pressure medium acts on an axial surface of the control piston facing the housing part. As part of this configuration, a development is accordingly also conceivable in which the control piston is taken up movably "externally" on the housing part relative to this.

According to another configuration, the control piston has a radial outlet opening, wherein the pressure medium exits the control piston in a substantially rebound-free manner in the engaged position, in particular free of axial rebound. In other words, the pressure medium channel in the control piston can have at least one deflection, so that although the pressure medium can flow axially through the control piston, it is also deflected, in order to exit the control piston radially. This can advantageously be accompanied by the control piston being able to remain in an even more defined manner in the engaged position. To be precise, if the pressure medium exits the control piston axially, an axial rebound can occur that can basically act on the control piston in the direction of the disengaged position. With a radial exit or outlet on the control piston, an axial rebound of this kind can be minimised or even avoided altogether.

According to a development of this configuration, the radial outlet opening is arranged in the engaged position between two sealing elements that are arranged axially offset from one another. The sealing arrangement can be arranged in this way in the form of a sealing sleeve, in order to discharge the pressure medium from the control piston through the discharge element via a circumferential gap. This configuration can help to minimise axial rebound forces on the control piston further.

According to another configuration of the valve arrangement, the control piston has a taper, in particular a conical taper, at its outlet-side end. The taper can function in particular as an insertion aid. In other words, the taper can simplify the movement of the control piston towards the sealing arrangement. The taper at the outlet-side end can further reduce the wear of the sealing arrangement.

According to another configuration of the valve arrangement, the control piston is taken up in the housing part as a double-acting control piston, wherein the control piston comprises a reset surface, which can be acted upon by a reset pressure medium in the direction of the disengaged position, which medium can be supplied to the housing part via a reset connection. According to this configuration, the valve arrangement can be activated by the pressure medium that is to flow through the valve arrangement. The valve arrangement can be deactivated by the reset medium, which can be supplied to the valve arrangement via the reset connection. In other words, the reset pressure medium can assume or at least supplement the function of the pretensioning element. The configuration as double-acting control piston permits flexible control of the valve arrangement. Put another way, the valve arrangement can be activated or deactivated selectively as a function of a pressure difference between the pressure medium and the reset pressure medium. The control piston can thus be moved actively from the disengaged position to the engaged position on the one hand and likewise actively back to the disengaged position on the other hand.

According to another configuration, the valve arrangement has a flow body, which is fixed in particular on the housing part and is arranged between the inlet of the housing part and the control piston, wherein the flow body has a head and a shaft, wherein the shaft protrudes in the disengaged position into the flow channel of the control piston and seals this, and wherein a flow gap is formed between the shaft and the control piston in the engaged position.

According to another configuration of the valve arrangement, a sealing body is further formed on the control piston, in particular a disc-shaped sealing body, wherein the sealing body contacts a wall section of the housing part and has on its side facing the inlet of the housing part a recess, in particular a circumferential axial groove, which defines a thin wall piece of the sealing body that is deformable by the adjacent pressurised pressure medium to seal the control piston against the housing part.

According to another configuration, the valve arrangement also has a closing element, in particular a pin, which at least partially blocks the flow channel of the control piston in the disengaged position. In particular, the closing element can be attached to the housing part and extend into the pressure medium channel in the control piston.

According to a development of this configuration, the closing element is fixed on the housing part, wherein the closing element protrudes into the flow channel of the control piston and has a conical tip, which reduces an annular gap between the control piston and the closing element in the disengaged position and in the engaged position enlarges the annular gap between the control piston and the closing element.

This configuration can at least partially close the flow channel of the control piston in the disengaged position, for instance. This can prevent the ingress of foreign bodies or pollution. This can be advantageous in particular if the discharge element is remote from the valve arrangement, thus the control piston, especially its outlet-side end, is substantially freely accessible.

For example, the closing element can comprise an outer cone. The flow channel of the control piston can comprise an inner cone, which is oriented in the same sense as the outer cone of the closing element. The outer cone and the inner cone can be axially aligned in the disengaged position relative to one another in such a way that the annular gap between the control piston and the closing element is virtually or completely closed. An axial displacement of the control piston on the transition from the disengaged position to the engaged position can cause an axial movement between the outer cone and the inner cone. The annular gap can accordingly be released, due to which a flow cross section is enlarged.

Another advantageous configuration can be seen in that, instead of a fixed stop for the control piston in the housing part, which defines a longitudinal position of the control piston in the engaged position with a high degree of repetition accuracy, a so-called "elastic" stop is provided. This aspect is based substantially on the fact that a stop for the control piston in the engaged position can possibly increase the wear on a running surface of the control piston and on correspondingly associated sealing elements or sealing lips of the sealing arrangement in the case of the discharge element if the same (longitudinal) section of the control piston repeatedly comes to rest on corresponding counter-elements.

It can therefore be advantageous to deliberately provide a "soft" buffer or stop, so that the position of the control piston in the engaged position is not reproduced with absolute repetition accuracy on each shift between the disengaged position and the engaged position. In other words, a sufficiently "elastic" stop can ensure that the longitudinal position of the control piston changes minimally relative to the sealing element and to the sealing arrangement of the discharge element from case to case. At any rate, it is preferred if, on shifting from the disengaged position to the engaged position, exactly the same longitudinal position does not result every time for the control piston. This can reduce the wear on the control piston, but in particular also the wear on the sealing arrangement, especially on its sealing elements or sealing lips. It should be emphasised again in this context that at least when the vehicle moves, the wheel body side can complete a rotational movement relative to the carrier side.

Such an elastic stop can be brought about on the one hand by a pretensioning element, for instance, which acts upon the control piston fundamentally in the direction of its disengaged position, being designed so that the pretensioning element itself defines a (soft) stop for the control piston. It is understood that, depending on the pressure of the air flowing into the valve arrangement, the control piston can compress the pretensioning element more or less. The position of the control piston in the engaged position is accordingly advantageously not defined with exact repetition accuracy.

However, in order to be able to determine a sufficiently precisely defined area, in which in turn the actual position of the control piston is not reproducible with repetition accuracy, a special design of the pretensioning element can be advantageous. For example, the pretensioning element can have sections with increased stiffness and sections with reduced stiffness in this connection. For instance, this can lead to the situation that, although a defined force on the pretensioning element applied by the inflowing air or inflowing fluid compresses the sufficiently elastic section of the pretensioning element in a defined manner, the stiffer section of the pretensioning element is only minimally deformed. This results on the one hand in a high operational reliability being guaranteed, as a secure transition from the disengaged position to the engaged position is always guaranteed when the pressure medium (fluid, compressed air)

flowing in exceeds certain threshold values with respect to the flow quantity or the pressure. Conversely, however, (relatively small) variations in the fluidic properties (pressure, flow volume, etc.) of the pressure medium lead to small position shifts of the control piston in the engaged position.

Instead of a single pretensioning element, which is provided with sections configured in different ways, a combination of several pretensioning elements is conceivable. For example, a pretensioning element formed as a spring with a substantially constant force-displacement characteristic can be combined with a considerably stiffer element, for instance with a buffer element. The pretensioning element itself, thus the spring, for example, can accordingly guarantee adequate functional reliability when the incoming medium acts upon the control piston, in order to move the valve arrangement from the disengaged position to the engaged position. However, the control piston can now come to rest on the buffer element and compress or deform this further.

However, the buffer element advantageously has a much higher stiffness than the pretensioning element. On the one hand, the desired position of the control piston in the engaged position is accordingly guaranteed sufficiently reliably, wherein on the other hand, however, inevitably occurring pressure variations or other variations in the incoming pressure medium cause minimal position changes or position adjustments in the control piston. Many relative position associations that deviate minimally from one another can accordingly result between the control piston and the discharge element or the sealing arrangement. "Entry points" on the control piston can be avoided in this way, that not always precisely one and the same section of the control piston comes into engagement with corresponding sealing elements or sealing lips of the sealing arrangement.

Other configurations of the valve arrangements can accordingly also have an elastic stop, which defines a target position of the control piston in the engaged position with sufficient positional vagueness. The elastic stop can be formed by the pretensioning element, in particular by a section of the pretensioning element with higher stiffness. A development can further consist in the elastic stop being formed separately to the pretensioning element, preferably as a buffer, and in the engaged position of the control piston being connected parallel to the pretensioning element or in series with the pretensioning element and contacting the control piston for position fixing.

Another advantageous aspect of a configuration according to the present disclosure can be seen in the fact that a part that rotates in operation of the vehicle, for instance, can be provided with functional elements, which can effectively minimise or even completely prevent lubricant from being "thrown out" due to the centrifugal forces accompanying the rotation.

As already stated several times above, a so-called rotationally fixed transition according to some configurations of the present disclosure has a so-called carrier side and a so-called wheel body side, which can rotate relative to one another at least in operation of the vehicle. Operating states are accordingly conceivable in which, in particular, the control piston contacts sealing elements or control elements, which can rotate relative to the control piston. This would lead in principle to a lubricant or lubricating means, for instance, which is provided in a lubricant reservoir on the relevant element, being pushed "outwards" on account of the centrifugal forces, thus away from its actual contact with the control piston.

It can therefore be advantageous to provide a so-called tensioning arrangement, which is formed to produce forces counteracting the centrifugal force, which forces load the lubricant or a lubricant reservoir provided with the lubricant in the direction of the control piston. To this end a tension ring can be provided, for example, which consists of an elastic material. The tension ring can be placed on the lubricant reservoir, for instance, and generally compress this and/or generate corresponding central forces (centripetal forces).

Other configurations can concern lubricant pockets, for instance, which are coupled externally to spring elements acting radially inwards. A configuration of this kind can be executed similar to a spring-loaded centrifugal governor, for example. Spring elements can be installed accordingly that fundamentally produce a force directed inwards onto the lubricant reservoir or pockets provided with the lubricant and load this in principle in the direction of the control piston. In the case of corresponding relative rotations accompanied by centrifugal forces between the control piston and the lubricant reservoir, this can ensure that at least a defined minimal quantity of the lubricant can always moisten the control piston.

It can accordingly be advantageous according to at least one development of the valve arrangement if at least one lubricant reservoir, which executes a relative rotation with regard to the control piston at least in some operating states, is provided with a tensioning arrangement, which exerts a force acting radially in the direction of the control piston on lubricant taken up in the lubricant reservoir. By way of example, the tensioning arrangement of the lubricant reservoir comprises an elastic tension ring, which encloses at least one lubricant pocket and produces a centripetal force in the direction of the control piston. The tensioning arrangement of the lubricant reservoir can also comprise at least one lubricant pocket, which is coupled to a spring at its end facing away from the control piston, which spring produces a centripetal force via a pressure piece in the direction of the control piston, which force acts on the lubricant pocket.

According to another configuration, the valve arrangement further has an asymmetrically designed lubricant reservoir, which surrounds the control piston at least in sections, wherein the lubricant reservoir is configured eccentrically in relation to the control piston.

Such a design is advantageous if the valve arrangement, in particular parts thereof associated with the carrier side, are fitted in a defined rotary orientation or angular orientation. The lubricating means or lubricant in the lubricant reservoir can easily be topped up in this way to replace used lubricant that is discharged due to the contact of the control piston with the lubricant reservoir. If the control piston is moistened in each extension process and retraction process, minimal quantities of the lubricant are moved away from the lubricant reservoir. The lubricant reservoir is preferably designed so that the lubricant can be added automatically with the aid of gravity (gravitational force).

According to a development of this configuration, the lubricant reservoir has an enlarged accumulation section, the center of gravity of which in the fitted state is oriented above a height level of a longitudinal axis of the control piston. The center of gravity can be a center of mass, but also a geometrical focal point. The lubricant can be oily or greasy and embedded in a carrier substance, in particular an absorbent porous carrier matrix. The carrier substance can be configured to be sponge-like, for instance. A greasy lubricant can be taken up in principle in the lubricant reservoir even without such a carrier substance.

According to a development of this configuration, the lubricant reservoir is oriented so that in operation the lubricant flows aided by gravity from the accumulation section in the direction of the control piston to replace used lubricant.

A larger quantity of the lubricant is preferably arranged "above" the longitudinal axis of the control piston. In the sense of this disclosure, "above" describes that area from which the lubricant can flow autonomously due to gravity or under the influence of gravity in the direction of the control piston.

According to another configuration, the valve arrangement also has at least one sealing element, which protects a lubricant reservoir for the control piston from an increased pressure level due to the incoming pressure medium, wherein the at least one sealing element is preferably fixed in the housing part and arranged between the lubricant reservoir and the carrier-side end of the control piston.

The sealing of the lubricant reservoir by the sealing element has the advantage that the lubricant reservoir and the lubricant taken up or embedded therein is not directly exposed to the increased pressure of the pressure medium. It can favourably influence the lubricant consumption. Ideally a minimal quantity lubrication can be achieved. Furthermore, the risk of contamination falls, as lubricant under pressure would be conducted or pressed out of the interior of the housing part in considerable quantities in the worst case.

Another advantage of the sealing element for the lubricant reservoir can consist in the fact that the control characteristics are improved, as the lubricant reservoir in this case does not form a buffer volume, or only forms an insubstantial one. A buffer volume fundamentally has a damping effect and can entail various dynamic effects that disadvantageously influence the control characteristics.

The object of the invention is further achieved by a pressure medium supply device for a tire of a wheel unit of a vehicle, which comprises a pressure medium path, which extends between a pressure medium supply unit on the vehicle side and a closing valve of the tire, wherein the pressure medium path comprises a rotationally fixed transition with a valve arrangement according to one of the aspects described above. The supply unit can comprise the production of a pressure medium put under pressure, the storage of the pressure medium and the delivery of the pressure medium to the pressure medium path. The pressure medium path can be understood as a pressure medium line or as a system of pressure medium lines. The rotationally fixed transition preferably supplies a rotary feedthrough for the pressure medium path, which permits a pressure medium line from a part of the vehicle on the chassis side or bodywork side to a part of the vehicle on the wheel body side.

According to a development of this configuration, the pressure medium supply unit is formed as a decentralised compressor unit in the area of an axle beam of the vehicle, wherein the pressure medium path extends between the compressor unit and the closing valve of the tire, and wherein the compressor unit supplies the pressure medium path with a pressurised pressure medium to activate the valve arrangement.

In other words, the valve arrangement is suitable in particular for a so-called decentralised distributed pressure medium supply system, which requires no central compressed air or pressure medium production unit. A decentralised pressure medium supply device can be advantageous as the line lengths, thus the required lengths of the pressure medium path, can be reduced in this way. If a pressure medium supply device (of suitably small dimensions) is associated with each wheel unit of a vehicle, for example, the pressure medium path required extends only between its compressor unit and the closing valve of the tire. Any rotationally fixed transition required can be realised, for example, as a rotary feedthrough by a valve arrangement according to one of the above aspects.

According to another configuration of the pressure medium supply device, a pressure reduction opening is provided in the pressure medium path, which causes a defined leak under pressure and can preferably be operated as a function of a pressure level in the pressure medium path between an open position, in which a small quantity of the pressure medium can escape, and a closed position, in which the pressure medium path is protected against external contamination.

The defined leak can simplify a reset movement of the control piston after a pressure control process. If namely the system, in particular the pressure medium path, were ideally sealed, a considerable pressure would be present in the pressure medium path following a control process, which would have to be overcome by the control piston to become disengaged, so that the wheel body side is separated as completely as possible from the carrier side. It is therefore advantageous to provide the system deliberately with a slight leak, so that the pressure in the pressure medium path is reduced when no pressure medium is flowing. Then the required reset force for the control piston also falls. This defined leak has no substantial effects on the control process and on the pressure achievable in the tire.

The pressure reduction opening can be arranged in principle anywhere in the pressure medium path, as long as a controlled pressure reduction is guaranteed if no pressure medium is flowing in the direction of the wheel. The pressure reduction opening is preferably self-regulating or designed to be self-adjusting and is controlled via the pressure in the pressure medium path.

According to a development of this configuration, the pressure reduction opening has a passage direction and a blocking direction. The pressure reduction opening can be configured in the manner of a non-return valve or a safety valve, but deliberately with a slight throughput. The pressure reduction opening is preferably configured as a membrane seal. Alternatively or in addition, the pressure reduction opening can have a grommet-like design. It is preferable that the pressure reduction opening is closed if no excess pressure or only a slight excess pressure prevails in the pressure medium path. This has the advantage that no contamination from outside can then get into the pressure medium path.

The pressure reduction opening can be designed similar to a hose nozzle, for example, and be formed from a sufficiently flexible material. The pressure reduction opening can be designed similar to a slotted membrane and when a certain excess pressure is present, can facilitate a defined transfer of the pressure medium to the outside to bring about a desired pressure reduction.

The object of the invention is further achieved by a wheel unit with a rim body with a tire, with an axle beam, wherein the rim body and the axle beam are coupled to one another via a wheel bearing, and with a pressure medium path with a rotationally fixed transition, which comprises a valve arrangement according to one of the above aspects.

The wheel unit can be linked to a central pressure medium supply device or a decentralised distributed pressure medium supply device.

It is understood that the features of the invention named above and yet to be explained below can be used not only in the respective combination specified, but also in other combinations or alone without departing from the scope of the present invention.

BRIEF DESCRIPTION OF THE DRAWINGS

Other features and advantages of the invention result from the following description of several preferred practical examples with reference to the drawing. The figures show:

FIG. 4 schematic, highly simplified sectional views of another embodiment of a valve arrangement, in a disengaged and an engaged position;

FIG. 5 schematic, highly simplified sectional views of another embodiment of a valve arrangement, in a disengaged and an engaged position;

FIG. 5a schematic, highly simplified axial sectional views along the line Va-Va in FIG. 5 for illustrating cross-sectional shapes;

FIG. 6 schematic, highly simplified sectional views of another embodiment of a valve arrangement, in a disengaged and an engaged position;

FIG. 6a schematic, highly simplified sectional views through the valve arrangement according to FIG. 6 along the line VIa-VIa for illustrating cross-sectional configurations;

FIG. 7 schematic, highly simplified sectional views of another embodiment of a valve arrangement, in a disengaged and an engaged position;

FIG. 22 schematic, highly simplified sectional views of another embodiment of a valve arrangement, in the transition between a disengaged and an engaged position;

FIG. 22a a schematic, highly simplified axial sectional view along the line XXIIa-XXIIa in FIG. 22 for illustrating a cross-sectional configuration;

FIG. 25 schematic, highly simplified sectional views of another embodiment of a valve arrangement, in a disengaged and an engaged position;

FIG. 25a a schematic, highly simplified sectional view along the line XXVa-XXVa in FIG. 25 for illustrating a cross-sectional configuration;

FIG. 26 a sectional view of a wheel unit for illustrating a practical example of a pressure medium supply device;

FIG. 26a schematic, highly simplified sectional views of a non-return valve;

FIG. 26b schematic, highly simplified sectional views of an embodiment of a valve arrangement for use in the pressure medium supply device according to FIG. 26;

FIG. 27 another sectional view of a wheel unit for illustrating a practical example of a pressure medium supply device;

FIG. 27a a schematic, highly simplified sectional view of a non-return valve;

FIG. 27b schematic, highly simplified sectional views of another embodiment of a valve arrangement for use in the pressure medium supply device according to FIG. 27;

FIG. 33 schematic, highly simplified sectional views of another embodiment of a valve arrangement, in a disengaged and an engaged position;

FIG. 33a a schematic, highly simplified sectional view along the line XXXIIIa-XXXIIIa in FIG. 33 for illustrating a cross-sectional configuration;

FIGS. 33b and 33c schematic, highly simplified sectional views of embodiments of a valve arrangement that are modified compared with the configuration according to FIG. 33a;

DETAILED DESCRIPTION

Figure 1:
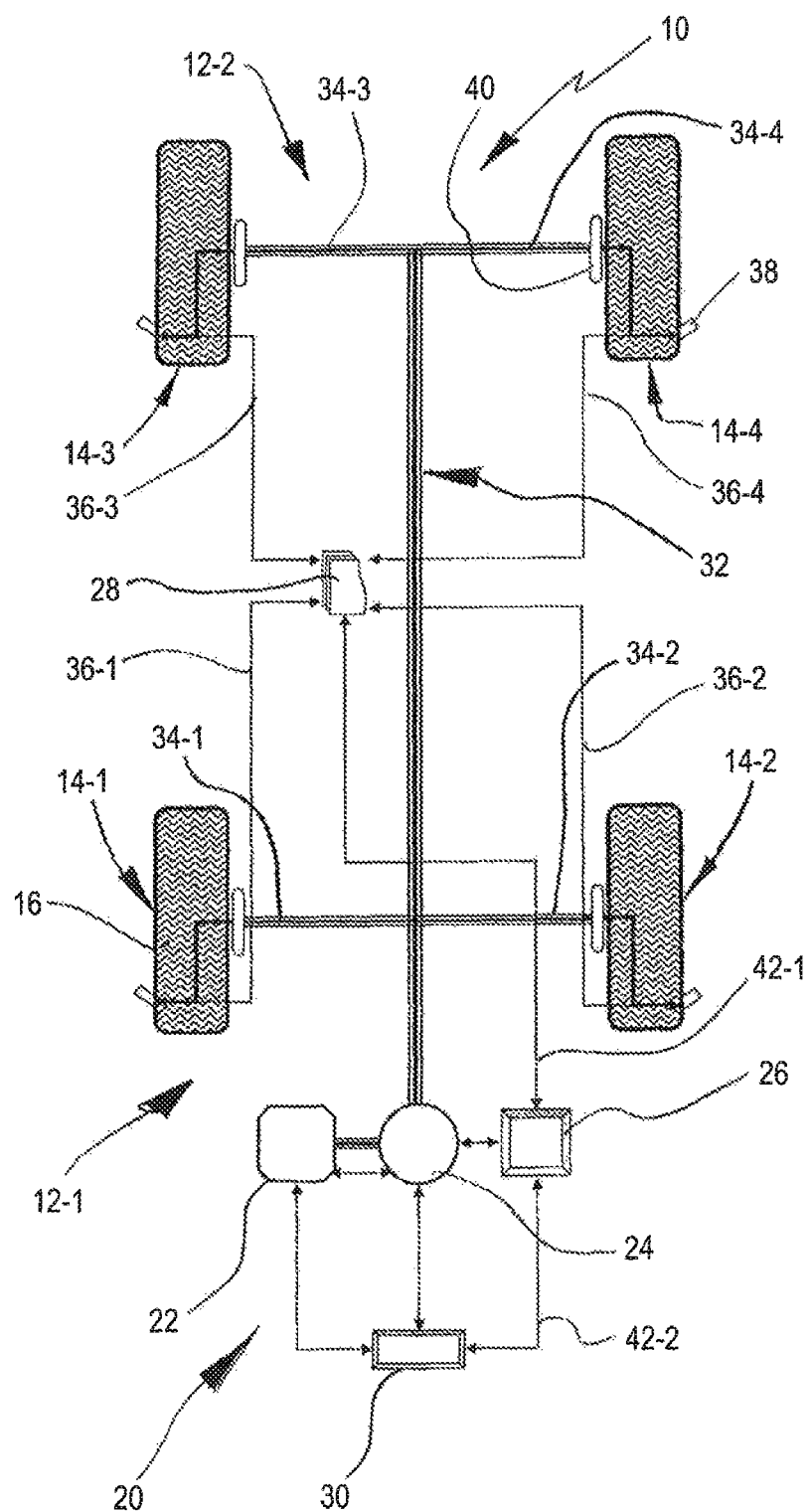
FIG. 1 a highly simplified schematic view of a vehicle with a pressure control system with a central pressure medium supply system.

FIG. 1 shows a highly simplified schematic view of a vehicle, which is designated 10 overall. The vehicle 10 can be a car, a utility vehicle and generally also a land vehicle. The vehicle 10 has a plurality of axles 12-1, 12-2, with which wheel units 14-1 to 14-4 are respectively associated in pairs and comprise tires 16. The tires 16 can be filled with air in particular. The tires 16 can also be filled in principle with other gases too, for instance with nitrogen.

To adjust or control the pressure in the tires 16, the vehicle 10 has a pressure medium supply system 20. The pressure medium supply system 20 can comprise, for example, a compressor 22, a buffer or store 24 and a control unit 26. The pressure medium supply system 20 can further be provided with a control element 28, which is formed, for instance, as a data collection point. The control element 28 is coupled, for example, via signal lines 36 to sensors (not shown in FIG. 1) on the wheel units 14. An actual pressure level can be determined via the sensors and supplied to the control unit 26.

The pressure medium supply system 20 can further comprise an operator interface 30, via which a user can make inputs. The operator interface 30 can also be designed to display information to the user.

The pressure medium supply system 20 is configured by way of example as a central system. The compressor 22 and the buffer 24 are coupled to the wheel units 14 by a central compressed air line 32 and by compressed air line branches 34-1 to 34-4 linked thereto. Compressed air (or generally: a pressure medium) can be supplied to the tires 16 of the wheel units 14 via the lines 32, 34. The compressed air or the pressure medium can be introduced into the tires 16 via closing valves 38. A control system 40, which can be formed, for instance, to regulate the pressure or the filling level of the tires 16, can be associated respectively with the wheel units 14. The control systems 40 can comprise valve arrangements or similar.

The pressure medium supply system 20 can further have control lines 42-1, 42-2, which can function as central control lines and can link the control element 28, the control unit 26 and the user interface 30 to one another, for instance.

A practical example of a wheel unit 14 for a central pressure medium supply system 20 is illustrated by way of example further below with reference to FIG. 27. However, it is also conceivable generally to provide so-called decentralised, distributed pressure medium supply systems on the vehicle 10. These are distinguished, for instance, by the fact that at least some of the wheel units 14, preferably each of the wheel units 14, comprises its own pressure medium supply device with its own compressor. A wheel unit 14 for such a system is illustrated further below with reference to FIG. 26.

A design challenge in the case of pressure medium supply systems 20 is often a so-called rotationally fixed transition in a pressure medium path. The wheel units 14 are namely basically taken up at least partially twistably or rotatably on the vehicle 10. A connection for the lines 34 between the fixed, chassis-side part of the vehicle 10 and the tires 16 of the wheel units 14 is accordingly associated with constructive challenges.

Various configurations of valve arrangements 48 for rotationally fixed transitions 46 are illustrated with reference to FIGS. 2 to 27b and provide conceivable solutions for this objective.

Figure 2:
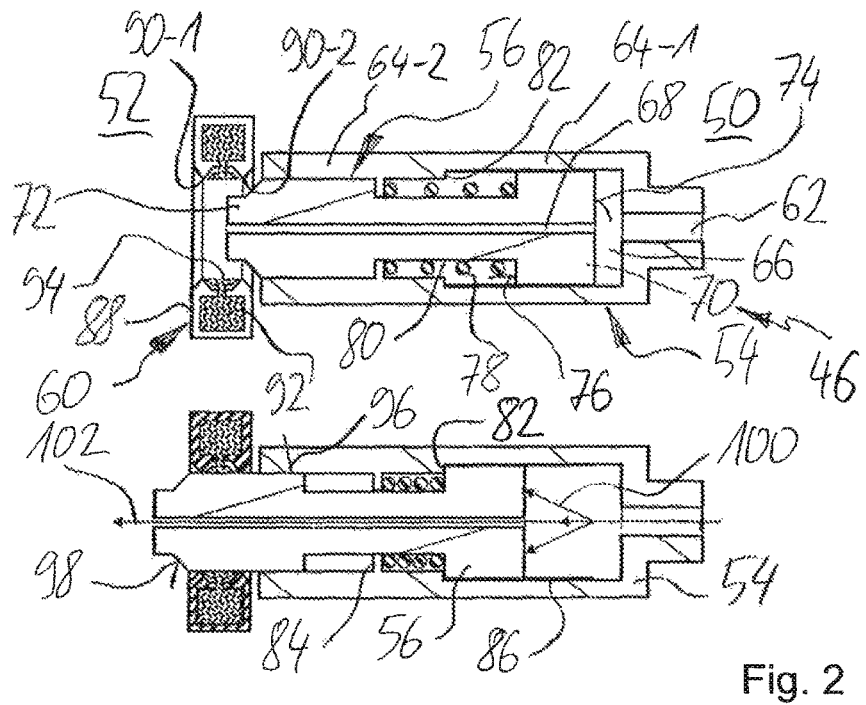
FIG. 2 schematic, highly simplified sectional views of an embodiment of a valve arrangement, in a disengaged position and an engaged position.

FIG. 2 illustrates two shift positions of a control piston 56, which is taken up movably in a housing part 54. As an example, the housing part 54 can be taken up with the control piston 56 on a carrier side 50 of a wheel unit 14 (cf. also FIGS. 15 and 16). The control piston 56 can cooperate with a discharge element 58, which is arranged on a wheel body side 52 of the wheel unit 14. The discharge element 58 is not shown in FIG. 2 for reasons of visualisation, but cf. FIG. 3 among others relating to this. Components of the wheel body side 52 on wheel units 14 for vehicles 10 are usually taken up rotatably relative to the carrier side 50. A valve arrangement 48, comprising a housing part 54, a control piston 56 and a discharge element 58 can form a rotationally fixed transition 46, which makes possible a pressure medium line from the carrier side 50 to the wheel body side 52, cf. in particular FIG. 3.

It is understood that at least the substantial components of the valve arrangement 48, thus the housing part 54, the control piston 56 and the discharge element 58 can generally be designed as a single piece, but also in multiple pieces. Each of the components 54, 56, 58 can basically be formed in turn from sub-components, which are joined to one another. It is understood that at least some of FIGS. 1 to 16b have a highly simplified schematic representation for visualisation purposes. However, the essential principles of the present disclosure can be described with reference to this representation and explained with a required degree of detail.

The housing part 54 and the control piston 56 are described in greater detail with reference to FIG. 2. The control piston 56 is taken up movably in the housing part 54 and is formed to cooperate with a sealing arrangement 60, in order to conduct a pressure medium through the valve arrangement 48 if required.

The housing part 54 has an inlet 62, via which the pressure medium can flow into the housing part 54. The housing part 54 can also have at least one circumferential section 64-1, 64-2. At least one of the circumferential sections 64-1, 64-2 can provide a guide surface for the control piston 56.

The control piston 56 has a pressure medium channel or channel 68 that extends between a carrier-side end 70 and a wheel-body-side end 72 of the control piston 56. A gap 66 is formed between the carrier-side end 70 and the housing part 54. An end face of the control piston 56, which is formed on its carrier-side end 70 and faces the inlet 62, can be described as a force application surface 74. The pressure medium introduced through the inlet 62 can act on the force application surface 74 to move the control piston 56 between a disengaged position (top illustration in FIG. 2) and an engaged position (bottom illustration in FIG. 2).

If no sufficiently large pressure is applied to the force application surface 74, the control piston 56 can be displaced into its disengaged position by way of a pretensioning element 78, which is formed as a spring, for instance. The pretensioning element 78 can act on a reset surface 76 of the control piston 56 for this purpose. The pretensioning element 78 can be taken up on a stepped section 80 of the control piston 56. The pretensioning element 78 can also be supported on a web 84 of the housing part 54. According to the lower illustration in FIG. 2, the control piston 56 can come to rest in its engaged position on a stop 82. For example, the reset surface 76 can contact the stop 82 in the engaged position. The control piston 56 thus has a defined position in the engaged position. A defined position can likewise result in the disengaged position of the control piston 56 if a corresponding stop face of the piston 56 (not described in greater detail in FIG. 2) comes to rest on the web 84 of the housing part 54, cf. also the top illustration in FIG. 2.

A rotation lock 86 can be formed between the control piston 56 and the housing part 54 in at least one circumferential section 64-1, cf. also FIG. 5 and FIG. 5a. The rotation lock 86 can prevent a relative rotation between the control piston 56 and the housing part 54.

In the engaged position, the control piston 56 can cooperate with at least one sealing element 88 of the sealing arrangement 60. The sealing element 88 can be designed for instance as a shaft seal or designed in a similar manner. The sealing element 88 can have at least one sealing lip 90-1, 90-2, preferably two sealing lips 90-1, 90-2, which can each bring about a linear contact with a guide surface or contact surface 96 of the control piston 56. An adequate tightness of the control piston sealing arrangement pairing is guaranteed in this way in the engaged position (lower illustration in FIG. 2).

The at least one sealing element 88 of the sealing arrangement 60 can have a lubricant reservoir 92, in which a quantity of a lubricant 94 is stored, for instance a lubricating grease or lubricating oil. The lubricant reservoir 92 can be designed in principle as a chamber. However, the lubricant reservoir 92 can also be formed by a porous medium, which has a plurality of recesses in which the lubricant 94 can be stored. The sealing element 88 can have on its side facing the control piston 56 in the engaged position at least one recess, through which the lubricant 94 can be delivered to its contact surface 96. Lubrication of the contact surface 96 can result in this way upon each activation or deactivation of the valve arrangement.

The control piston 56 can have a taper 98 at its wheel-body-side end 72, for instance a conical taper. The taper 98 can simplify the insertion of the control piston 56 into the sealing arrangement 60, in particular the contacting of the sealing lips 90.

In FIG. 2, the pressure medium entering at the inlet 62, which flows into the gap 66, is designated 100 by way of example. The pressure medium flowing out is designated 102.

Figure 3:
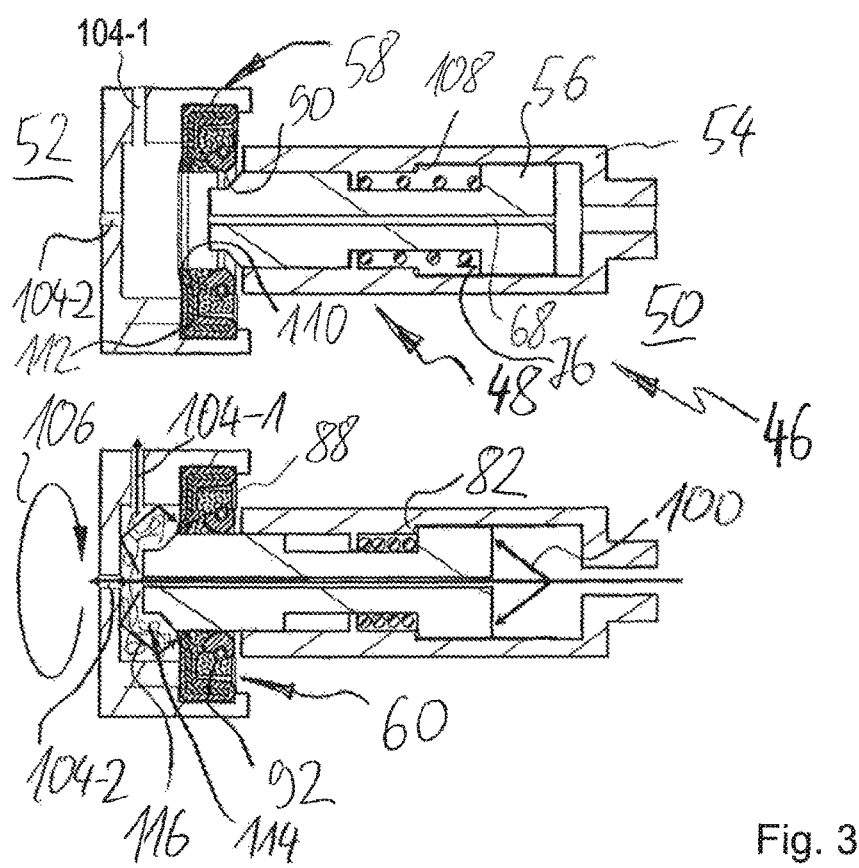
FIG. 3 schematic, highly simplified sectional views of another embodiment of a valve arrangement, in a disengaged and an engaged position.

FIG. 3 illustrates a configuration of a valve arrangement 48 for a rotationally fixed transition 46, which comprises in a manner already described in general a housing part 54, a control piston 56 taken up in or on the housing part 54 and a discharge element 58, with which the control piston 56 can cooperate in its engaged position (lower illustration in FIG. 3). The discharge element 58 can be designed bowl-shaped or pocket-shaped, for instance, and provide a take-up opening for the wheel-body-side end 72 of the control piston 56. The discharge element 58 can further provide a receptacle for the sealing arrangement 60. The sealing arrangement 60 with the at least one sealing element 88 can be taken up fixedly on the discharge element 58. The discharge element 58 has at least one outlet 104-1, 104-2 for the pressure medium.

The discharge element 58 is taken up together with the sealing arrangement 60 rotatably relative to the housing part 54 and the control piston 56, cf. an arrow designated 106. The discharge element 58 is associated with the wheel body side 52 and taken up rotatably on the carrier side 50 via a wheel bearing, for instance.

It can further be gathered from FIG. 3 that a sealing element 108, in particular a circumferential sealing element, can be provided on the reset surface 76 of the control piston 56 or on the stop 82 of the housing part 54. The sealing element 108 has the task of sealing the contact of the control piston 56 on the housing part 54 in the engaged position. It is ensured in this way that the pressure medium is conducted completely or virtually completely through the channel 68.

In FIG. 3 the sealing unit 60 is configured, for example, as a modified shaft seal. The sealing element 88 has a sealing lip 90 and a wiper lip 110. The wiper lip 110 can comprise a reinforcement 112, for example, which consists of metal, for instance. The reinforcement 112 can be plastic coated or rubber coated. The wiper lip 110 can provide a high closing force or sealing force. The sealing force or closing force of the wiper lip 110 can be further increased in the engaged position of the control piston 56 by the pressure medium, which fills a gap 114 created between the discharge element 58 and the control piston 56 in the engaged position, cf. also an arrow designated 116.

FIG. 4 shows another configuration of a valve arrangement 48, which is generally configured similarly to the valve arrangement 48 according to FIG. 3. However, in FIG. 4 a lubricant reservoir 118 is also provided in the housing part 54, which reservoir can provide lubricant to lubricate the control piston 56, in particular its contact surface 96. The lubricant reservoir 118 can comprise a porous or sponge-like material, for example, into which the lubricant is introduced. It is thus conceivable to fill the lubricant reservoir 118 with a sintered material, for example, which provides a plurality of cavities for receiving the lubricant.

FIG. 5 shows another exemplary configuration of a valve arrangement 48, which is configured generally similarly to the valve arrangement 48 according to FIG. 4. FIG. 5a illustrates sections through the housing part 54 and the control piston 56 to show different cross sections for illustrating a rotation lock 86-1 to 86-4. A relative rotation between the control piston 56 and the housing part 54 can be prevented by the rotation lock 86.

A configuration of the rotation lock 86 designated 86-1 comprises locating pins or similar, which extend parallel to a longitudinal axis of the control piston 56 in a contact area between the control piston 56 and the housing part 54. A configuration of a rotation lock designated 86-2 comprises a hexagonal profile. A configuration of a rotation lock designated 86-3 comprises a square profile. A configuration of a rotation lock designated 86-4 comprises a trapezoidal profile.

FIG. 6 illustrates another configuration of a valve arrangement 48, which is configured similarly to the valve arrangement 48 according to FIG. 5 in principle. FIG. 6a further illustrates various conceivable cross sections to show exemplary configurations of rotation locks 86-1, 86-2, 86-3 and 86-4. Their configuration is based fundamentally on the configurations according to FIG. 5a.

The valve arrangement 48 according to FIG. 6 is characterised in particular by a sealing element 122, which is arranged on the carrier-side end 70 of the control piston 56. The sealing element 122 can also be described as a deformable sealing element. The sealing element 122 is preferably formed of an elastic material, in particular of an elastomeric material. In the disengaged position (cf. top representation in FIG. 6) the sealing element 122 can be somewhat curved or deformed generally. An axial contact or axial pretensioning between the sealing element 122 and the housing part 54 can be reduced in this way.

In the engaged position of the control piston 56 (cf. lower representation in FIG. 6), a current pressure of the pressure medium acts also on the sealing element 122. The sealing element 122 can accordingly be deformed in the direction of the force application surface 74 and come to rest substantially flat on this. This can be accompanied by a slight increase in the circumference of the sealing element 122. A particularly good (external) sealing can be guaranteed accordingly between the control piston 56 and the housing part 54. It can be ensured in this way that the predominant portion of the pressure medium is conducted through the channel 68 in the control piston 56 towards the discharge element 58.

The valve arrangement 48 according to FIG. 6 is further distinguished by a latching element 124 and a counter-element 126 associated with the latching element 124. The latching element 124 can comprise latching balls, a spring washer or the like, for example. The counter-element 126 can comprise latching recesses, latching grooves or similar. The at least one latching element 124 is formed, for example, on an inner circumference of the housing part 54. The at least one counter-element 126 is formed, for example, on an outer circumference of the control piston 56. A reverse configuration is easily conceivable.

In the engaged position of the control piston 56 (cf. lower representation in FIG. 6), the latching element 124 and the counter-element 126 can cooperate in order to provide a retaining force for the control piston 56. Such a retaining force can be directed in principle against a reset force, which is produced by the pretensioning element 78. The pretensioning element 78 can guarantee a defined positional securing of the control piston 56 in the disengaged position. The latching element 124 and the counter-element 126 can provide a retaining force for the control piston 56 in the engaged position. It is understood that the retaining force, which can be provided by the latching element 124 and by the counter-element 126, is regularly smaller than the reset force, which can be produced by the pretensioning element 78.

FIG. 7 illustrates another configuration of a valve arrangement 48, wherein for visualisation reasons the representation of the housing part 54 was omitted. FIG. 7 shows a control piston 56, at the carrier-side end 70 of which a deformable sealing element 122 is arranged. The sealing element 122 is flattened in the engaged position (top representation in FIG. 7) and pretensioned in the direction of the force application surface 74. In the disengaged position of the control piston 56, the sealing element 122 can assume a natural, unloaded deformed configuration (cf. the lower representation in FIG. 7).

Provided on the discharge element 58 is a sealing arrangement 60 with a sealing element 88, which provides a first flat seal 130-1 and a second flat seal 130-2. The flat seals 130-1, 130-2 can also be described as trapezoidal seals, for instance. A lubricant gap 132-1, 132-2 is formed in the flat seals 130-1, 130-2, through which gap the lubricant 94 can be delivered in small quantities to the contact surface 96 of the piston 56.

Figure 8:
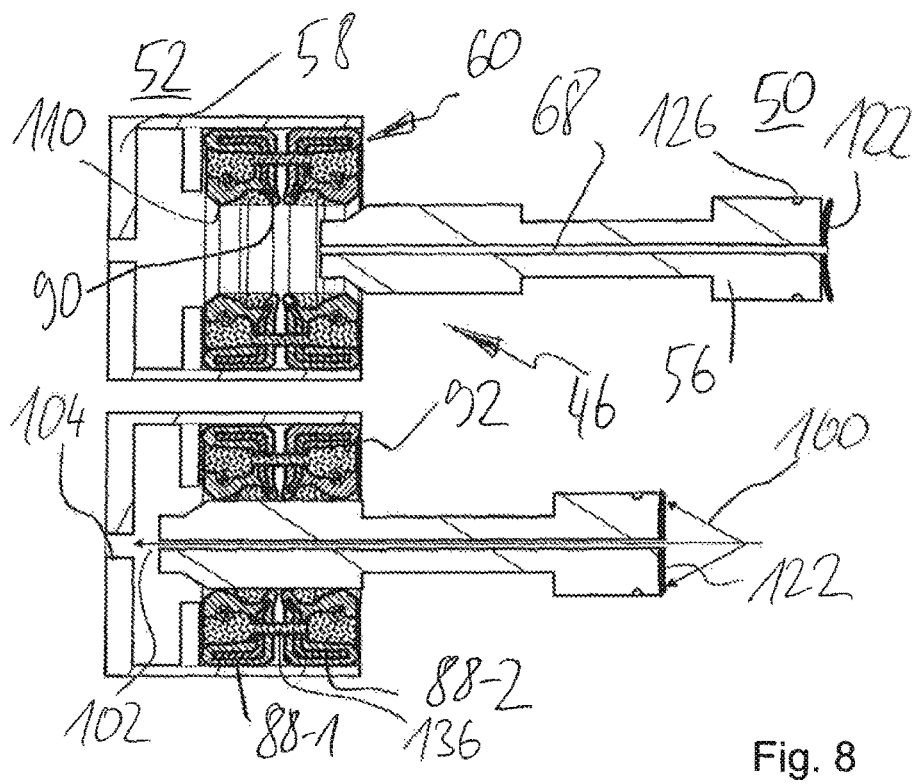
FIG. 8 schematic, highly simplified sectional views of another embodiment of a valve arrangement, in a disengaged and an engaged position.

FIG. 8 shows another configuration of a valve arrangement 48, which is similar in principle to the configuration according to FIG. 7. The discharge element 58 in FIG. 7 has a radial outlet 104. The discharge element 58 according to FIG. 8 has an axial outlet 104. In FIG. 8, a sealing arrangement 60 is further provided on the discharge element 58, which has a first sealing element 88-1 and a second sealing element 88-2, which are each formed in the form of a shaft seal. The sealing elements 88-1, 88-2 can form a shaft seal packet. Each of the sealing elements 88-1, 88-2 can have a sealing lip 90 and a wiper lip 110, in particular a reinforced wiper lip 110. The sealing elements 88-1, 88-2 can also have a lubricant reservoir 92, which can be filled with a lubricant 94. By way of example the lubricant reservoirs 92 of the sealing element 88-1 and the sealing element 88-2 can be connected to one another via a connection line 136.

With a twin seal of two sealing elements 88-1, 88-2, excellent sealing of the control piston 56 can be achieved in the engaged position. The contact between the control piston 56 and the discharge element 58 or its sealing arrangement 60 can be achieved virtually leak-free or without any substantial pressure drop.

Figure 9:
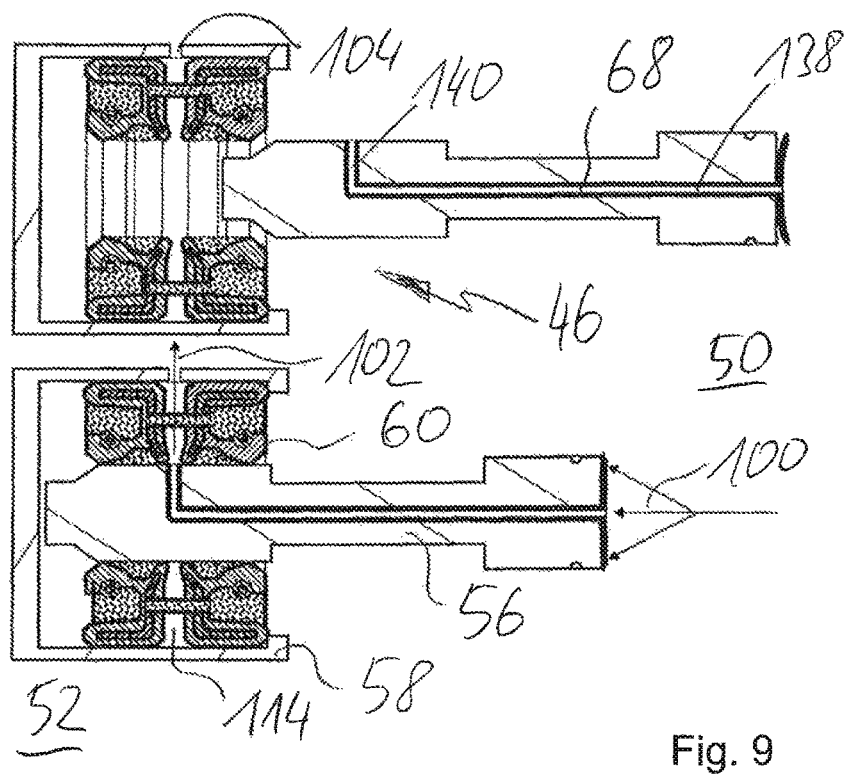
FIG. 9 schematic, highly simplified sectional views of another embodiment of a valve arrangement, in a disengaged and an engaged position.

FIG. 9 shows another exemplary configuration of a valve arrangement 48, which is similar in principle to the configuration according to FIG. 8. In contrast to the configuration according to FIG. 8, the discharge element 58 in FIG. 9 has a radial outlet 104. The radial outlet 104 is arranged between the first sealing element 88-1 and the second sealing element 88-2 of the sealing arrangement 60. The channel 68 in the control piston 56 is adapted to this configuration. The channel 68 has an axial inlet opening 138 at the carrier-side end 70 of the control piston 56. The channel 68 has a radial outlet opening 140 at the wheel-body-side end 72 of the control piston 56.

In the engaged state of the control piston 56 (lower representation in FIG. 9), substantial advantages of this configuration are shown. The pressure medium can enter the control piston 56 axially (reference sign 100). The pressure medium can run through the channel 68 and exit the control piston 56 radially (reference sign 102). The pressure medium can be discharged from the control piston 56 and the discharge element 58 in this way substantially without axial reaction forces. This measure can also contribute to the defined positional securing of the control piston 56 in the engaged position.

Figure 10:
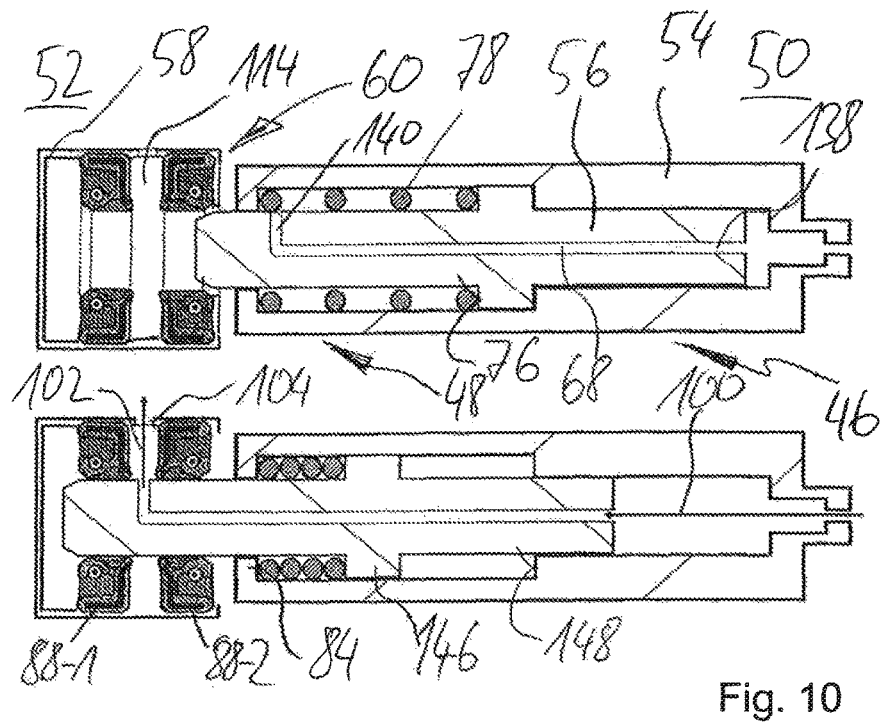
FIG. 10 schematic, highly simplified sectional views of another embodiment of a valve arrangement, in a disengaged and an engaged position.

FIG. 10 illustrates another representation of a valve arrangement 48, which is generally similar to the configuration according to FIG. 9. In FIG. 10 also the pressure medium can enter the control piston 56 through an axial inlet opening 138 and exit the control piston 56 through a radial outlet opening 140. The outlet opening 140 is arranged in the engaged position of the control piston 56 (lower representation in FIG. 10) between a first sealing element 88-1 and a second sealing element 88-2 of a sealing arrangement 60, which is taken up in or on the discharge element 58. Together the sealing elements 88-1, 88-2 and the discharge element 58 can lie around the outlet opening 140 in the manner of a sleeve.

A pretensioning element 78 is taken up on the housing part 56 in a fundamentally known manner, which element is supported on a web 84 and acts on a reset surface 76 of the control piston 56. The reset surface 76 is formed on a collar 146 of the control piston 56, the surface of which opposite the reset surface 76 can come to rest on a stop 148 on the housing part 54.

Figure 11:
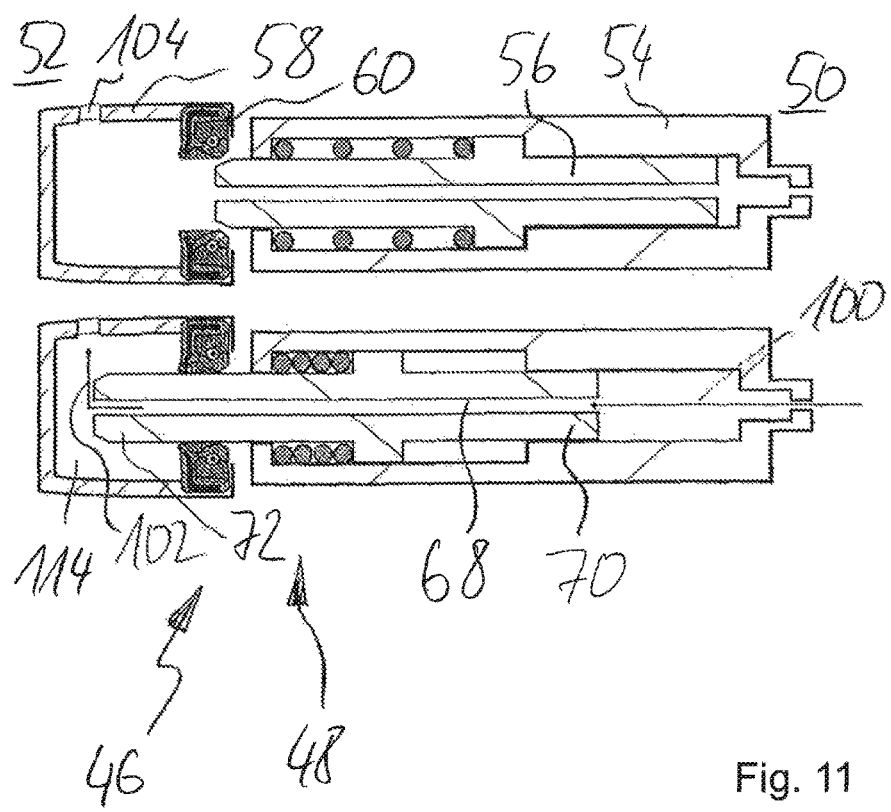
FIG. 11 schematic, highly simplified sectional views of another embodiment of a valve arrangement, in a disengaged and an engaged position.

FIG. 11 illustrates another configuration of a valve arrangement 48, which is configured basically similarly to the valve arrangement 48 according to FIG. 10. However, the control piston 56 according to FIG. 11 substantially permits an axial throughflow, cf. the arrows designated 100, 102, which characterise a pressure medium flow. The discharge element 58 is designed bowl-shaped and has a radial outlet 104.

Figure 12:
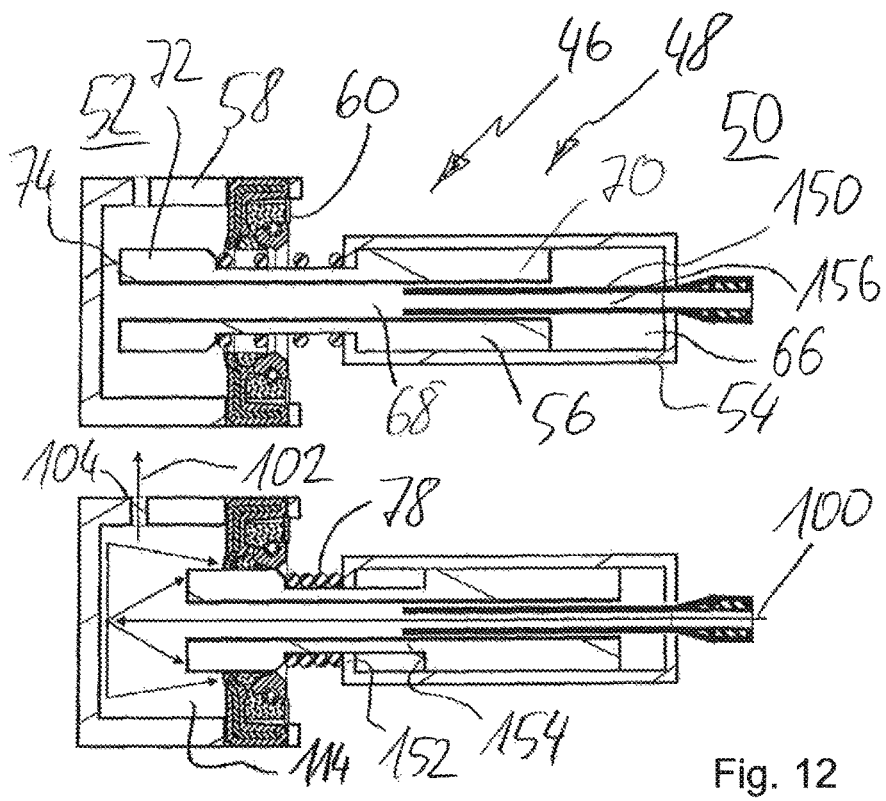
FIG. 12 schematic, highly simplified sectional views of another embodiment of a valve arrangement, in a disengaged and an engaged position.
Figure 13:
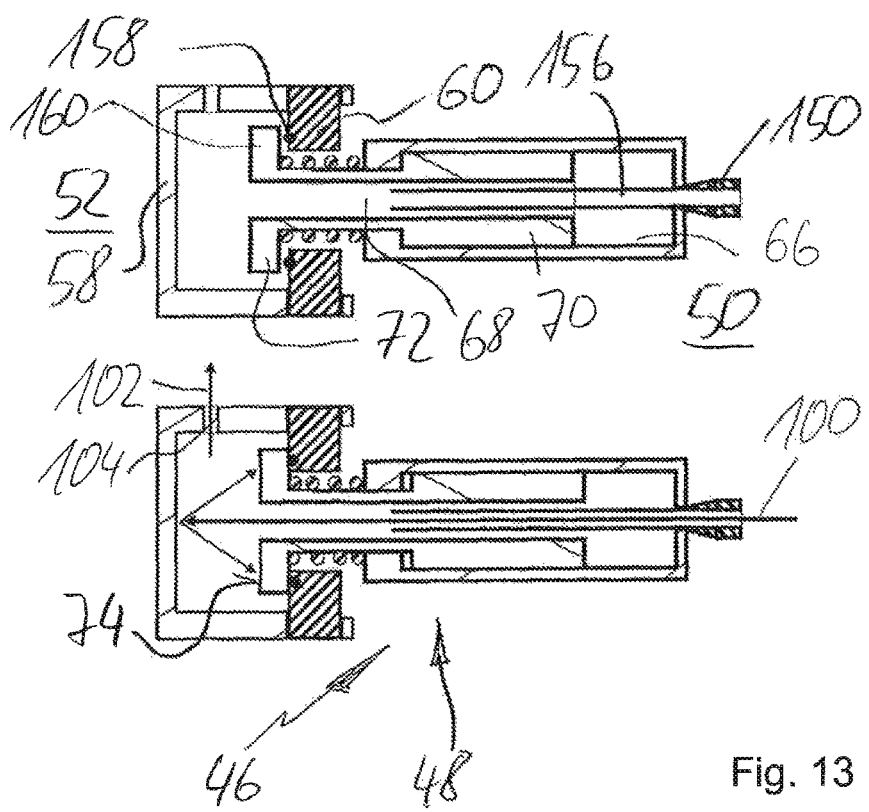
FIG. 13 schematic, highly simplified sectional views of another embodiment of a valve arrangement, in a disengaged and an engaged position.

FIG. 12 illustrates another configuration of a valve arrangement 48 for a rotationally fixed transition 46. FIG. 13 illustrates a generally similar configuration. The configuration of the valve arrangements 48 according to FIGS. 12 and 13 substantially differs from the practical examples described above in that the control piston 56 in the disengaged position (top representation in FIGS. 12 and 13 respectively) is extended from the perspective of the housing part 54. In contrast, the control piston 56 in the engaged position (lower representation in FIGS. 12 and 13 respectively) is in a retracted position from the perspective of the housing part 54.

This functionality can be brought about in that the pressure medium is conducted first through the channel 68 of the control piston 56, in order to act on a force application surface 74, which is formed on the wheel-body-side end 72 of the control piston 56. To prevent the pressure medium from acting already at the carrier-side end 70 of the control piston 56 on the latter, it can be recommended to provide a tubular pin or hollow pin 150 on the housing part 54, which protrudes at least in sections into the channel 68 of the control piston 56. A channel 156 is formed in the tubular pin 150 for the incoming pressure medium. The incoming pressure medium can thus flow through the channels 156, 68 and in particular not penetrate into a gap 66 between the carrier-side end 70 of the control piston 56 and the housing part 54. Instead the pressure medium can already penetrate in the disengaged position of the control piston 56 into a gap 114 between a wheel-body-side end of the control piston 56 around the discharge element 58 and act there on the force application surface 74.

In the configuration according to FIGS. 12 and 13 also, a pretensioning element 78 is provided, which can be formed as a spring, for example. The pretensioning element 78 can be supported on a web 152 of the housing part 54 and act on the control piston 56 in the direction of the disengaged position. In the disengaged position a stop 154 of the control piston 56 can come to rest on the web 152 of the housing part 54.

The configurations of FIGS. 12 and 13 differ substantially due to the type of sealing of the control piston 56 in the engaged position. According to the configuration illustrated with reference to FIG. 12, a substantially radially acting sealing arrangement 60 is provided, which can seal a circumferential contact surface 96 of the control piston 56.

The configuration according to FIG. 13 differs in that the sealing arrangement 60 has an axial seal 158, which cooperates with a collar 160 on the wheel-body-side end 72 of the control piston 56, in order to seal the gap 114 adequately in the engaged position of the piston 56 (lower representation in FIG. 13). A substantially low-loss pressure medium line can also be accomplished in this way.

Figure 14:
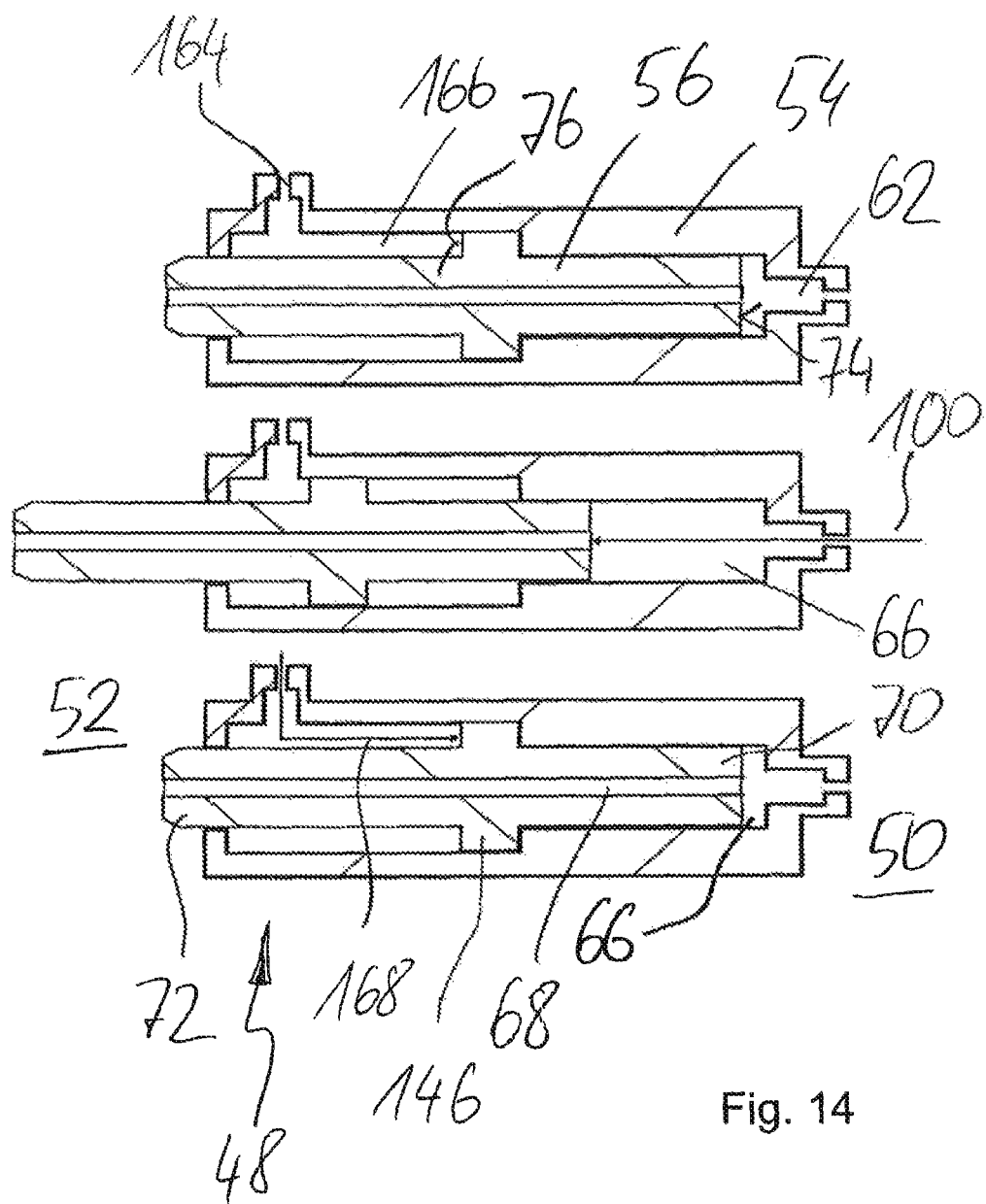
FIG. 14 schematic, highly simplified sectional views of another embodiment of a valve arrangement, in a disengaged and an engaged position.

FIG. 14 illustrates another advantageous configuration of a valve arrangement 48, wherein for visualisation reasons the representation of the discharge element 58 and the sealing arrangement 60 was omitted. FIG. 14 shows a housing part 54, in which a control piston 56 is taken up, wherein the control piston 56 is taken up as a double-acting piston. The housing part 54 has an inlet 62 in a known manner, through which the pressure medium can enter, cf. an arrow designated 100. The pressure medium can penetrate into a gap 66 between the carrier-side end 70 of the control piston 56 and the housing part 54 and act there on a force application surface 74 to move the piston from the disengaged position (top representation in FIG. 14) to the engaged position (middle representation in FIG. 14).

To guide the control piston 56 back, the housing part 54 has a reset connection 164, through which a reset fluid can be introduced into a gap or annular gap 166 between the housing part 54 and the control piston 56. A reset fluid under pressure can act on a reset surface 76 of the control piston 56, which is formed on a collar 146 of the control piston 56, cf. an arrow designated 168. The control piston 56 can be moved in this way from the engaged position (middle representation in FIG. 14) to the disengaged position (lower representation in FIG. 14).

With reference to FIGS. 15 to 18, the following advantageous configurations of valve arrangements 48 for rotationally fixed transitions 46 are illustrated and described in greater detail, which are characterised in particular by a so-called flow body 170, which is arranged between the carrier-side end 70 of the control piston 56 and the inlet 62 of the housing part 54. The flow body 170 can further improve the functionality of the valve arrangement 48.

The flow body 170 and the construction of the valve arrangement 48 linked to this are explained in greater detail with reference to FIG. 15. The flow body 170 can be mounted in particular on the housing part 54 or fixed on this. The flow body 170 can have a mushroom-shaped or shield-shaped configuration. The flow body 170 can accordingly have a head 171, for instance, which is formed tapered or conical in the direction of the inlet 62 of the housing part 54. It is also conceivable that the head 171 has a curved, in particular a parabola-shaped cross section, in order to offer only a slight resistance to the incoming pressure medium. A shaft 172, at the carrier-side end 52 of which a nose 173 can be formed, can attach to the head 171 of the flow body 170. The shaft 162 can be configured to engage in a widening 163 of the channel 68 in the control piston 56. The nose 173, if present, can be configured to engage in a section of the channel 68, which has a smaller flow cross section.

Figure 15:
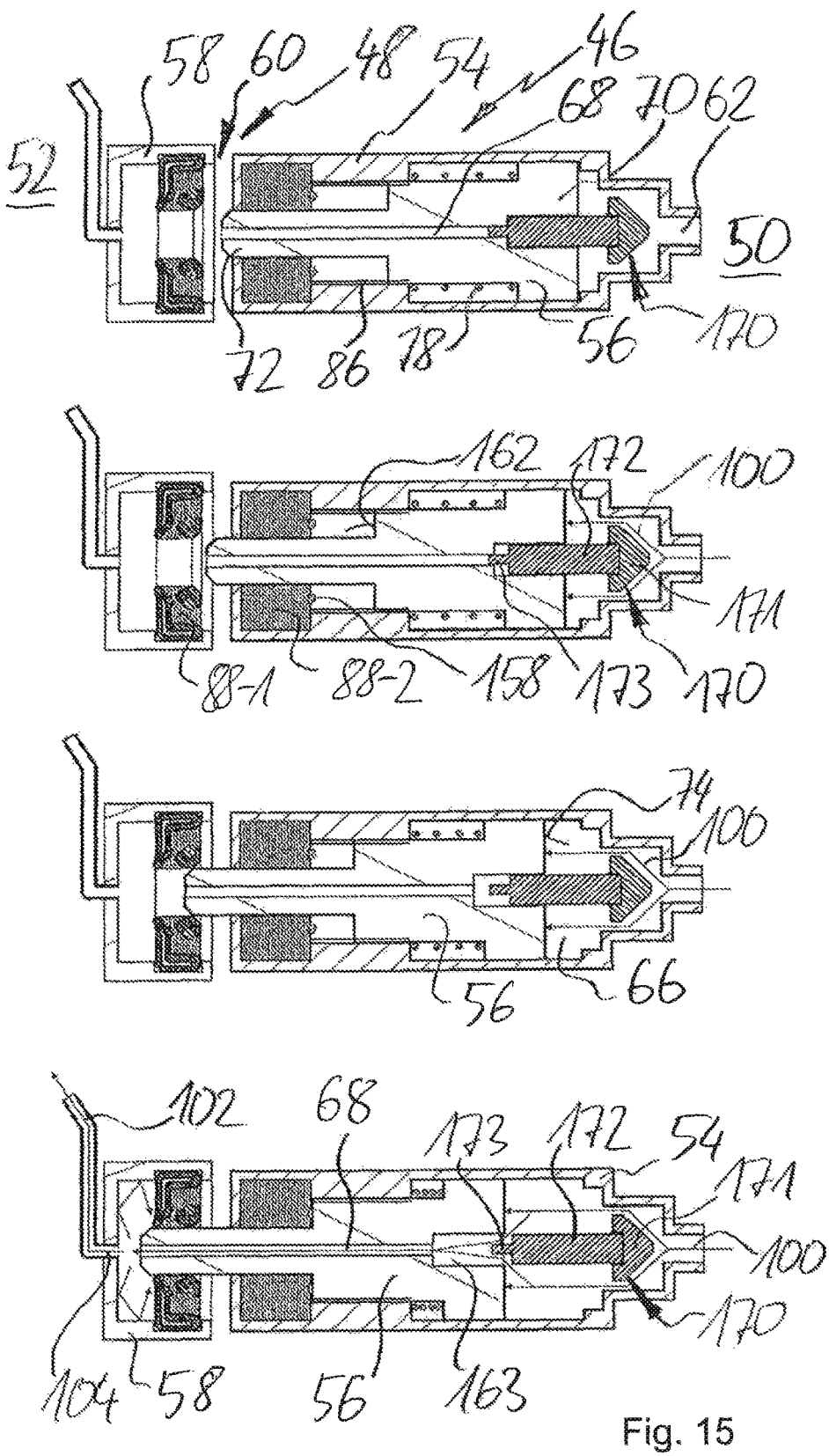
FIG. 15 schematic, highly simplified sectional views of another embodiment of a valve arrangement, in the transition between a disengaged and an engaged position.

Starting out from the top representation in FIG. 15 (disengaged position), the other representations of the valve arrangement 48 in FIG. 15 show the transition of the control piston 56 towards the engaged position (lower representation in FIG. 15). It becomes apparent that the flow body 170 is assigned the function of still sealing the gap 68 in the control piston 56 when the control piston 56 has already moved away from its end position at the carrier-side end of the housing part 54. This has the advantage that initially no pressure medium (cf. the arrow 100 in the second representation from the top in FIG. 15) can escape through the channel 68 of the control piston 56. A high pressure can build up accordingly in the gap or axial gap 66 between the housing part 54 and the carrier-side end 70 of the control piston 56. A high actuating force can act in this way on the force application surface 74 of the control piston 56. This force can be maintained even if the control piston 56 is already displaced by a certain path amount in the direction of its engaged position, cf. in particular the two middle representations in FIG. 15.

In the engaged position, a gap or annular gap is created between the control piston 56 and the flow body 170, in particular its shaft 172 or its nose 173. This means in other words that it is only when the control piston 56 has arrived in the engaged position and assumes a defined end position that a throughflow of the pressure medium can result in its channel 68. The pressure medium can flow in a known manner in the control piston 56 in the direction of the discharge element 58 and exit this at its outlet 104.

FIG. 15 illustrates another configuration of the valve arrangement, which concerns a special configuration of the sealing arrangement 60. The sealing arrangement 60 according to FIG. 15 has a first sealing element 88-1 on the discharge element 58 and another sealing element 88-2 on the housing part 54. The first sealing element 88-1 is formed in a known manner as a radially acting seal, in particular as a shaft seal. The other sealing element 88-2 is formed in particular as an axially acting sealing element. On the sealing element 88-2 an axial seal 158 is formed which can cooperate with an (axial) sealing surface 162 of the control piston 56. In the engaged position (lower illustration in FIG. 15) contact can result between the axial seal 158 and the sealing surface 162. The control piston 56 can thus be sealed axially on the one hand relative to the housing part 54. The control piston 56 can further be sealed radially relative to the discharge element 58. Thus the flow path resulting for the pressure medium in the engaged position is sealed especially well against leaks and any pressure losses.

It is understood that the flow body 170 can be designed substantially rotationally symmetrically. Other configurations are easily conceivable. The flow body 170 can be connected, for instance, via at least one lateral web (radially) to the housing part 54. The shaft 172 in particular and, if present, the nose 173 of the flow body 170 can be designed rotationally symmetrically, for instance cylinder-shaped. The shaft 172 can be adapted in particular to a widening 163 of the channel 68. The nose 173 can be adapted in particular to a taper or a normal cross section of the channel 68. Overall, adequate sealing of the channel 68 in the disengaged position can result due to the flow body 170. The sealing can also be guaranteed for at least a part of the path that the control piston must overcome on its movement in the direction of the engaged position.

Figure 16:
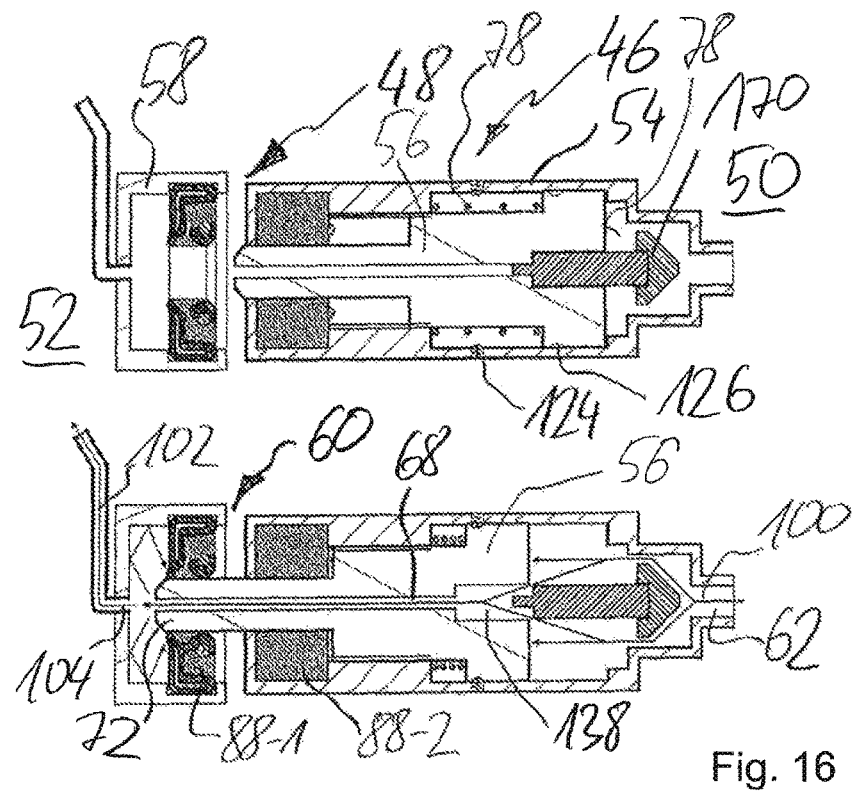
FIG. 16 schematic, highly simplified sectional views of another embodiment of a valve arrangement, in a disengaged and an engaged position.

FIG. 16 illustrates another configuration of a valve arrangement 48, the basic construction of which can correspond in principle to that of the valve arrangement 48 according to FIG. 15. The valve arrangement 48 accordingly has a flow body 170, which is associated with the housing part 54. The valve arrangement 48 further has measures to be able to improve the latching or retaining force of the control piston 56 in its engaged position (lower representation in FIG. 16). For this purpose a latching element 124 is formed on a circumferential wall of the housing part 54, which element can cooperate with a counter-element 126, which is arranged on an outer circumference of the control piston 56. The latching element 124 and the counter-element 126 can comprise, for instance, corresponding recesses on at least one of the elements 124, 126 and latching balls or similar on the other of the elements 124, 126. The latching balls can be sprung in principle. Instead of latching balls, which can engage in recesses, it would be conceivable to use spring washers or similar.

To transfer the control piston 56 from the disengaged position to the engaged position, the pressure medium must first apply an adjustment force via the force application surface 74, in particular an axial adjustment force, which acts against the force of the pretensioning element 78. The force of the pretensioning element 78 must be overcome to move the control piston 56 out of its resting position. In the engaged position of the control piston 56, the latching elements 124 and the at least one counter-element 126 can be latched with one another. A latching force or retaining force can accordingly result, which at least partly counteracts the pretensioning force of the pretensioning element 78. It is understood that the pretensioning element 78 is preferably pretensioned in such a way in the engaged position that a resulting pretensioning force can overcome the retaining force or latching force of the elements 124, 126.

The control piston 56 illustrated with reference to FIG. 16 has an axial flow channel 68, which exits the control piston 56 axially at its wheel-body-side end 72. An axial outlet 104 is also provided on the discharge element 58, through which the pressure medium can be discharged, cf. also the arrow designated 102 in FIG. 16.

Figure 17:
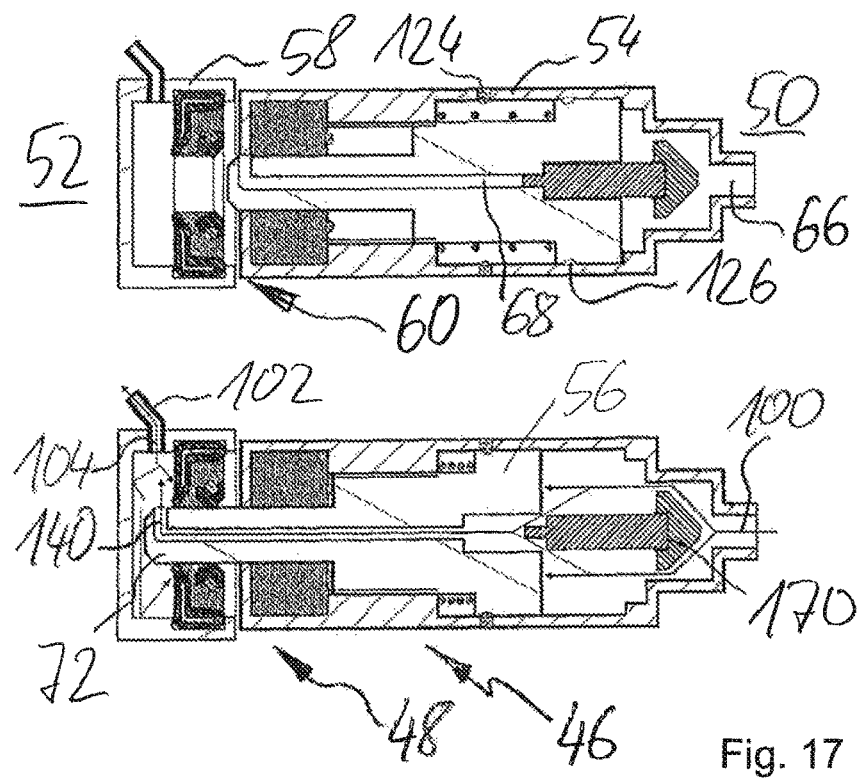
FIG. 17 schematic, highly simplified sectional views of another embodiment of a valve arrangement, in a disengaged and an engaged position.

The configuration of the valve arrangement 48 according to FIG. 17 differs from the configuration according to FIG. 16 substantially in that the channel 68 in the control piston 56 has a radial outlet opening 140. The outlet opening 140 can conduct the pressure medium in the direction of a radial outlet 104 on the discharge element 58. Axial rebound effects of the pressure medium on exiting the control piston 56 can be avoided in this way.

It is understood that the configurations of the valve arrangement 48 illustrated with reference to FIGS. 15 to 18 can also comprise a rotation lock 86 between the control piston 56 and the housing part 54. Reference is made by way of example to FIGS. 5, 5a and FIGS. 6, 6a for their configuration in greater detail.

Figure 18:
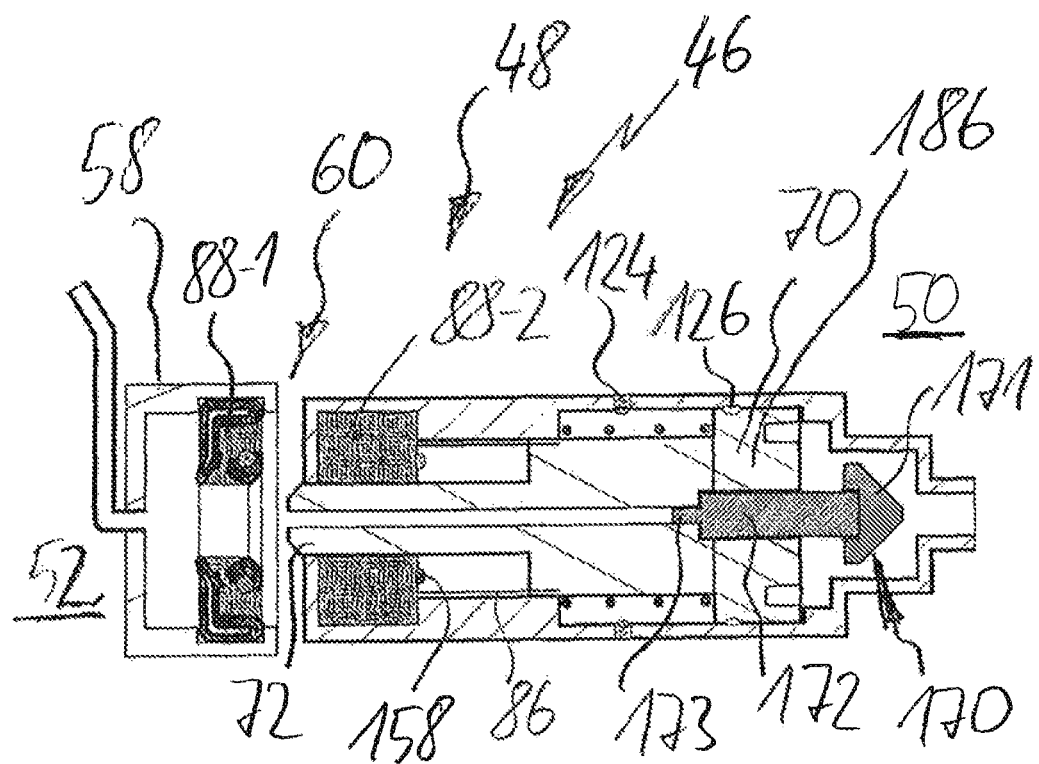
FIG. 18 schematic, highly simplified sectional views of another embodiment of a valve arrangement, in a disengaged and an engaged position.
Figure 18:
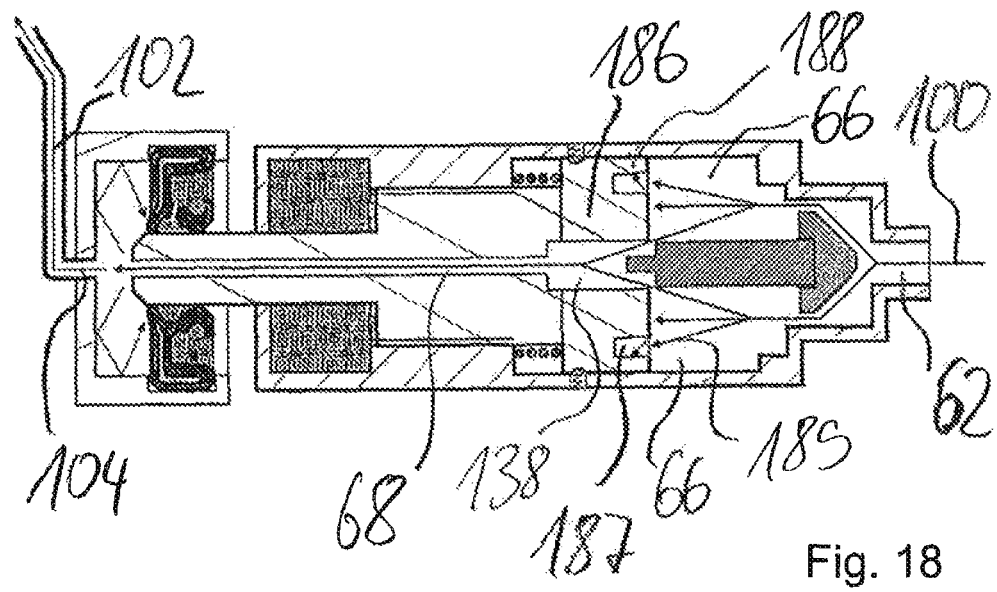

FIG. 18 illustrates another advantageous configuration of a valve arrangement 48, which can basically be designed according to the configurations that were illustrated with reference to FIGS. 15 and 16. However, the valve arrangement 48 according to FIG. 18 has a development by contrast that can further improve the sealing between the control piston 56 and the housing part 54. For this purpose a sealing body 186 can be provided at the carrier-side end 70 of the control piston 56. The sealing body 186 can be an integral constituent of the control piston 56. However, it is also conceivable to form the sealing body 186 as a separate part and join it to the control piston 56 to form a corresponding unit. The sealing body 186 has in particular a substantially cylindrical or disc-like design. The sealing body 186 can have a circumferential surface that contacts a wall surface of the housing part 54.

According to at least some configurations, the sealing body 186 can be manufactured from a plastic material. A configuration from an elastic material is basically conceivable. However, it is also conceivable to manufacture the sealing body 186 from a rubber material or an elastomeric material. It is generally preferred if the sealing body 186 is formed, at least in sections, from an elastic or deformable material. The sealing body 186 preferably has a slight oversize in relation to the wall section of the housing part 54 on which it is taken up. A good seal can result in this way. The oversize can be achieved, for instance, by a slight taper on the outer circumference of the sealing body 186.

However, it is also conceivable for the sealing body 186, in particular its outer diameter, to be configured such that no oversize but as custom-fitting a seat as possible is provided on the circumferential wall of the housing part 54.

Another improvement of the sealing effect of the sealing body 186 can result when this has substantially axially introduced recesses, which are associated with an inlet 62 of the housing part 54 and are introduced if possible into an edge region of the sealing body 186, which region is adjacent to a contact area between the sealing body 186 and the receiving wall of the housing part 54. By way of example the sealing body 186 can have a groove 187, in particular an axially introduced circumferential groove 187. This can be, in particular, a circular groove or circular segment groove 187. The groove 187 can to a certain extent cause a "weakening" of the sealing body 186. A (relatively thin) wall portion 188 of the sealing body 186 can be produced between the groove 187 and the contact surface between the sealing body 186 and the housing part 54.

An advantage of this design is particularly evident in the engaged position (lower illustration in FIG. 18). In the engaged position, although the pressure medium can flow through the channel 68 of the control piston 56 on the one hand, cf. the arrows 100, 102, it can in principle result in a pressure increase in the gap 66 between the control piston 56 (or its sealing body 186) and the housing part 54. In particular, a pressure level can result in the gap 66 that corresponds to an applied pressure of the pressure medium. The pressure medium can now also enter into the recess or the at least one groove 187 of the sealing body 186. The pressure medium can act there on the wall piece 188 and accordingly load the wall piece 188 radially outwards, cf. also an arrow designated 189 in FIG. 18. In this way a small expansion of the wall piece 188 can result. Accordingly, an even better sealing seat can be produced between the control piston 56 and the housing part 54. This can further prevent, in particular in the engaged position, leakage and pressure losses. However, it can be advantageous already in the transition from the disengaged position to the engaged position to minimise pressure losses to the outside.

Figure 19:
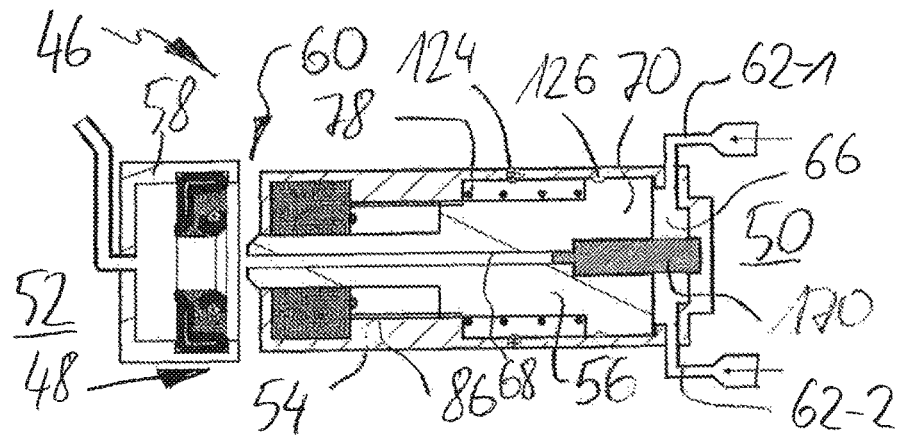
FIG. 19 a schematic, highly simplified sectional view of another embodiment of a valve arrangement, in a disengaged position.
Figure 20:
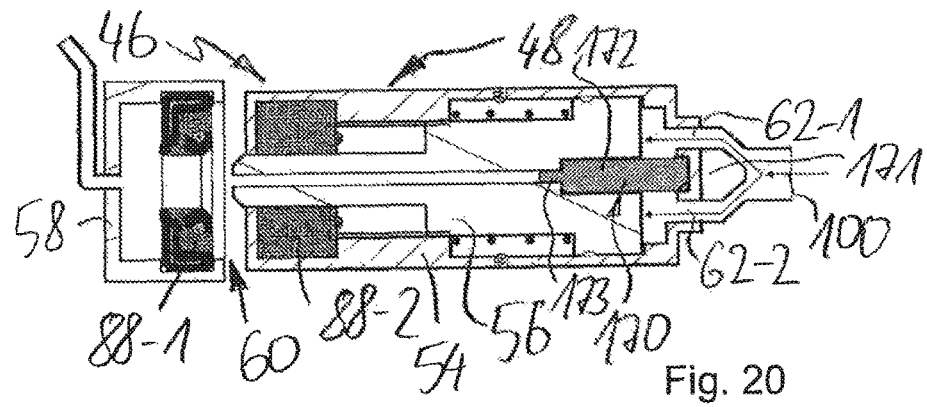
FIG. 20 a schematic, highly simplified sectional view of another embodiment of a valve arrangement, in a disengaged position.

FIGS. 19 and 20 illustrate further configurations of valve arrangements 48, which are each shown with a control piston 56 in the disengaged position. Similar to the configurations illustrated with reference to FIGS. 15 to 18, the configurations according to FIGS. 19 and 20 also have flow bodies 170, which are coupled to the housing part 54. The flow body 170 can have a shaft 172 as well as a nose 173 if applicable, which are formed to engage at the carrier-side end 70 of the control piston 56 in its channel 68 when the control piston 56 is in the disengaged position. In this way a pressure can be built up by the incoming pressure medium in the gap 66 between the control piston 56 and the housing part 54 in order ultimately to be able to move the control piston 56 into the engaged position (not shown in FIGS. 19 and 20).

In the configurations according to FIG. 19 and FIG. 20 also, the sealing arrangement 60 is provided with two sealing elements 88-1, 88-2, of which the sealing element 88-1 is associated with the discharge element 58 and the sealing element 88-2 with the housing part 54. The sealing element 88-1 can substantially provide radially active sealing in a known manner. The sealing element 88-2 can substantially provide axially acting sealing.

The flow body 170 according to FIG. 19 is taken up on the head side on a wall of the housing part 54, which faces a carrier-side end face of the control piston 56. The pressure medium cannot accordingly penetrate into the gap 66 axially or coaxially to the channel 68 in the control piston 56. Instead of this, the configuration of the housing part 54 according to FIG. 19 has a first inlet 62-1 and a second inlet 62-2, through which the pressure medium can flow radially into the gap 66. The flow body 170 according to FIG. 20 is also taken up on the housing part 54 at its carrier-side end facing away from the control piston 56. A head 171 for the flow body 170 can be formed on the housing part 54. On the head 171, a flow path for the pressure medium can be branched, cf. the inlets 62-1, 62-2 in FIG. 20. The inlets 62-1, 62-2 can be formed, for instance, as channels that are oriented obliquely at least in sections. The incoming pressure medium (cf. an arrow designated 100 in FIG. 20) can flow in this way around the head 171 and penetrate into the gap 66 between the control piston 56 and the housing part 54.

Figure 21A:
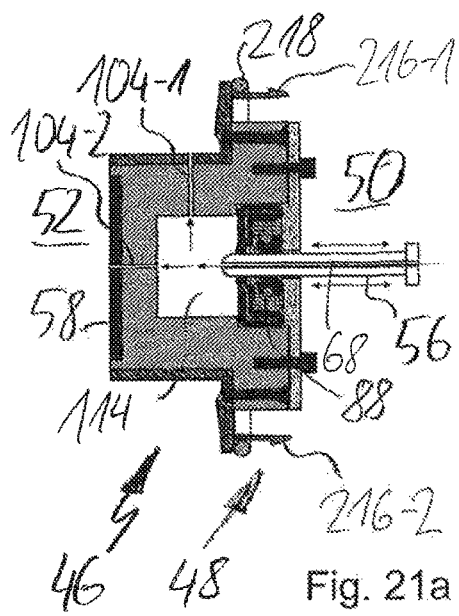
FIG. 21a a schematic, highly simplified sectional view of another embodiment of a valve arrangement, in an engaged position.
Figure 21B:
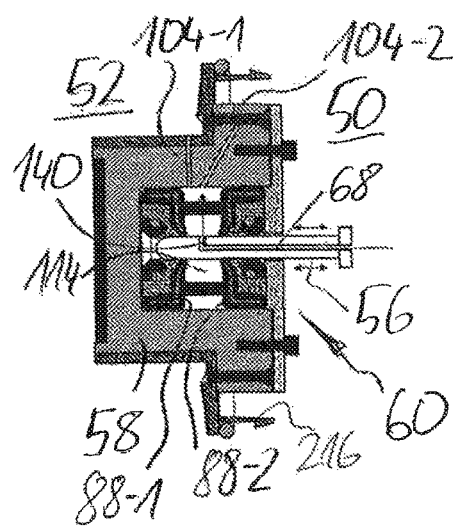
FIG. 21b a schematic, highly simplified sectional view of another embodiment of a valve arrangement, in an engaged position.

FIGS. 21a and 21b illustrate other exemplary configurations of valve arrangements 48 for rotationally fixed transitions 46. The representation of the housing part 54 was dispensed with in FIGS. 21a and 21b for visualisation reasons. FIG. 21a and FIG. 21b show configurations of valve arrangements 48, the discharge elements 58 of which are provided with snap elements 216, with which the discharge elements 58 can be taken up on the wheel body side on a wheel hub, for instance. The snap fits 216-1, 216-2 can latch into corresponding recesses. A sealing ring 218 can also be provided to secure or seal the seat of the discharge elements 58. Good positional fixing, in particular play-free positional fixing, can be achieved in this way.

FIG. 21a illustrates a configuration of the control piston 56 with a channel 68 that extends substantially axially. The pressure medium can accordingly exit the control piston 56 substantially axially and penetrate into the gap 114 between the control piston 56 and the discharge element 58. Furthermore, a radial outlet 104-1 and an axial outlet 104-2 are shown by way of example on the discharge element 58 according to FIG. 21a. It is understood that both variants can be implemented alternatively or together. A substantially radially acting sealing element 88 is also provided on the discharge element 58 in a known manner.

The configuration of the control piston 56 and the discharge element 58 according to FIG. 21b differs substantially from the configuration according to FIG. 21a in that the channel 68 of the control piston 56 has a radial outlet opening 140, through which the pressure medium can flow into a radial gap 114 between the control piston 56 and the discharge element 58. FIG. 21b further illustrates two outlets 104-1, 104-2 for the pressure medium that are introduced substantially radially and can be implemented alternatively or together. The discharge element 58 is further provided according to FIG. 21b with a sealing arrangement 60, which comprises a first sealing element 88-1 and a second sealing element 88-2. Both sealing elements 88-1, 88-2 can be substantially radially acting sealing elements. The sealing elements 88-1, 88-2 can be offset axially to one another and define a gap 114 between them. The pressure medium can flow in this way through the control piston 56 and the discharge element 58 substantially without axial rebound.

FIG. 22 illustrates another configuration of a valve arrangement 48 for a rotationally fixed transition 46. With respect to the fundamental configuration of the valve arrangement 48, reference is made to the similar configuration of the valve arrangements 48 according to FIG. 15 and FIG. 18.

In a similar manner, the valve arrangement 48 according to FIG. 22 has a flow body 170, which is provided with a shaft 172 and nose 173 to seal the inlet opening 138 of the channel 68 of the control piston 56, at least in the disengaged position. The top representation in FIG. 22 corresponds to the disengaged position of the control piston 56. The bottom representation in FIG. 22 corresponds to the engaged position of the control piston 56. The other representations in FIG. 22 describe intermediate positions of the control piston 56 in which the flow body 170 can continue to seal the channel 68 of the control piston 56.

As already described with reference to FIG. 18, the control piston 56 of the sealing arrangement 48 according to FIG. 22 can also have a sealing body 186, on the axial end face of which, which face also defines the force application surface 74 of the control piston 56, a groove or recess 187 can be introduced. The groove 187 defines a wall piece 188 of the sealing body 186. In the gap 66 between the housing part 54 and the control piston 56, a pressure can be produced by the incoming pressure medium that can also act on the wall piece 188. The sealing body 186 can be pretensioned in this way in the direction of a circumferential wall of the housing part 54. The control piston 56 can be sealed even better relative to the housing part 54 in this way.

The configuration according to FIG. 22 is further characterised by the configuration of the flow body 170. A tube piece 206 is associated with the flow body 170. In particular, the flow body 170 can be formed on the tube piece 206. The flow body 170 can be provided in a known manner with a shaft 172 and a tip 173, in order to seal the channel 68 of the control piston 56 at its inlet opening 138 at least in the disengaged position. A tip 222 can be formed on the flow body 170, which tip points in the direction of the carrier side 50. The flow body 170 and the tube piece 206 according to the configuration illustrated with reference to FIG. 22 can in particular have outer diameters corresponding to one another.

To permit an axial inflow of the pressure medium in the direction of the gap 66 between the housing part 54 and the control piston 56, at least one oblique channel 220 is formed between the tube piece 206 and the tip 222 of the flow body 170. A first oblique channel 220-1 and a second oblique channel 220-2 can be inferred from the representations according to FIG. 22. FIG. 22a illustrates a cross section through the tube piece 206 in the area of the tip 222 of the flow body 170, cf. also line XXIIa-XXIIa. Even the configuration according to FIG. 22, 22a permits the pressure medium to flow without substantial flow resistances past the flow body 170 into the gap 66.

FIGS. 23 to 25a illustrate configurations of valve arrangements 48 for rotationally fixed transitions 46, in which the sealing arrangement 60 or at least parts of it are taken up on the control piston 56. Adequate sealing of the rotationally fixed transition 46 can be guaranteed in the engaged position in this manner also.

Figure 23:
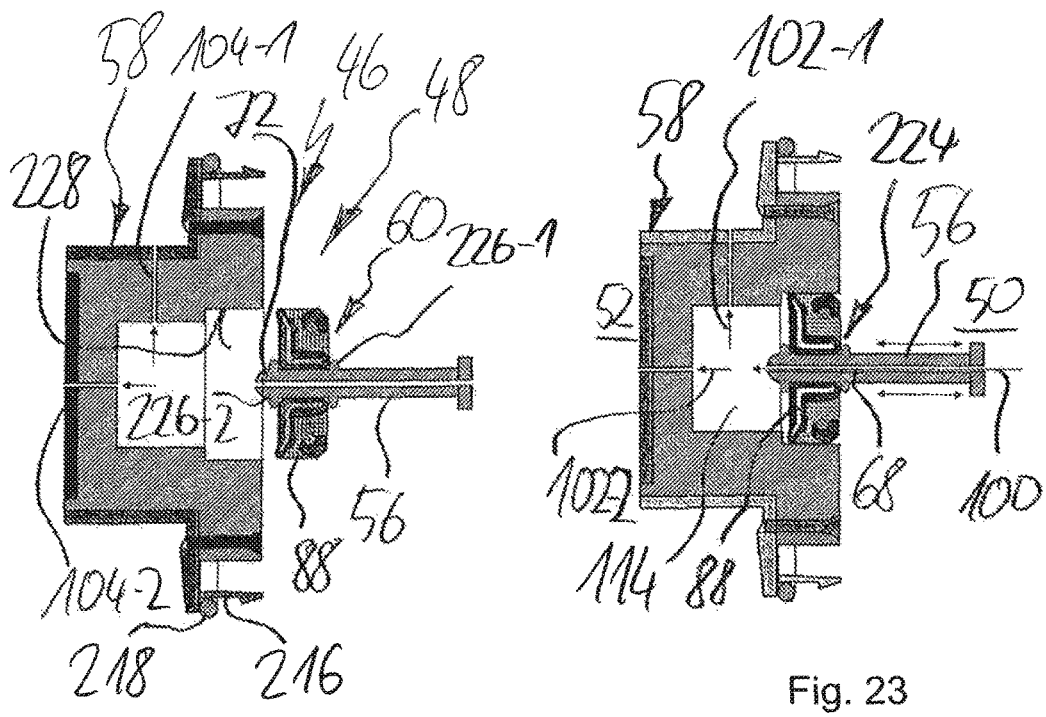
FIG. 23 schematic, highly simplified sectional views of another embodiment of a valve arrangement, in a disengaged and an engaged position.

FIG. 23 illustrates another configuration of a valve arrangement 48 for a rotationally fixed transition 46. The valve arrangement 48 according to FIG. 23 is basically designed similarly to the embodiment of the valve arrangement 48 according to FIG. 21a. The sealing arrangement 60 of the valve arrangement 48 has a sealing element 88, in particular a sealing element that sits internally and seals externally. The sealing element 88 is taken up on a seat 224 on the control piston 56, in particular at its wheel-body-side end 72. The seat or sealing seat 224 can have at least one collar 226, in particular a first axial stop collar 226-1 and a second axial stop collar 226-2 or by adequate axial securing elements. In this way the sealing element 88 of the sealing arrangement 60 can be axially displaced together with the control piston 56 to move the control piston 56 from the disengaged position (left-hand illustration in FIG. 23) to the engaged position (right-hand illustration in FIG. 23).

In the engaged position of the control piston 56, the sealing element 88 can come to rest in a sealing manner on a seating 228 and in this way seal the gap 114 between the control piston 56 and the discharge element 58. The discharge element 58 can have at least one outlet 104-1, 104-2 in a known manner, through which the pressure medium can escape, cf. arrows designated 102-1, 102-2 in FIG. 23. The inflowing pressure medium (cf. an arrow designated 100) can flow through a channel 68 of the control piston 56 on its way to the gap 114.

Furthermore, the valve arrangement 48 according to FIG. 23 can be provided by analogy with the configuration illustrated in FIG. 21a with latching elements or snap hooks 216, in order to fix the discharge element 58 on a wheel hub or the like. Furthermore, at least one sealing element or securing element 218 can be provided on the discharge element 58 to ensure the firm seating of the discharge element 58 on the receiving contour. The sealing element 88 can also be provided in accordance with one of the configurations described above with a lubricant reservoir to be able to moisten the sealing seating 228 on the discharge element 58 with a lubricant, for instance, during the movement of the control piston 56.

Figure 24:
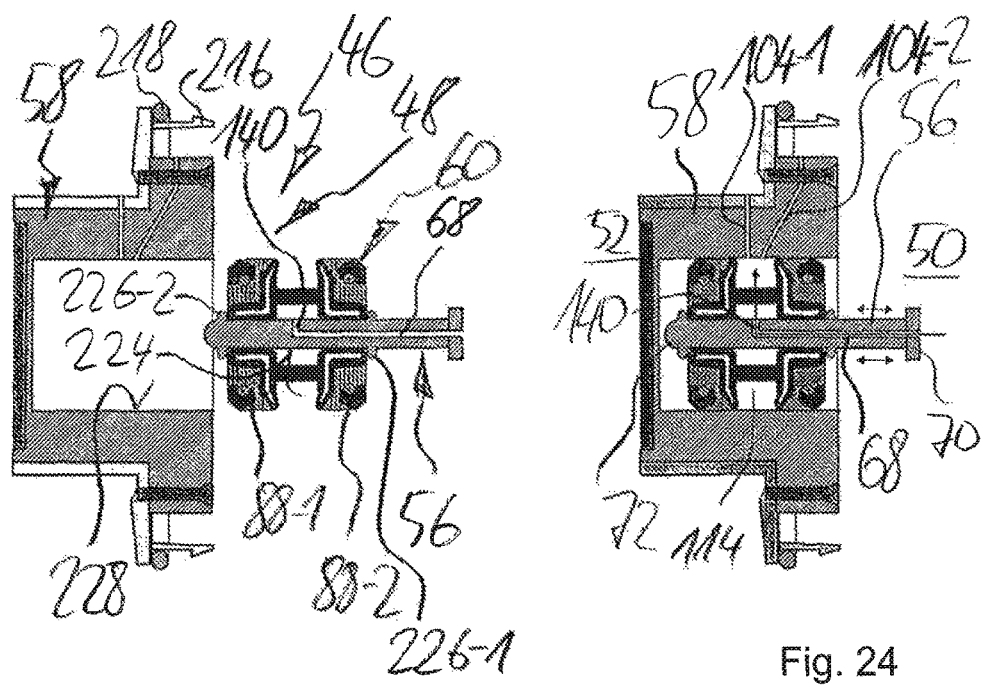
FIG. 24 schematic, highly simplified sectional views of another embodiment of a valve arrangement, in a disengaged and an engaged position.

The valve arrangement 48 illustrated with reference to FIG. 24 is designed basically similar to the valve arrangement 48 which is illustrated with reference to FIG. 21b. A substantial difference can be seen in that in FIG. 24, the sealing arrangement 60 is taken up on the control piston 56. For this purpose a seat 224 can be formed on the control piston 56, which seat can extend between a first collar 226-1 and a second collar 226-2. The sealing arrangement 60, which comprises two sealing elements 88-1, 88-2 axially offset from one another, for instance, can be taken up on the seat 224. The sealing elements 88-1, 88-2 can be in particular radially acting sealing elements that sit internally and seal externally. The sealing elements 88-1, 88-2 can form a seal packet.

The sealing elements 88-1, 88-2 can come to rest in the engaged position of the control piston 56 (right illustration in FIG. 24) on a sealing seating 228 of the discharge element 58 such that a sealed gap 114, in particular a radial gap, results between the control piston 56 and the discharge element 58. The pressure medium can flow through the piston 56 through the channel 68 and exit the control piston 56 through a radial outlet opening 40. In a fundamentally known manner (see also FIG. 21b) radial outlets 104-1, 104-2 can be provided on the discharge element 58. It is understood that the outlets 104-1, 104-2 can represent alternative configurations. The pressure medium can exit the discharge element 58 and thus the valve arrangement 48 through one of the outlets 104-1, 104-2. The sealing elements 88-1, 88-2 can be formed in a known manner to deliver lubricant or a lubricating fluid, in particular on their outer circumference. In this way the sealing seat 224 on the discharge element 58 can be moistened upon the travel of the control piston 56.

FIG. 25 illustrates another configuration of a valve arrangement 48 for a rotationally fixed transition 46, the configuration of which is similar in principle to the configuration according to FIGS. 22 and 22a. Below, therefore, primarily the differences from the design according to FIGS. 22 and 22a are looked at in greater detail. In terms of configuration elements not explicitly described, reference is made as a precaution to the above statements regarding FIGS. 22 and 22a. The configuration of the valve arrangement 48 illustrated with reference to FIG. 25 is characterised in particular by the fact that the sealing arrangement 60, preferably at least one sealing element 88 of the sealing arrangement 60, is taken up on the control piston 56.

The sealing element 88 is taken up on a seat 224 of the control piston 56. An axial positional securing of the sealing element 88 can be carried out by at least one axial collar 226-1, 226-2. An axial positional securing is conceivable as well by retaining rings, Seeger rings and similar configuration elements, for instance. The sealing element 88 is designed to sit internally and seal externally. Accordingly, the sealing element 88 can seal with its outer circumference a receptacle or take-up surface 228 on the discharge element 58, in particular seal it radially outwards. In this way, a gap 114 can be sealed between the control piston 56 and the discharge element 58. Inflowing pressure medium (cf. arrow designated 100 in FIG. 25) can enter the channel 68 of the control piston 56 and exit the discharge element 58 through an outlet 104, for instance an axial outlet or a radial outlet, cf. an arrow designated 102.

A reservoir or lubricant reservoir 232 can also be formed on the housing part 54, which reservoir is contacted, for example, by an outer circumference of the sealing element 88 in the disengaged position. According to this exemplary configuration, the reservoir 232 can be used to moisten the outer circumference of the sealing element 88. In this way, the lubricant supply of the sealing element 88 can be ensured. The sealing element 88 can be even better lubricated and sealed at its seat on the seating 228 of the discharge element 58. The reservoir 232 can comprise, for example, a porous body comprising cavities for receiving and dispensing a lubricant. The reservoir 232 can thus be designed as a sintered body, for instance. However, it is also conceivable for the reservoir 232 to be made of a foam material or a foam-like material, which is impregnated with the lubricant.

FIG. 25*a* illustrates a cross section through a tube piece 206 along line XXVa-XXVa in FIG. 25. The tube piece 206 is associated with a flow body 170 that is taken up on the carrier part 54 in order to cover or close an inlet opening 138 of the control piston 56 at least in the disengaged position of the control piston 56 (top illustration in FIG. 25). In the engaged position (lower illustration in FIG. 25) of the control piston 56, the flow body 170 releases the inlet opening 138 and the channel 68 of the control piston 56.

FIG. 26 shows a partial sectional view of a wheel unit 14, which can be taken up on an axle 12 of a vehicle 10 (cf. also FIG. 1). Advantageously, the wheel unit 14 can be configured to monitor and adjust if necessary an air pressure or fluid pressure in a tire 16 (not shown in FIG. 15).

The wheel unit 14 comprises an axle beam 176, defining an axis 174. A wheel bearing 178 is taken up on the axle beam 176. A wheel hub 180 is coupled to the axle beam 176 via the wheel bearing 178. The wheel hub 180 provides a receptacle for a rim body 182. A tire can be taken up on the rim body 182. A receptacle for a valve 184 is further formed in the rim body 182.

A pressure medium supply device 190 is further associated with the wheel unit 14. The pressure medium supply device 190 has a compressor unit 192. The compressor unit 192 can comprise a compressor and a motor for driving the compressor, for instance. The compressor unit 192 can be coupled via an energy path 194 to an energy source 196. The energy source 196 can be an onboard voltage network of the vehicle. However, separate energy sources and/or energy stores are conceivable. The compressor unit 192 is arranged on the carrier side 50 of the wheel unit 14. The compressor unit 192 is taken up accordingly on the axle beam 176. A pressure medium supplied by the compressor unit 192 can be supplied via a pressure medium path or pressure media path 198 to the valve 184. The pressure medium path 198 can comprise various sections 198-1, 198-2. The sections 198-1, 198-2 can be coupled to one another via a non-return valve 200, for example. This can be advantageous, for example, if the rim body 182 is removed from the wheel hub 180 to change tires. In this connection reference is also made to FIG. 26*a* for illustration.

FIG. 26*a* shows two highly simplified schematic representations of the non-return valve 200. In its open position (upper illustration in FIG. 26*a*) a plunger 204 acts on a closing element 202 of the non-return valve 200. In this way, the sections 198-1, 198-2 of the pressure medium path are linked to one another. In the separated position (lower illustration in FIG. 26*a*), the plunger 204 is released from the closing element 202 so that this closes the non-return valve 200. In this position, no dirt or similar can penetrate into the pressure medium path 198-1, for instance when changing tires.

The pressure medium supply device 190 according to FIG. 26 also has a rotationally fixed transition 46, which ensures that pressure medium provided by the compressor unit 192 can be safely transferred to the rotatably supported wheel body side 52. The rotationally fixed transition 46 can comprise in particular a valve arrangement 48 according to one of the embodiments described above. FIG. 26*b* illustrates a further embodiment of a valve arrangement 48, which can be used in particular with the wheel unit 14 according to FIG. 26. The valve arrangement 48 has a housing part 54, which is coupled to the compressor unit 192. Furthermore, a control piston 56 is provided, which can be coupled basically in the manner described above to a discharge element 58, which provides an outlet 104 for the pressure medium.

The valve arrangement 48 further includes a sealing arrangement 60, which can comprise, for example, a first sealing section 60-1 and another sealing section 60-2. The first sealing section 60-1 can be configured in particular as an axially acting seal. The first sealing section 60-1 can be taken up on the control piston 56, for instance. The other sealing section 60-2 can be configured in particular as a radially acting seal. The other sealing section 60-2 can be arranged in particular on the discharge element 58.

The design of the valve arrangement 48 according to FIG. 26*b* is further characterised by a pin 208, which is coupled to the housing part 54. The pin 208 extends into the channel 68 of the control piston 56. The pin 208 has a tapering end with an outer cone 210. At its wheel-body-side end 70, the channel 68 of the control piston 56 is provided with an inner cone 212, which is oriented in the same sense as the outer cone 210 of the pin 208. The outer cone 210 and the inner cone 212 are adapted to one another. The inner cone 212 and the outer cone 210 can in particular be adapted to one another in such a way that a resulting annular gap between the channel 68 and the pin 208 in the disengaged position (upper illustration in FIG. 26*b*) decreases or is even closed between their wheel-body-side ends. This has the consequence of reducing the risk in the disengaged position of dirt or foreign matter penetrating into the channel 68.

In the engaged position (lower illustration in FIG. 26*b*), on the other hand, a sufficiently large annular gap is released in the channel 68 between the pin 208 and the control piston 56 at the wheel-body-side end of the pin 208. In the engaged position a sufficiently large volume flow can thus can be realised through the gap 68, cf. also the arrows 100, 102.

To transfer the control piston 56 from the disengaged position to the engaged position, an axial force application surface 74 of the control piston 56 can be acted upon in a sufficiently known manner by the pressure medium flowing into the gap 66, cf. also the arrow designated 100.

FIGS. 27, 27a and 27b illustrate a configuration of a wheel unit 14, which essentially corresponds to the design of the wheel unit 14 according to FIGS. 15, 15a and 15b.

However, the wheel unit 14 in FIG. 27 differs by the type of connection of the pressure medium supply device 190 to a compressed air source. The pressure medium supply device 190 is coupled to a remote compressor 214, and in particular to a central compressor 214. The pressure medium can be supplied via various sections 198-1, 198-2, 198-3 of the pressure medium path to the valve 184, and ultimately the tire 16. A rotationally fixed transition 46 is formed between the sections 198-1, 198-2 of the pressure medium path, allowing the pressure medium to be conducted over from the carrier side 50 to the wheel body side 52. The rotationally fixed transition 46 can comprise a valve arrangement 48 according to FIG. 27b, for instance, the functionality of which was illustrated in connection with FIG. 26b.

Furthermore, a non-return valve 200 can be formed at the transition between the sections 198-2, 198-3, cf. also FIG. 27a. In the present case, the non-return valve 200 is taken up for example on the rim body 182, so that it can be removed from the wheel hub 180 together with this when changing the rim body 182. It is understood that each of the sections 198-2, 198-3 of the pressure medium path can be associated with a corresponding non-return valve 200 on its coupling side.

Figure 28:
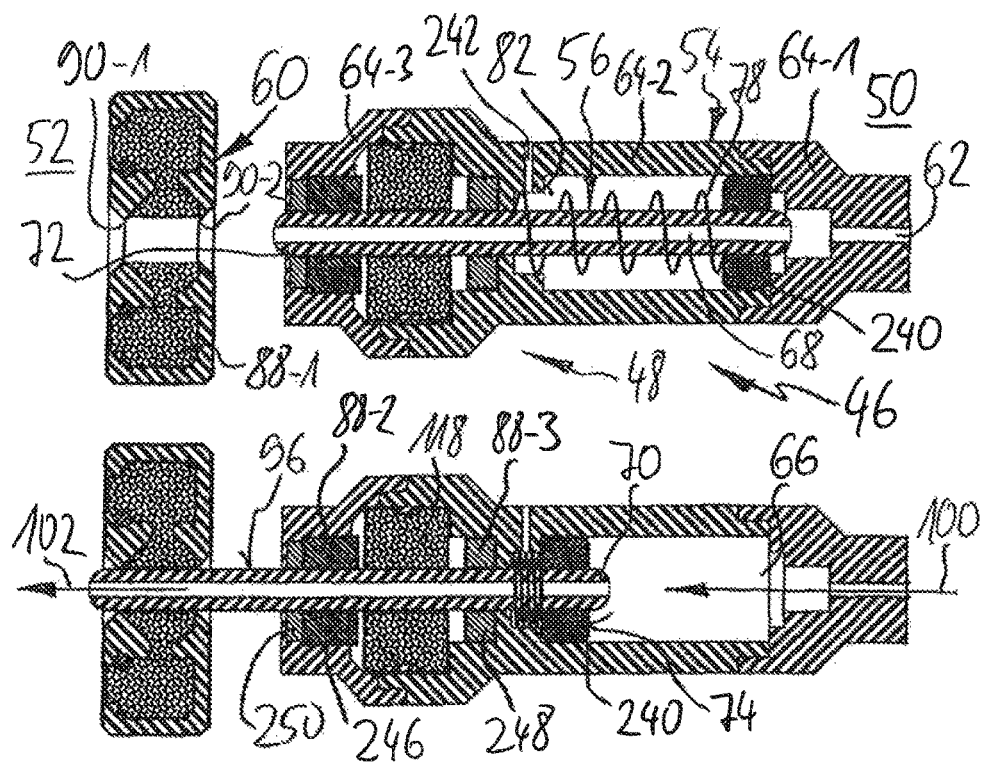
FIG. 28 schematic, highly simplified sectional views of another embodiment of a valve arrangement, in a disengaged and an engaged position.
Figure 29:
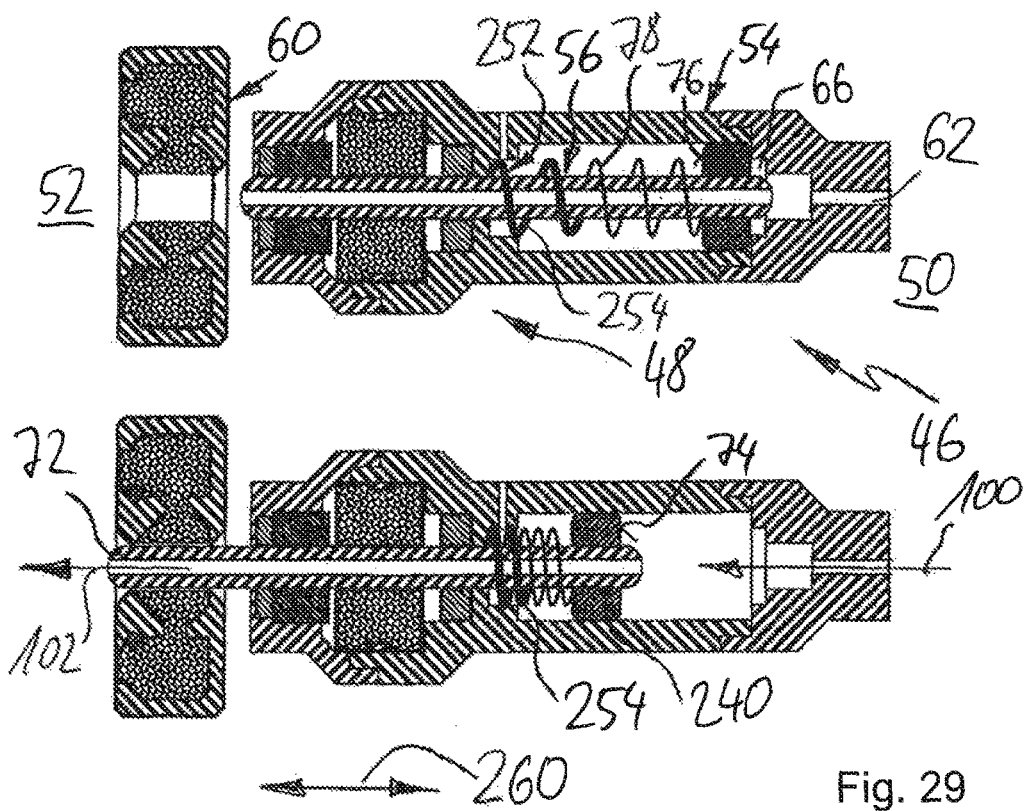
FIG. 29 schematic, highly simplified sectional views of another embodiment of a valve arrangement that is modified compared with the configuration according to FIG. 28, in a disengaged and an engaged position.
Figure 30:
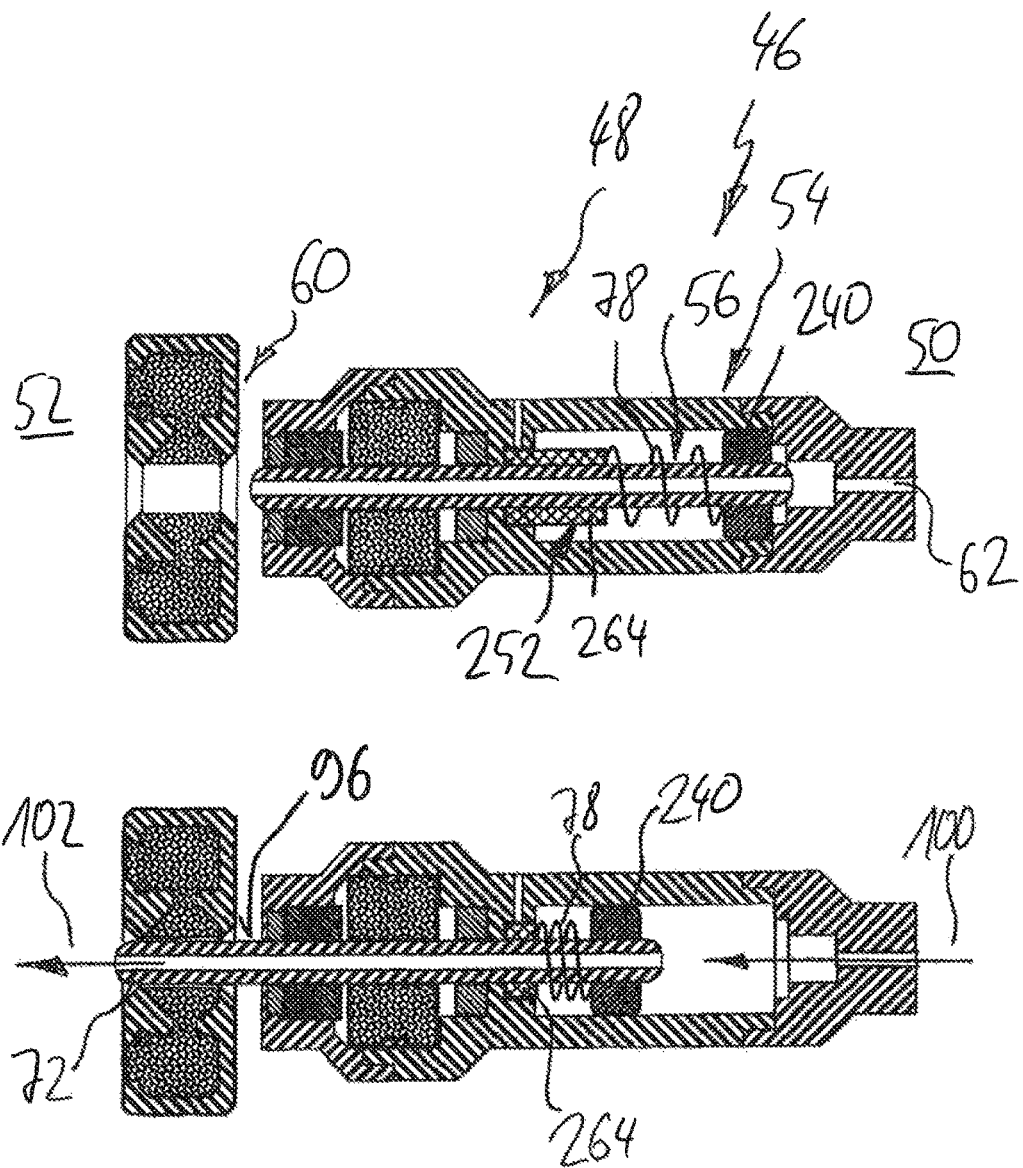
FIG. 30 schematic, highly simplified sectional views of another embodiment of a valve arrangement that is modified compared with the configuration according to FIG. 28, in a disengaged and an engaged position.

With reference to the FIGS. 28, 29 and 30, another advantageous configuration of a valve arrangement 48 for a rotationally fixed transition 46 is illustrated, which is optimised in particular with a view to minimising the wear on the control piston 56.

FIG. 28 shows two operating modes (disengaged position and engaged position) of a valve arrangement 48 for a rotationally fixed transition 46, which is similar to the embodiments already described and explained in greater detail above in terms of their substantial components and characteristics. Accordingly, a housing part 54 is provided in a basically known manner, which houses a control piston 56 and is associated together with this with a carrier side 50. Furthermore, a sealing arrangement 60 is provided, which is associated with a discharge element 58 (not explicitly shown in the FIGS. 28 to 30), which belongs to a wheel body side 52. The control piston 56 can be acted upon and displaced by an inflowing pressure medium 100, which can flow through an inlet 62 into the housing part 54. The pressure medium can act on a force application surface 74 of the control piston 56. In the engaged position, the pressure medium can flow through a channel 68 through the control piston 56 and flow out of this in the area of the sealing arrangement 60 of the discharge element 58, cf. arrow 102.

In a basically known manner, the housing part 54 has various sections 64-1, 64-2, 64-3, which can be designed by way of example as cylindrical or substantially rotationally symmetrical sections. Furthermore, a stop 82 is formed for the control piston 56 or for a ring 240 associated with the control piston 56 on the housing part 54. The ring 240 can come to rest in the engaged position on the stop 82. This regularly comprises a corresponding contraction or compression of a pretensioning element 78, which basically acts on the control piston 56 in the direction of the disengaged position. The stop 82 can also be described as a fixed housing stop. Accordingly, the position of the control piston 56 is reproducible with high repetition accuracy when this is moved back and forth repeatedly between the engaged position and the disengaged position. This allows on the one hand a defined and basically functionally reliable activation of the rotationally fixed transition 46. However, due to the always exact longitudinal position association of the control piston 65 with the sealing arrangement 60, increased local wear on the control piston 56, in particular on its guide surface or contact surface 96, can result.

FIG. 28 also shows that further sealing elements 88-2, 88-3 can be taken up on the housing part 54 by way of example, which can be referred to as sealing and guide rings 246, 248. In addition, a lubricant reservoir 118 can be taken up on the housing part 54, which can moisten the guide surface or contact surface 96 in a desired manner with a lubricant or lubricating means, for instance. At its end facing the sealing arrangement 60, the housing part 54 can further have a closing ring 250, for example. In FIG. 28 a vent or bleed hole 242 is further indicated by way of example.

The valve arrangements 48 shown in FIGS. 29 and 30 are at least similarly designed in principle to the valve arrangement 48 according to FIG. 28, so that repetition of the basic structure and substantial construction is dispensed with below. Differences between the configurations according to FIGS. 28 and 29 and 30 result in particular with regard to the stop or the position definition for the longitudinal position of the control piston 56 in the engaged position. As already mentioned above, in the design according to FIG. 28, a fixed housing stop 82 is formed, which allows repeated accurate positioning and reorientation of the control piston 56. However, this can also have disadvantages, particularly with regard to possible locally increased wear on the guide surface 96 of the control piston.

To further increase the wear resistance of the valve arrangement 48, a so-called elastic stop 252 is formed in the configurations according to FIGS. 29 and 30, which cannot be described as a fixed housing stop. On the contrary, the configurations in FIGS. 29 and 30 make use of the fact that it can be advantageous not to define the end position of the control piston 56 in the engaged position exactly and with high absolute repetition accuracy.

A housing stop 82 similar to FIG. 28 has been omitted in the configurations shown in FIGS. 29 and 30. Instead of this, FIG. 29 shows a configuration in which the elastic stop 252 is provided directly over the pretensioning element 78. In other words, the pretensioning element 78, thus the pretensioning spring, for example, the actual function of which consists in transferring the control piston 56 securely from the engaged position to the disengaged position, can operate as a stop or limiting element for the advance movement of the control piston in the reverse transition from the disengaged position to the engaged position.

This can be achieved on the one hand by designing the pretensioning element 78 such that the control piston 56 or its force application ring or stop ring 240 does not come firmly to rest on the housing part 54 in the engaged position. Thus the axial displacement of the control piston 56 is limited primarily by the pretensioning element 78. The pretensioning element 78 is preferably provided according to the configuration in FIG. 29 with different areas of elasticity.

This can be, in particular, a first area of elasticity with relatively low stiffness. Even if the incoming pressure medium 100 acts with low forces on the control piston 56, this can thus lead to significant displacements. This serves functional reliability and in particular is used so that the engaged position can be reached reliably. However, a second area of elasticity can be formed that has a significantly higher stiffness. As a result, although fluctuations in pressure or in volume flow in the inflowing pressure medium cause further compression or corresponding relief of the pretensioning element 78, the corresponding contraction or expansion of the pretensioning element 78 takes place only in a limited, manageable length range. A suitable adjustment of the pretensioning element 78 can thus result in that, if pressure medium 100 continues to flow in operation in the engaged position through the inlet 62 into the housing part 54, due to the variations inherent in the system in the characteristics of the pressure medium, minimal axial displacements can arise in the case of the control piston 56, cf. the double arrow 260 in FIG. 29.

The regions of different stiffness or elasticity on the pretensioning element can result on the one hand due to geometrical adjustments, and on the other hand by material adjustments to the relevant sections of the pretensioning element 78. It is conceivable, for example, to execute the pretensioning element 78 as a helical spring and incorporate regions of different pitch. Regions with a low pitch generally have a high elasticity and a low stiffness. Regions with a large pitch generally have a high stiffness and a correspondingly low elasticity. Other configurations are conceivable, for example a diameter variation in the wire used or in a semi-finished product used for the tensioning element would be conceivable. Suitably large cross-sections would be able to produce high stiffnesses and small cross-sections would be able to produce lower stiffnesses.

In FIG. 29, "reinforced" turns of the pretensioning element 78 are designated 254 by way of example. These can be turns of larger diameter, for instance, or turns with a higher pitch.

The configuration of the valve arrangement 48 according to FIG. 30 differs substantially in terms of implementation and execution of the elastic stop 252 from the configuration according to FIG. 29. In the design shown in FIG. 29, the pretensioning element 78 itself forms the elastic stop 252 on account of its elastic properties. In the design shown in FIG. 30, the pretensioning element 78 cooperates, on the other hand, with an elastic buffer 264, which forms the elastic stop 252. The elastic buffer 264 can be regularly formed significantly stiffer and less elastic than the pretensioning element 78. Accordingly, even in the case of a corresponding series connection of the pretensioning element 78 and the buffer 264, an essential component of the displacement of the control piston 56 is caused by the compressibility of the pretensioning element 78 upon application of the force, which acts on the control piston 56 and is applied by the inflowing pressure medium 100. However, the elastic stop 252, which is formed by the buffer 264, experiences only relatively slight deformations compared with the pretensioning element 78. Nevertheless, the resultant minor fluctuations of the axial position of the control piston 56 in the engaged position have the advantage that the guide surface 96 in contact with the sealing arrangement 60 wears only to a lesser extent and in particular is not repeatedly loaded in a locally concentrated manner.

It is understood that, alternatively to the configurations shown in FIGS. 29 and 30, the elastic stop 252 can alternatively also be provided parallel to the pretensioning element 78. According to FIGS. 29 and 30, a series connection in fact results between the elastic stop 252 and the (highly elastic part of) the pretensioning element (s) 78. A parallel arrangement could then result, for instance, when the elastic stop 252 itself is provided on the housing-side stop 82 (cf. FIG. 28). Accordingly, the ring 240 of the control piston 56 could at least temporarily contact both the pretensioning element 78 and the elastic stop 252 in the engaged position.

Another advantageous aspect of various configurations of valve arrangements 48 for rotationally fixed transitions 46 in the sense of the present disclosure is illustrated in and explained in greater detail with reference to the FIGS. 31, 31*a* and 32, 32*a*.

Figure 31:
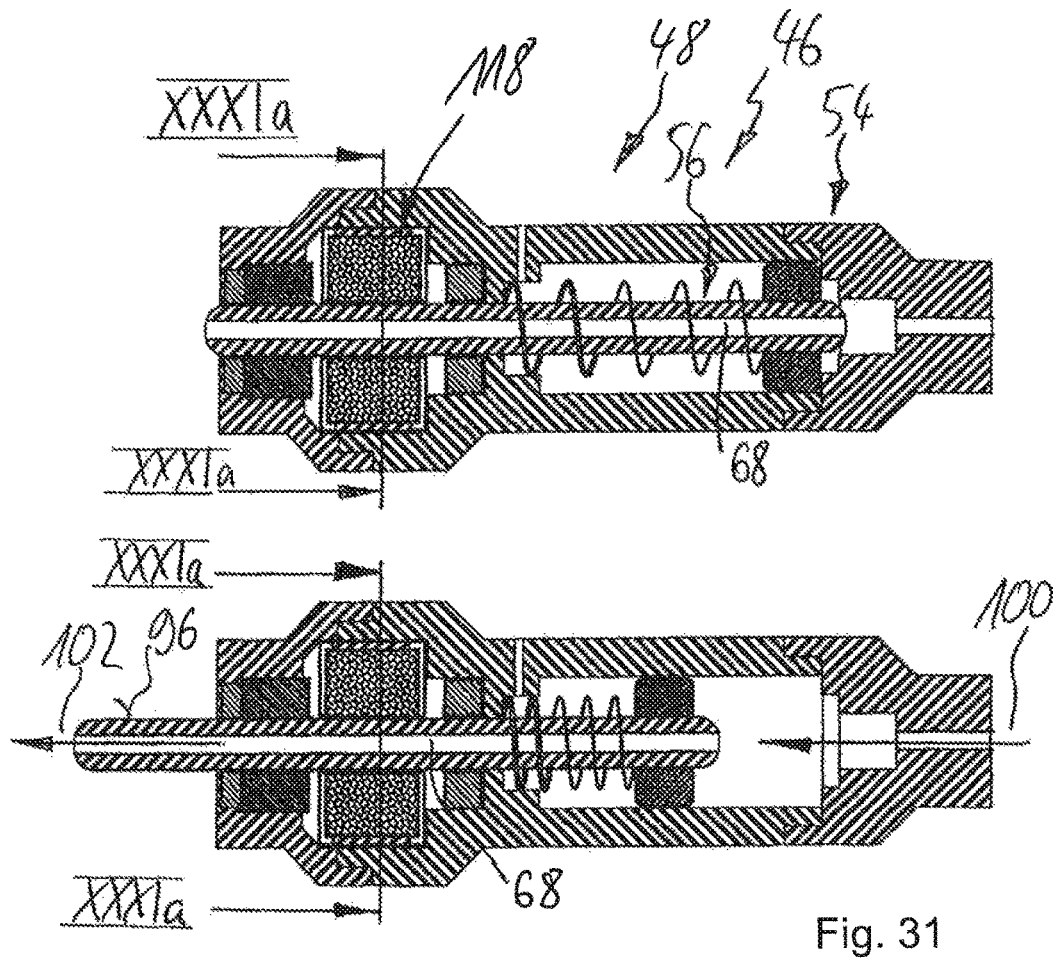
FIG. 31 schematic, highly simplified sectional views of another embodiment of a valve arrangement, in a disengaged and an engaged position.
Figure 31A:
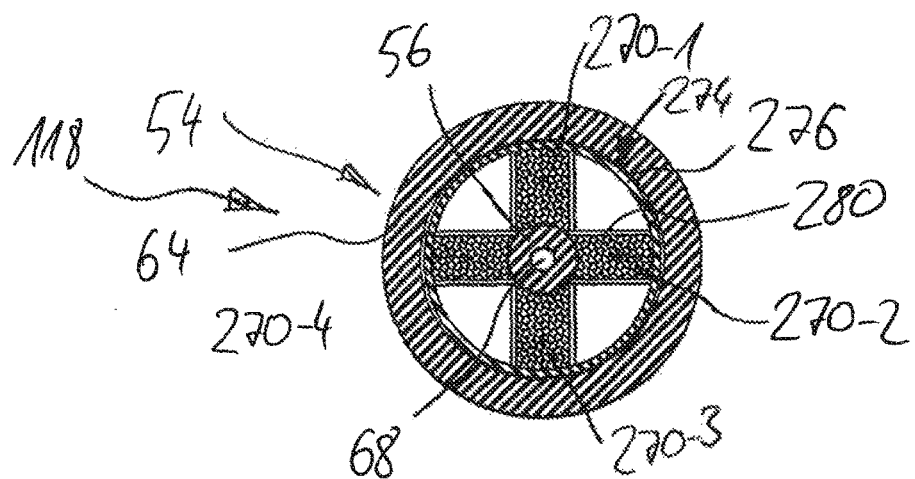
FIG. 31a a schematic, highly simplified sectional view along the line XXXIa-XXXIa in FIG. 31 for illustrating a cross-sectional configuration.

In a fundamentally known manner, FIG. 31 shows the valve arrangement 48 (or at least parts of it) in a disengaged position and an engaged position. FIG. 31*a* shows an axial section through the configuration according to FIG. 31 along section line XXXIa-XXXIa. It is a similar case in principle in FIG. 32 and the corresponding axial sectional view in FIG. 32*a*, cf. the section line XXXIIa-XXXIIa.

The configurations illustrated below are based on observations about the resultant forces in the relative movements between rotating and fixed-chassis parts of the rotationally fixed transition 46 produced in operation of the vehicle. Therefore, the following considerations and configurations are transferable in principle to any pairing between non-rotating and rotating parts, between which a relative rotation can arise accompanied by a circumferential sliding movement. In the FIGS. 31, 31*a*, 32, 32*a*, a lubricant reservoir 118, which by way of example can be provided on the housing part 54, but generally also on the discharge element 58 (cf. FIG. 3, for instance), is used as an exemplary visual object. It is further assumed below that the lubricant reservoir 118 rotates at least temporarily in operation relative to the control piston 56, in particular to its guide surface 96.

In general it is preferable if the lubricant reservoir 118 is provided with a lubricant or lubricating means to moisten the control piston 56 and thus to minimise the wear of the control piston 56 or other components of the valve arrangement 48. To this end, it is conceivable, for example, to fill the lubricant reservoir 118 directly with the lubricant (lubricating oil, grease or the like). Furthermore, it is conceivable to provide the lubricant reservoir 118 with an appropriate carrier matrix (porous body, foam, or the like) for the lubricating means or the lubricant, in which the lubricant can be received.

Lubricants can basically behave fluidically at least in some cases. In particular, they can exhibit a viscous behaviour. Accordingly, a centrifugal force which arises during the rotation of the lubricant reservoir 118 relative to the control piston 56 would force any liquid or at least viscous lubricant radially outward away from the control piston 56. This could cause the lubricating film even to be torn off and no corresponding moistening to occur.

Therefore, in the configurations according to FIGS. 31, 31*a*, 32 and 32*a*, it is proposed to produce a corresponding counter-force by elastic elements. The counter-force thus acts basically in the direction of a central axis of the control piston 56, similar to a centripetal force. By way of example, the cross section through the lubricant reservoir 118 illustrated in FIG. 31 shows that the lubricant can be taken up in at least one lubricant pocket 270, wherein a tensioning arrangement 274 extends circumferentially, which can comprise at least one tension ring 276.

The at least one tension ring 276 can be made sufficiently elastic and press the lubricant taken up in the lubricant reservoir 118 inwards in the direction of the control piston 56. A sleeve, cartridge or a tube-like element, for instance, which is pliant and accordingly (when the lubricant is being used) deformable, can be associated with each of the lubricant pockets 270. Accordingly, a state could arise as the service life of the valve arrangement 48 advances and in the case of corresponding operating times, in which the tensioning assembly 274 or its tension ring 276 has a smaller diameter to compensate for the loss of lubricant. A force component in the direction of the control piston 56 is basically generated by the tensioning assembly 274. This can thus contribute even at high relative velocities and high speeds of the lubricant reservoir 118 to enough lubricant always being able to be introduced onto the control piston 56.

Figure 32:
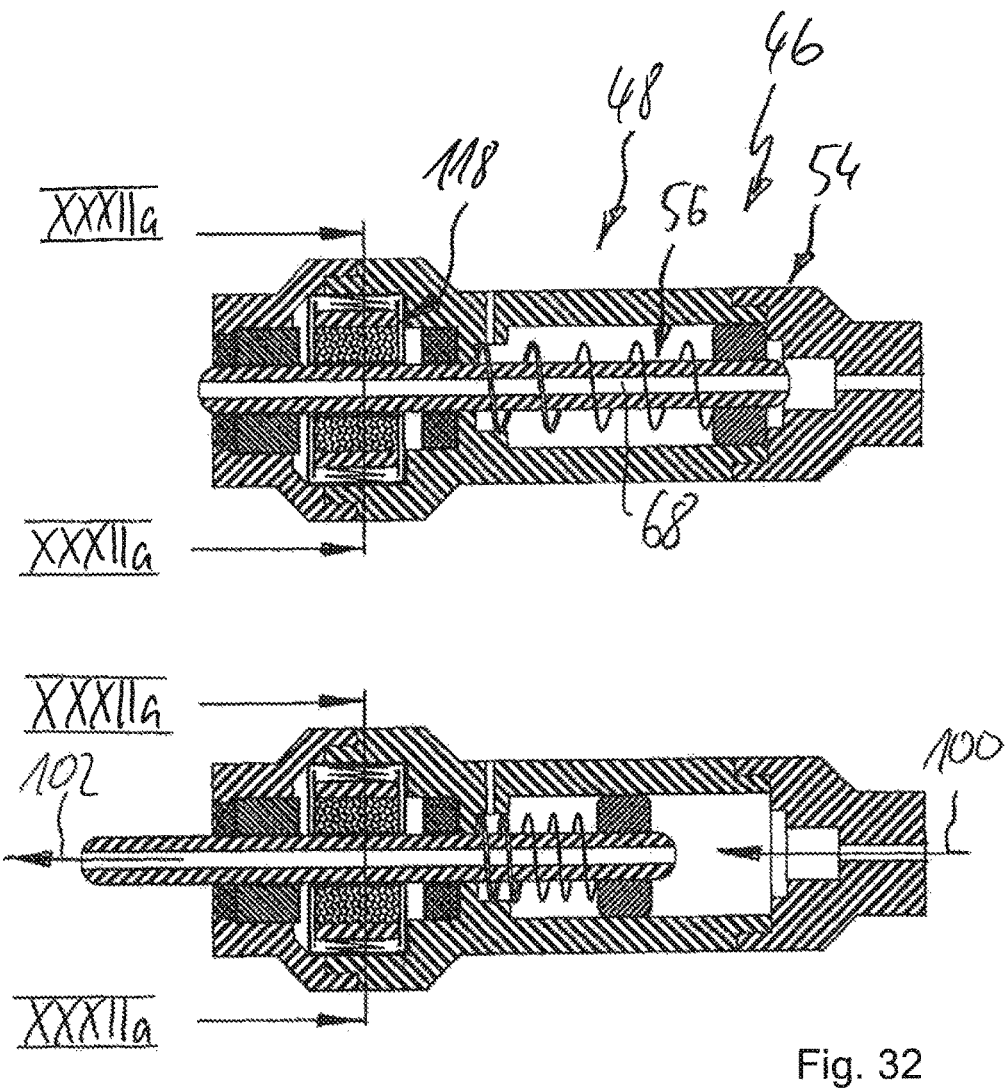
FIG. 32 schematic, highly simplified sectional views of another embodiment of a valve arrangement that is modified compared with the configuration according to FIG. 31, in a disengaged and an engaged position.
Figure 32A:
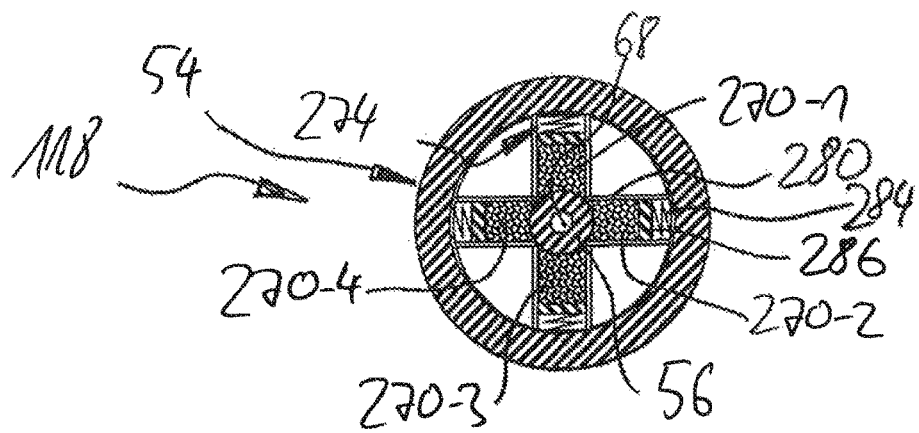
FIG. 32a a schematic, highly simplified sectional view along the line XXXIIa-XXXIIa in FIG. 32 for illustrating a cross-sectional configuration.

The configuration illustrated in FIGS. 32 and 32a differs from the configuration according to FIGS. 31, 31a substantially in that instead of the tension ring 276, the tensioning arrangement 274 has a plurality of discrete tensioning elements, such as a spring 284 per lubricant pocket 270. The springs 284 can act via a pressure piece 286, which is configured approximately like a piston, on the lubricant taken up in the lubricant pockets 270 to act on this in the direction of the control piston 56. Thus, each lubricant pocket 270 can represent a cylinder or a cartridge for the lubricant and the pressure piece 286, which is acted upon by a pretensioning element executed as a spring 284. Accordingly, in the configuration according to FIG. 32a, the lubricant or the lubricating means can be taken up in a fixed housing or a fixed sheath, which functions as a cylinder or generally as a guide surface (or sliding surface) for the pressure piece 286 and is open at least in sections in the direction of the control piston 56.

The configurations of the lubricant reservoir 118 illustrated with reference to the FIGS. 31a and 32a each have four pockets 270-1, 270-2, 270-3 and 270-4, which are or can be filled with the lubricant. Other configurations are readily conceivable. Essential to the configurations according to FIGS. 31, 31a, 32 and 32a is that a centripetal force, thus a force directed inwards, is generated on the lubricant or the lubricant reservoir 118 to compensate for a centrifugal force which can result upon rotations of the lubricant reservoir 118.

Figures 33, 33A, 33B, 33C:
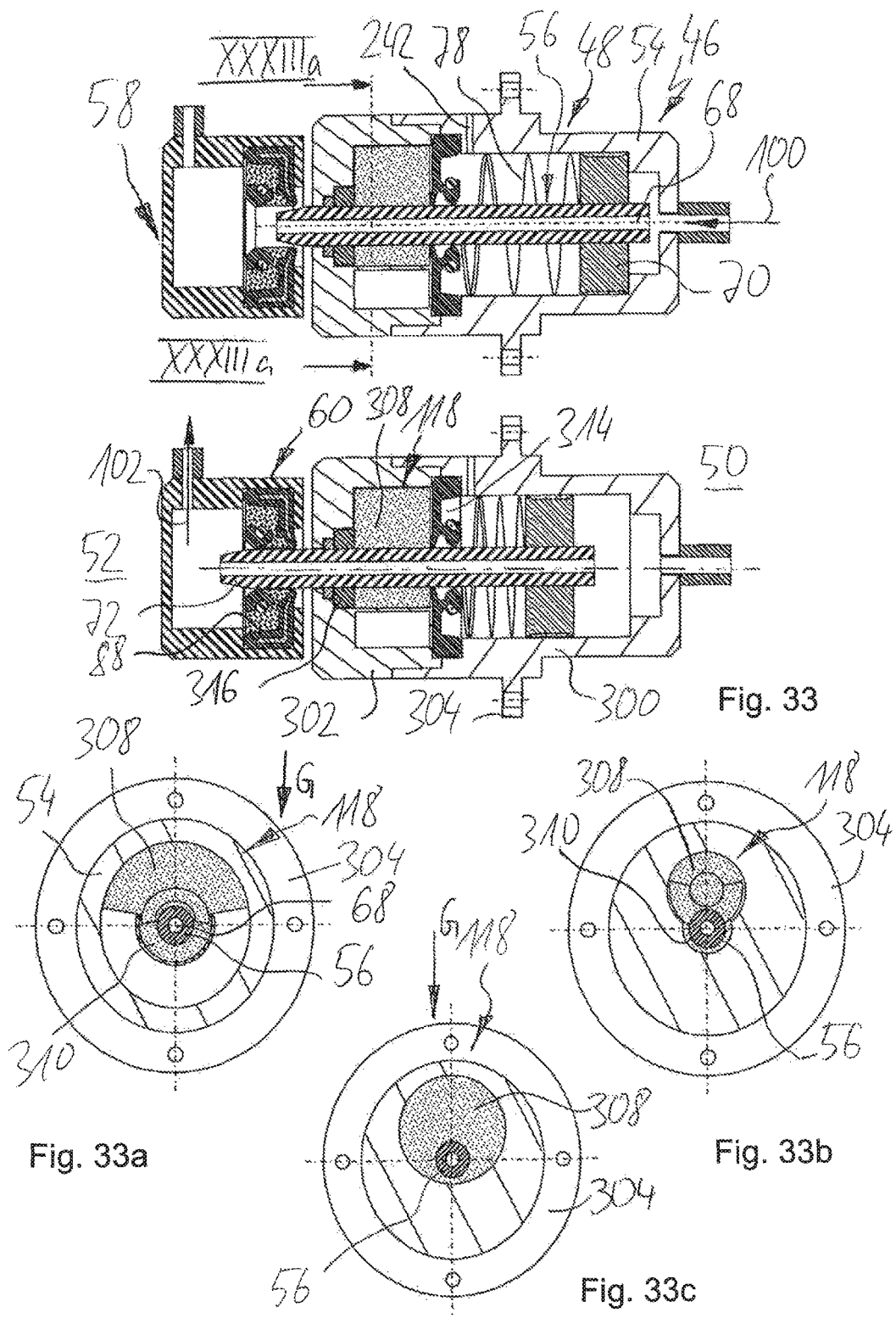

Other advantageous configurations and developments of valve arrangement 48 are illustrated with reference to FIG. 33 and the corresponding sectional views of FIGS. 33a, 33b and 33c. FIG. 33 shows a valve arrangement 48, which corresponds in basic aspects to configurations of valve arrangements 48 already described herein. To this extent, other alternative designs and modifications are primarily looked at below.

The housing 54 of the valve arrangement 48 comprises a first housing part 300 and a second housing part 302, which are axially joined to one another. In this way, the valve arrangement 48 can be inexpensively and efficiently manufactured and assembled. A mounting ring 304 is further formed on the first housing part 300. The first housing part 300 and the second housing part 302 can be aligned with each other and joined sealingly to one another.

The design according to FIG. 33 is further characterised on the one hand by a non-symmetrical design of the lubricant reservoir 118. The lubricant reservoir 118 has a so-called accumulation section 308 and a central section 310. The accumulation section 308 is—relative to a longitudinal axis of the control piston 56—arranged eccentrically. For visualisation purposes, arrows designated G are shown in FIGS. 33a and 33c, which illustrate a direction of gravity. Accordingly, the accumulation section 308 is offset upwards from the longitudinal axis of the control piston 56—against the direction of gravity G. This permits an automatic flow or tracking of lubricant when it is used in the region near the control piston 56. The lubricant supply in the lubricant reservoir 118 can be utilised efficiently.

FIG. 33a, FIG. 33b and FIG. 33c illustrate exemplary configurations of eccentrically arranged accumulation sections 308. In FIG. 33a the accumulation section 308 is designed as a circle segment or cylindrical segment, which is concentrically aligned to the control piston, wherein a recess is introduced in the lower area to create the resulting eccentricity. In FIGS. 33b and 33c, the accumulation section 308 has a substantially circular cross-section and is offset upwards relative to the control piston 56, against the direction of gravity G. In FIG. 33b, the lubricant reservoir 118 has a cross section formed by the circular cross section of the accumulation section 308 and the circular cross section of the central section 310. The central section 310 is concentrically oriented to the control piston 56. The accumulation section 308 is offset upward in contrast. In FIG. 33c, the lubricant reservoir 118 has a circular cross section overall.

The control piston 56 is supported and guided on its side facing the discharge element 58 and the wheel body side 52 by a guide element 316. The lubricant reservoir 118 is limited and sealed by a sealing element 314, which is arranged between the lubricant reservoir 118 and the end of the housing 54 that faces the carrier side 50. Thus, the lubricant fixed in the lubricant reservoir 118 is preferably not exposed to the pressure of the pressure medium in the pressure medium path 198. This can have a beneficial effect on the lubricant requirement and the life of the valve arrangement 48.

Figure 34:
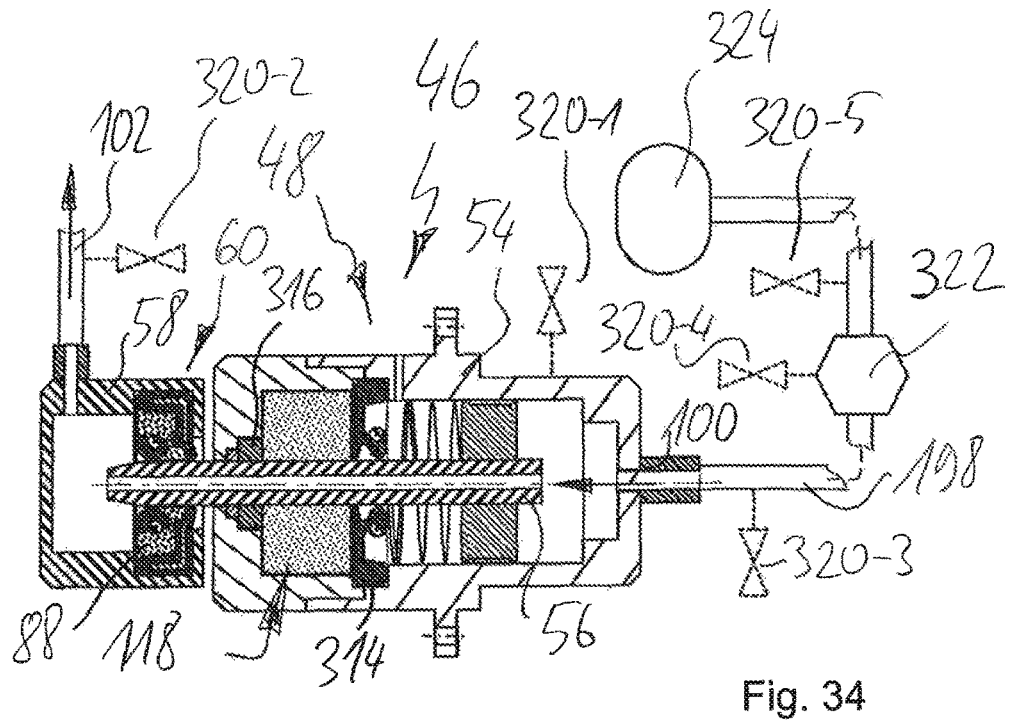
FIG. 34 a schematic, highly simplified sectional view of another embodiment of a valve arrangement, which is associated with a pressure medium path.

FIG. 34 shows a schematic, greatly simplified sectional view of an embodiment of a valve arrangement 48, which is arranged in a pressure medium path 198. The valve arrangement 48 leads the pressure medium path 198 from a carrier side 50 to a wheel body side 52. The valve arrangement 48 has a rotationally fixed transition, which can also be referred to as a rotary feedthrough. The valve arrangement 48 has a control piston 56, which is movable between a retracted position and an extended position to form or continue the pressure medium path 198 from the carrier side 50 to the wheel body side 52. With respect to the other exemplary configuration, reference is made to the above statements regarding other configurations and in particular to FIG. 33 and the related description.

Pressure medium can flow through the valve arrangement 48 from the carrier side 50 towards the wheel body side 52. The pressure medium can be provided, for instance, by a pressure accumulator 324 or a pressure generator (compressor). The pressure medium can flow through a distributor block 322, which can control e.g. individual wheels. It is advantageous to arrange at least one pressure reduction opening 320 in the pressure medium path 198. The pressure reduction opening 320 facilitates the function of the coupling valve 120, in particular a reset of the control piston 56. For this purpose, a defined leakage or a defined volume flow loss is provoked. Thus the pressure in the hydraulic fluid path 198 can be reduced, even if the wheel is filled and actually a higher pressure should prevail in the pressure medium path 198. The pressure reduction opening 320 can be formed at different positions in the pressure medium path or coupled to these, cf. the reference numerals 320-1, 320-2, 320-3, 320-4 and 320-5 in FIG. 34, which describe alternative positions.

Figure 35A:
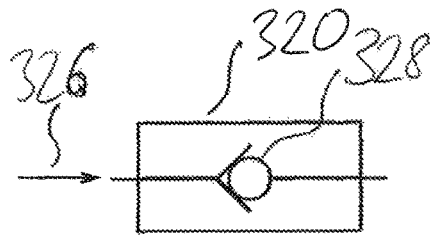
FIG. 35a-35d schematic, highly simplified block representations of blocking elements of exemplary pressure reduction openings for the arrangement according to FIG. 34.
Figure 35B:
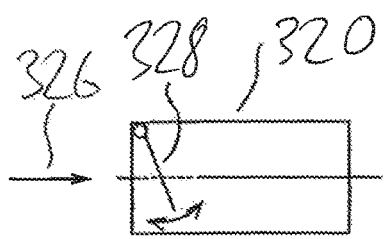

FIGS. 35a to 35d illustrate exemplary configurations of such pressure reduction openings 320, which are provided with blocking elements 328, 330. In FIGS. 35a to 35d, a flow direction is designated 326. The pressure reduction openings 320 according to FIGS. 35a and 35b are provided with blocking elements 328 in the form of non-return valves. Thus, the pressure medium can flow in only one direction in principle through the pressure reduction openings 320.

Figure 35C:
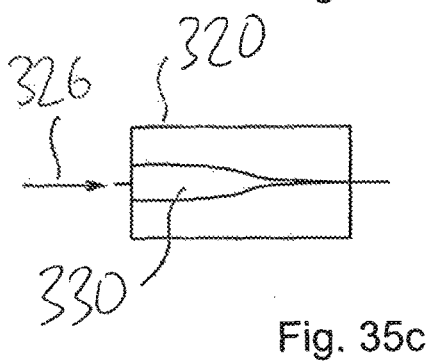
Figure 35D:
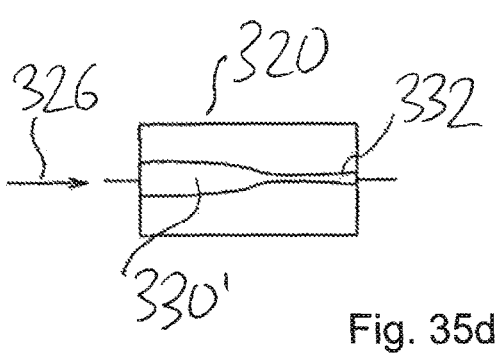

FIG. 35a illustrates an example of a ball seat valve with a locking ball. FIG. 35b illustrates an example of a flap valve with a locking flap. FIGS. 35c and 35d illustrate a grommet-like or membrane-like blocking element 330 in a closed position (FIG. 35c) and an open position (FIG. 35d). It is understood that the configuration according to FIGS. 35c and 35d permits a direction-oriented throughflow. The configuration of the pressure reduction openings 320 according to FIGS. 35a to 35d permits the desired pressure reduction and at the same time prevents the penetration of dirt into the pressure medium path 198.

The invention claimed is:

1. A valve arrangement for a rotationally fixed transition of a pressure medium supply device for a wheel unit comprising:
   a housing part through which a pressure medium can flow;
   a control piston configured to be axially displaceable which is taken up on the housing part; and
   a discharge element having an outlet for guiding the pressure medium,
   wherein the housing part and the discharge element are taken up rotatably relative to one another,
   wherein the control piston has at least one flow channel for the pressure medium,
   wherein the control piston has at least one force application surface, which can be acted upon by the pressure medium,
   wherein the control piston is movable by applying pressure to the at least one force application surface between a disengaged position and an engaged position, and
   wherein in the engaged position a pressure medium line is made possible between the housing part and the discharge element.

2. The valve arrangement according to claim 1,
   wherein the control piston has an inlet-side end and an outlet-side end facing away from the inlet-side end,
   wherein the force application surface is formed as an axial surface, at the inlet-side end, and
   wherein a pressure medium channel is formed on the control piston between the inlet-side end and the outlet-side end.

3. The valve arrangement according to claim 1,
   wherein in the engaged position a substantially pressure-tight contact exists between the control piston and the discharge element, and
   wherein in the disengaged position a defined distance is formed between the control piston and the discharge element.

4. The valve arrangement according to claim 1, wherein a sealing arrangement is provided at least on the discharge element or on the control piston, the sealing arrangement including at least one sealing element, and wherein the sealing element in the disengaged position of the control piston provides sealing between the control piston and the discharge element.

5. The valve arrangement according to claim 4, wherein the sealing arrangement has a lubricant reservoir for a lubricant, wherein the sealing arrangement is formed to deliver a quantity of lubricant to lubricate a contact surface during movement between the disengaged position and the engaged position.

6. The valve arrangement according to claim 1, wherein a lubricant reservoir for a lubricant is formed on the housing part, wherein during the movement of the control piston between the disengaged position and the engaged position in the housing part, a quantity of lubricant is delivered to lubricate a contact surface of the control piston.

7. The valve arrangement according to claim 1, further comprising at least one pretensioning element, which is formed to load the control piston in a direction of the disengaged position.

8. The valve arrangement according to claim 1, wherein the control piston is taken up non-rotatably in the housing part.

9. The valve arrangement according to claim 1, wherein a latching element is further provided on the housing part, which can be coupled to a counter-element on the control piston in order to bring about an increase of a retaining force of the control piston in the engaged position.

10. The valve arrangement according to claim 1, wherein an axial deformable sealing element is provided between the control piston and the housing part at the inlet-side end of the control piston, and wherein the sealing element is deformable under pressure loading to seal a circumferential gap between the control piston and the housing part.

11. The valve arrangement according to claim 1, wherein the force application surface is formed at the outlet-side end of the control piston, and wherein the control piston is formed to be acted on by the pressure medium via the force application surface in a direction of the inlet-side end of the control piston in order to move the control piston from the disengaged position to the engaged position.

12. The valve arrangement according to claim 1,
    wherein the control piston has a radial outlet opening,
    wherein the pressure medium exits the control piston in a substantially rebound-free manner in the engaged position, and
    wherein the radial outlet opening is arranged in the engaged position between two sealing elements axially offset from one another.

13. The valve arrangement according to claim 1, wherein the control piston includes a taper at its outlet-side end.

14. The valve arrangement according to claim 1, wherein the control piston is taken up in the housing part as a double-acting control piston, and wherein the control piston comprises a reset surface, which can be acted upon by a reset pressure medium in a direction of the disengaged position, which medium can be supplied via a reset connection to the housing part.

15. The valve arrangement according to claim 1, further comprising a flow body, which is fixed on the housing part and is arranged between an inlet of the housing part and the control piston,
    wherein the flow body has a head and a shaft,
    wherein the shaft protrudes in the disengaged position into the at least one flow channel of the control piston and seals it, and
    wherein in the engaged position a flow gap is formed between the shaft and the control piston.

16. The valve arrangement according to claim 1, further comprising a sealing body formed on the control piston,
    wherein the sealing body contacts a wall section of the housing part and on its side facing an inlet of the housing part has a recess, which defines a thin wall piece of the sealing body, which thin wall piece is deformable by an adjacent pressurised pressure medium to seal the control piston relative to the housing part.

17. The valve arrangement according to claim 1, further comprising a closing element, which at least partially blocks the at least one flow channel of the control piston in the disengaged position, wherein the closing element is fixed on the housing part and protrudes into the at least one flow channel of the control piston, and wherein the closing element has a conical tip, which in the disengaged position reduces an annular gap between the control piston and the closing element and in the engaged position increases the annular gap between the control piston and the closing element.

18. The valve arrangement according to claim 1, further comprising an elastic stop, which defines a target position of the control piston in the engaged position with sufficient positional vagueness.

19. The valve arrangement according to claim 18, wherein the elastic stop is formed by a section of the pretensioning element of higher stiffness.

20. The valve arrangement according to claim 19, wherein the elastic stop is formed separately from the pretensioning element as a buffer, and is connected in the engaged position of the control piston parallel to the pretensioning element or in series with the pretensioning element and contacts the control piston to fix the engaged position.

21. The valve arrangement according to claim 1, further comprising at least one lubricant reservoir, which executes, at least some operating states, a relative rotation with respect to the control piston, wherein the lubricant reservoir is provided with a tensioning arrangement, which exerts a force acting radially in a direction of the control piston on lubricant taken up in the lubricant reservoir.

22. The valve arrangement according to claim 21, wherein the tensioning arrangement of the lubricant reservoir comprises an elastic tension ring, which encloses at least one lubricant pocket and produces a centripetal force in the direction of control piston.

23. The valve arrangement according to claim 21, wherein the tensioning arrangement of the lubricant reservoir comprises at least one lubricant pocket, which is coupled at its end facing away from the control piston to a spring, which produces a centripetal force via a pressure piece in the direction of the control piston, which force acts on the lubricant pocket.

24. The valve arrangement according to claim 1, further comprising an asymmetrically designed lubricant reservoir, which surrounds the control piston at least in sections, wherein the lubricant reservoir is configured eccentrically in relation to the control piston.

25. The valve arrangement according to claim 24, wherein the lubricant reservoir has an enlarged accumulation section, whose center of gravity in an assembled state is oriented above a height level of a longitudinal axis of the control piston.

26. The valve arrangement according to claim 25, wherein the lubricant reservoir is oriented such that, in operation, lubricant flows aided by gravity from the accumulation section in a direction of the control piston to replace used lubricant.

27. The valve arrangement according to claim 1, further comprising at least one sealing element that protects a lubricant reservoir for the control piston against an increased pressure level due to inflowing pressure medium, wherein the at least one sealing element is fixed in the housing part and is arranged between the lubricant reservoir and a carrier-side end of the control piston.

28. A pressure medium supply device for a tire of a wheel unit of a vehicle, comprising;

a pressure medium path, which extends between a vehicle-side pressure medium supply unit and a closing valve of the tire, wherein the pressure medium path comprises a rotationally fixed transition with a valve arrangement according to claim 1.

29. The pressure medium supply device according to claim 28, wherein the pressure medium supply unit is formed as a decentralized compressor unit in a region of an axle beam of the vehicle, wherein the pressure medium path extends between the compressor unit and the closing valve of the tire, and wherein the compressor unit feeds the pressure medium path with a pressurised pressure medium for activating the valve arrangement.

30. The pressure medium supply device according to claim 28, wherein a pressure reduction opening is provided in the pressure medium path, which causes a defined leakage under pressure and is operable as a function of a pressure level in the pressure medium path between an open position, in which a small quantity of the pressure medium can escape, and a closed position, in which the pressure medium path is protected from external contamination.

31. The pressure medium supply device according to claim 30, wherein the pressure reduction opening has a passage direction and a blocking direction and is configured as a membrane seal.

32. The pressure medium supply device according to claim 30, wherein the pressure reduction opening has a grommet-like configuration.

33. A wheel unit with a rim body, a tire, and an axle beam, wherein the rim body and the axle beam are coupled to each other via a wheel bearing, and with a pressure medium path with a rotationally fixed transition, which comprises a valve arrangement according to claim 1.

* * * * *